United States Patent
Gong

(10) Patent No.: US 8,174,532 B2
(45) Date of Patent: May 8, 2012

(54) PROGRAMMABLE VIDEO SIGNAL PROCESSOR FOR VIDEO COMPRESSION AND DECOMPRESSION

(75) Inventor: Danian Gong, Fremont, CA (US)

(73) Assignee: Apusone Technology Inc., Taipei (TW)

(*) Notice: Subject to any disclaimer, the term of this patent is extended or adjusted under 35 U.S.C. 154(b) by 1183 days.

(21) Appl. No.: 11/953,302

(22) Filed: Dec. 10, 2007

(65) Prior Publication Data

US 2008/0140999 A1    Jun. 12, 2008

Related U.S. Application Data

(60) Provisional application No. 60/869,331, filed on Dec. 10, 2006.

(51) Int. Cl.
  *G06T 1/00* (2006.01)
  *G06T 15/00* (2006.01)
  *G06F 15/00* (2006.01)
(52) U.S. Cl. .......................... 345/522; 345/501
(58) Field of Classification Search .................. 345/519; 712/32, 35, 203, 206, 215, 245, 246
See application file for complete search history.

(56) References Cited

U.S. PATENT DOCUMENTS

| | | | | |
|---|---|---|---|---|
| 5,822,606 A | * | 10/1998 | Morton | 712/16 |
| 5,875,315 A | * | 2/1999 | Narayan | 712/204 |
| 5,949,410 A | * | 9/1999 | Fung | 715/203 |
| 6,266,750 B1 | * | 7/2001 | DeMone et al. | 711/169 |
| 6,269,440 B1 | * | 7/2001 | Fernando et al. | 712/241 |
| 6,336,182 B1 | * | 1/2002 | Derrick et al. | 712/204 |
| 6,414,687 B1 | | 7/2002 | Gibson | 345/503 |
| 6,650,330 B2 | | 11/2003 | Lindholm et al. | 345/506 |
| 2004/0268091 A1 | * | 12/2004 | Pessolano | 712/215 |
| 2005/0114560 A1 | * | 5/2005 | Coleman et al. | 710/22 |
| 2006/0002471 A1 | * | 1/2006 | Lippincott et al. | 375/240.16 |
| 2007/0192393 A1 | * | 8/2007 | Cheng et al. | 708/402 |

OTHER PUBLICATIONS

Thomas Chen et al., "Cell Broadband Engine Architecture and its first implementation" Retrieved from the internet: URL:http://ibm.com/developerworks/power/library/pa-cellperf/, Nov. 29, 2005, pp. 1-16.
J.A. Kahle et al., "Introduction to the Cell multiprocessor" IBM Journal of Research and Development, vol. 49, No. 4/5, Jul./Sep. 2005, pp. 589-604.

* cited by examiner

*Primary Examiner* — Jacinta M Crawford
(74) *Attorney, Agent, or Firm* — J.C. Patents

(57) ABSTRACT

A data processing method with multiple issue multiple datapath architecture in a video signal processor (VSP) is provided. In the method, commands are received from the external signal processor. The received commands are routed to a plurality of separate command sequencers, an Input/output (IO) processor or a plurality of configure registers according to different command types. Each of the separate command sequencers packs the received commands into a plurality of instruction packets and sending the instruction packets to a plurality of instruction dispatch units, in which each of the instruction packets includes one or more instructions. The instruction packets are dispatched to respective function units for performing operations in response to the received instruction packets.

34 Claims, 42 Drawing Sheets

GVRF in Shift register array mode

| | 127 | 64 | 63 | 0 | |
|---|---|---|---|---|---|
| vm0 | vm0.H | | vm0.L | | vm8 |
| vm1 | vm1.H | | vm1.L | | vm9 |
| vm2 | vm2.H | | vm2.L | | vm10 |
| vm3 | vm3.H | | vm3.L | | vm11 |
| vm4 | vm4.H | | vm4.L | | vm12 |
| vm5 | vm5.H | | vm5.L | | vm13 |
| vm6 | vm6.H | | vm6.L | | vm14 |
| vm7 | vm7.H | | vm7.L | | vm15 |

GVRF organization

DFXU and interconnection

Mirror Operation

Mirror Operation

Byte permutation

Byte permutation

Short permutation

Short permutation

DWORD permutation

QWORD permutation

Byte Rotate operation

Padding operation

| a | b | c | d |
|---|---|---|---|
| e | f | g | h |
| i | j | k | l |
| m | n | o | p |

VM[0]
VM[1]
VM[2]
VM[3]

| a | e | i | m |
|---|---|---|---|
| b | f | j | n |
| c | g | k | o |
| d | h | l | p |

VM[0]
VM[1]
VM[2]
VM[3]

4x4 Matrix Transpose

FIG.18

VMAC structure 16-b Splitable Adder

Round Unit

Adder and Saturate Unit

DMU architecture

Structure of DMX

Byte Aligner Structure

DMX QWORD access

DMX Byte access

DMY QWORD access

PROGRAMMABLE VIDEO SIGNAL PROCESSOR FOR VIDEO COMPRESSION AND DECOMPRESSION

CROSS-REFERENCE TO RELATED APPLICATIONS

The present application claims priority to Provisional U.S. Patent Application Ser. No. 60/869,331, filed Dec. 10, 2006, the disclosure of which is incorporated herein by reference.

BACKGROUND

1. Field

This disclosure relates generally to the field of data processing. More particularly, the disclosure relates to a method and apparatus for performing video signal processing.

2. Description of the Related Art

A typical system for video compression/decompression applications is shown in FIGS. 1A and 1B. In FIG. 1A, a video compression/decompression system includes one or multiple one or multiple VRISC, video signal processor (VSP) and multiple application Specific Modules (ASMs) in the system, and in FIG. 1B, the ASMs are replaced with multiple entropy decoders and a motion estimation unit. The VRISC handles the high-level tasks management. There are in the system. The Application Specific Modules (ASMs) are designed to support some specific functions that are not easily done by VSP or VRISC. The ASMs are considered as the extension engines of the VSP. The encoder requires the ASM with a capability of variable length encoding and does not require the ASM with variable length decoding, and the decoder requires the ASM with a capability of variable length decoding and does not require variable length encoding.

The VSP is scalable for ultra-high performance video coding and processing. One or more VSPs can be embedded in the video system to exploit the high-level data parallelism or task parallelism. In FIGS. 1A and 1B, two VSPs are respectively used. What is needed is a VSP providing high computation throughput as well as high Input/Output (IO) throughput. The VSP provides efficient synchronization mechanism for IO and computation. IO and computation can be done in parallel so that IO transfer cycles can be hidden. The VSP provides efficient communication mechanism with external processors. The VSP has efficient communication interface with DMA engine, VRISC and VLX.

SUMMARY

The invention provides a data processing method with multiple issue multiple datapath architecture in a video signal processor (VSP). In the method, commands are received from the external signal processor. The received commands are routed to a plurality of separate command sequencers, an Input/output (IO) processor or a plurality of configure registers according to different command types. Each of the separate command sequencers packs the received commands into a plurality of instruction packets and sending the instruction packets to a plurality of instruction dispatch units, in which each of the instruction packets includes one or more instructions. The instruction packets are dispatched to respective function units for performing operations in response to the received instruction packets.

In one embodiment, the received commands are routed to the Input/output (IO) processor for controlling data transfer between a data memory unit (DMU) of the VSP and an external DMA engine by using the routed commands.

In one embodiment, the received commands are routed to the Input/output (IO) processor for controlling data transfer between a data memory unit (DMU) of the VSP and the external DMA engine further comprising converting data format for the data received from a data FIFO connected to the external DMA engine.

The invention provides a data processing method in a video signal processor (VSP). In the method, commands are received from the external signal processor. The received commands are dispatched to a first separate command sequencer (PSQ), a second separate command sequencer (PSQ2) and a third separate command sequencer according to different command types, the first and second separate command sequencers are for performing task parallelism and the third command sequencers for performing Input/output (IO) operation. The first and second separate command sequencers pack the received commands into a plurality of instruction packets. The first and second separate command sequencers respectively send the instruction packets to a plurality of arithmetic function units with a first type and a plurality of arithmetic function units with a second type.

The invention provides a method for data processing in a video signal processor (VSP). In the method, commands are received from the external signal processor. The received commands are dispatched into a plurality of separate command sequencers in VSP according to different command types, wherein the dispatched commands respectively in a first and a second separate command sequencers are supplied for computation and the dispatched commands in a third and a fourth separate command sequencers are supplied for input or output (IO) operations. The execution of pixel processing is controlled by using the dispatched commands in the first separate command sequencer. The execution of vector processing or scalar processing is controlled by using the dispatched commands in the second separate command sequencer, wherein controlling data transfer between a data memory unit (DMU) of the VSP and an external DMA engine by using the dispatched commands in the third separate command sequencer. The data transfer between the data memory unit (DMU) of the VSP and an external entropy engine is controlled by using the dispatched commands in the fourth separate command sequencer, wherein the computing operations in the VSP and the data transfer operation by the DMA engine are done in parallel.

The invention provides a video signal processor (VSP). The VSP includes an interfacing unit, a plurality of separate command sequencers, a plurality of instruction dispatch units and a plurality of arithmetic function units. The interfacing unit receives commands from the external signal processor. The separate command sequencers receive commands from the interfacing unit according to types of the received commands, each of the separate command sequencers packing the received commands into a plurality of instruction packets. The instruction dispatch units receive the instruction packets sent from the separate command sequencers, wherein each of the instruction packets includes one or more instructions. The arithmetic function units receive the instruction packets from respective instruction dispatch units and for performing operations in response to the received instruction packets.

BRIEF DESCRIPTION OF THE DRAWINGS

These and other features, aspects, and advantages of the present invention will become better understood with regard to the following description, appended claims, and accompanying drawings where:

FIG. 18 shows 4×4 matrix before and after the transpose operation carried out by executing 4 consecutive instructions.

DETAILED DESCRIPTION OF PREFERRED EMBODIMENTS

At least some embodiments of the disclosure relate to a system, an apparatus and method for video signal processing.

The following description and drawings are illustrative and are not to be construed as limiting. Numerous specific details are described to provide a thorough understanding of the disclosure. However, in certain instances, well known or conventional details are not described in order to avoid obscuring the description. References to one or an embodiment in the present disclosure can be, but not necessarily are, references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1A:
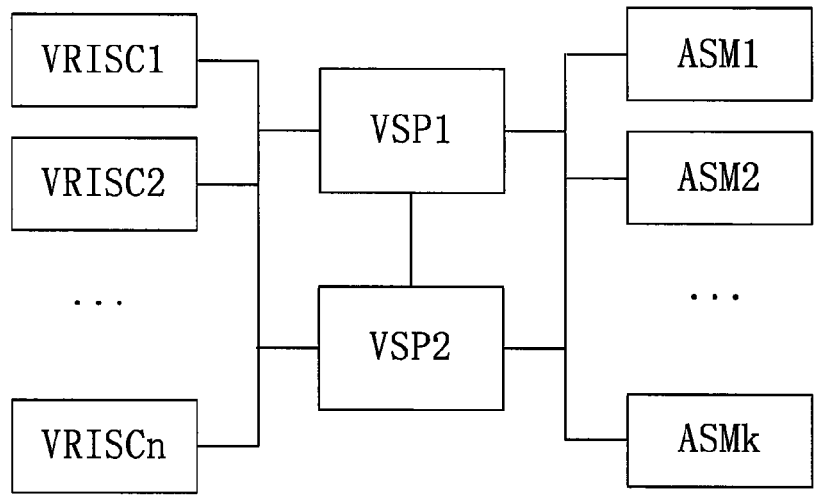
FIGS. 1A and 1B illustrate typical system for video compression/decompression applications.
Figure 1B:
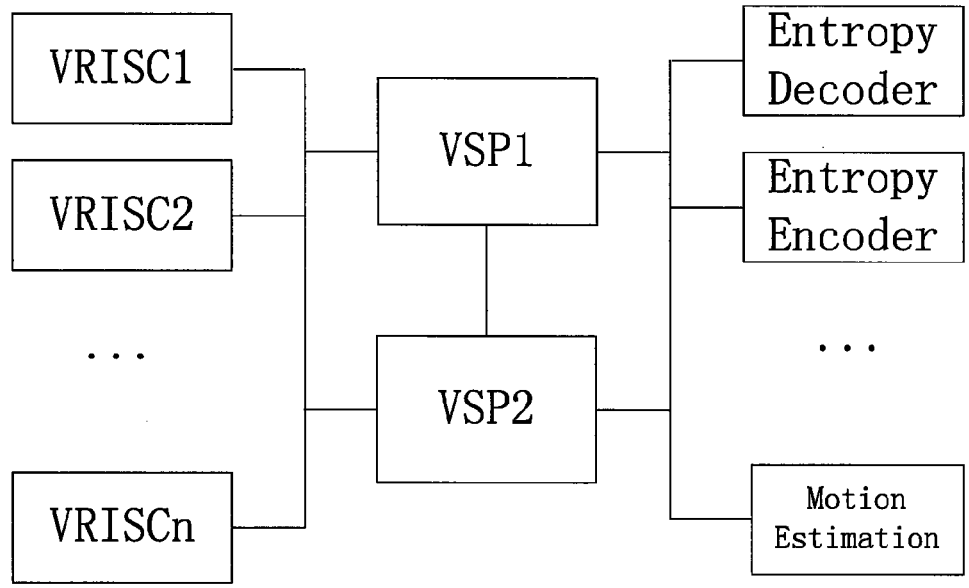
Figure 2:
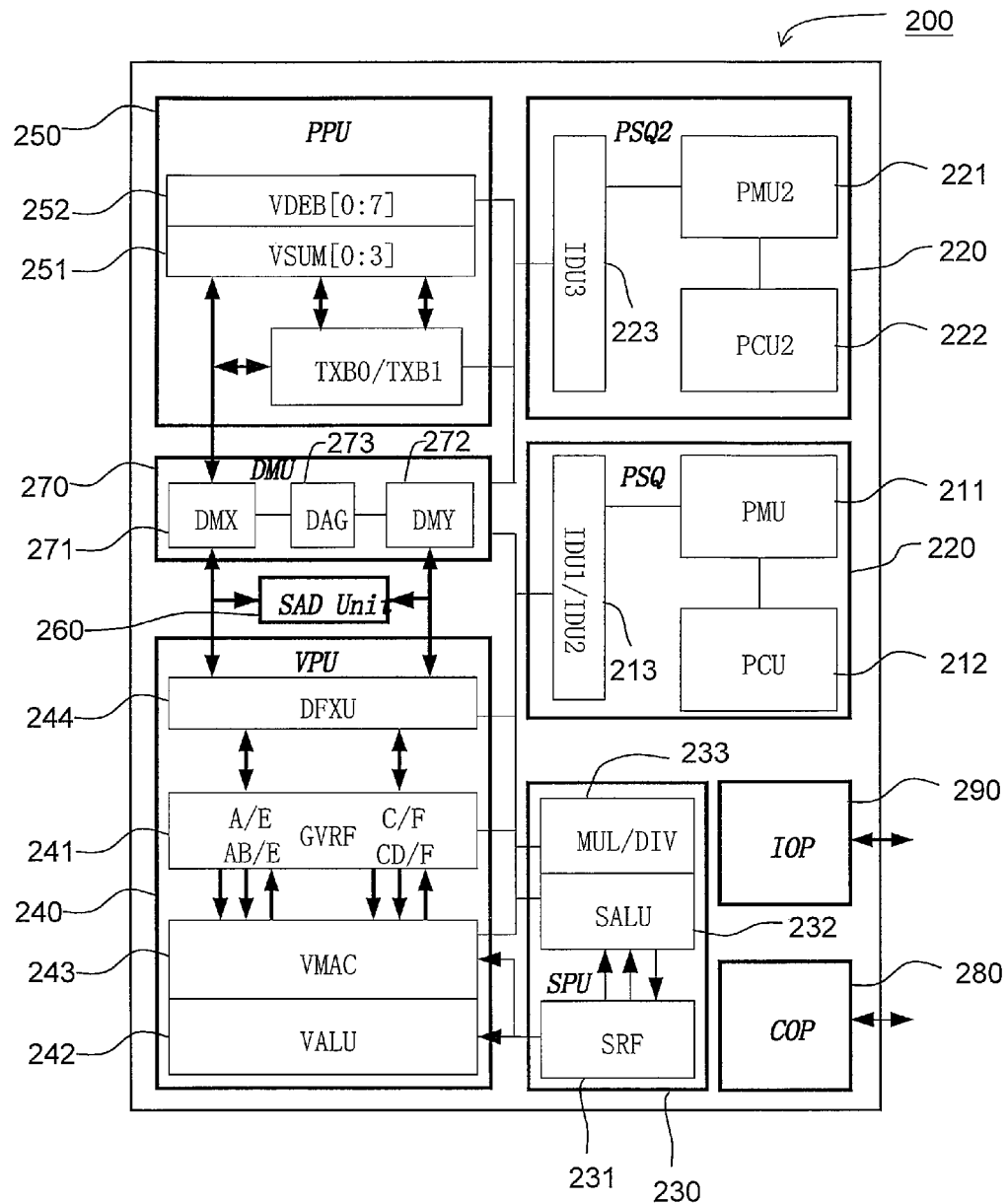
FIG. 2 illustrates one embodiment of a video signal processor.

FIG. 2 illustrates one embodiment of a video signal processor.

In one embodiment, the architecture of a video signal processor (VSP) is shown in FIG. 2. The programmable video signal processor 200 includes a program sequencer unit (PSQ) 210, a second program sequencer unit (PSQ2) 220, a scalar processing unit (SPU) 230, a vector processing unit (VPU) 240, a Pixel Processing Unit (PPU) 250, a Sum of Absolute Difference Unit (SAD Unit) 260 and a data memory unit (DMU) 270.

In one embodiment, the program sequencer unit (PSQ) 210 contains 2K 24-bit Program Memory Unit (PMU) 211, a Program Counter Unit (PCU) 212 and two Instruction Decode units (IDU1/IDU2) 213. The PMU 211 can issue one or two instruction in one cycle. These two instructions are decoded in IDU1 and IDU2 respectively and then executed in different execution units. The PCU 212 has four-depth subroutine stack and four-depth loop stack.

In one embodiment, the second program sequencer unit (PSQ2) 220 contains a 256 24-bit Program Memory Unit (PMU2) 221, a Program Counter Unit (PCU2) 222 and one Instruction Decode units (IDU3) 223. The PMU2 221 can output one 24-bit instruction in one cycle.

In one embodiment, the PPU 250 is designed for pixel based video processing, including Quarter/Half pixel interpolation (QPEL) and deblocking filtering (DEB). The PPU 250 has two types of datapath. One type of datapath includes four vector summation elements (VSUM0, VSUM1, VSUM2, VSUM3), indicated as VSUM[0:3] 251 in FIG. 2. Each VSUM calculates the dot-product of the input 8-pixel vector and the fixed-coefficient vector. The VSUM uses configurable multiplication-free computation unit to reduce the hardware cost. The VSUM can be configured to support the different types of interpolation filter. The other type of datapath consists of several hardwired deblocking filters for specified video coding standards, for example, VDEB_H.264 or VDEB_VC1, etc, indicated as VDEB[0:7] 252 in FIG. 2, for example. Each type of the filters does the conditional deblocking filtering based on the input eight pixels by executing one instruction. The deblocking filter datapath has multiple pipeline stages. The implementation of H.264 deblocking filter can be referenced in "Draft ITU-T Recommendation and Final Draft International Standard of Joint Video Specification (ITU-T Rec. H.264|ISO/IEC 14496-10 AVC)". The implementation of VC1 deblocking filter can be referenced in "SMPTE 421M-2006, VC-1 Compressed Video Bitstream Format and Decoding Process."

In one embodiment, the vector processing unit 240 includes a general purpose vector register file (GVRF) 241, a vector arithmetic logic unit (VALU) 242, a vector multiplier accumulator (VAMC) 234 and a data fetch and exchange unit (DFXU) 244. The general purpose vector register file (GVRF) 241 stores pixels of the neighboring blocks and the current block, as well as intermediate data. The general purpose vector register file (GVRF) 241 can be configured as shift register array to save the instruction cycles and storage. The general purpose vector register file (GVRF) 241 has four read ports and two write ports. Inside the vector arithmetic logic unit (VALU) 242, there is an accumulator to store immediate data which have bigger data width than general purpose vector registers. There is a special circuit to Tight shift the value in the accumulator and store the results into the general purpose vector register file (GVRF) 241.

In one embodiment, the scalar processing unit (SPU) 230 includes a general purpose scalar register file (SRF) 231, a scalar arithmetic logic unit (SALU) 232 and a multiplication and division operation unit (MUL/DIV) 233. The scalar register file (SRF) 231 is connected to the vector multiplier accumulator (VAMC) 234 in order to provide one of the operands of multiplication. The scalar register file (SRF) 231 is connected to the vector arithmetic logic unit (VALU) 242 in order to provide one of the operands of arithmetic logic unit (ALU) operations. The vector arithmetic logic unit (VALU) 242 and vector multiplier accumulation unit (VAMC) 234 are splitable in order to meet different accuracy requirements in video compression and decompression algorithms.

In one embodiment, the Sum of Absolute Difference (SAD) unit 260 is designed for calculating the sum of absolute difference (SAD), which is useful for Motion Estimation (ME) with the assist of the Scalar Processing Unit 230. The SAD unit 260 is a pipelined computation datapath.

In one embodiment, the data memory unit (DMU) 270 stores block data or immediate data generated by the VPU 240 or the PPU 250. The DMU 270 has two independent memory ports, called DMX 271 and DMY 272. Both DMX 271 and DMY 272 can be accessed by an external direct memory access (DMA) controller as well as the VPU 240 or the PPU 250. If both DMA controller and VPU/PPU access the same port of DMU 270, the DMA controller has higher priority. The DMU 270 also contains a programmable Data Address Generator (DAG) 273, which is programmed by the SPU 233 and generates the address for the DMX 271 and DMY 272.

Figure 3:
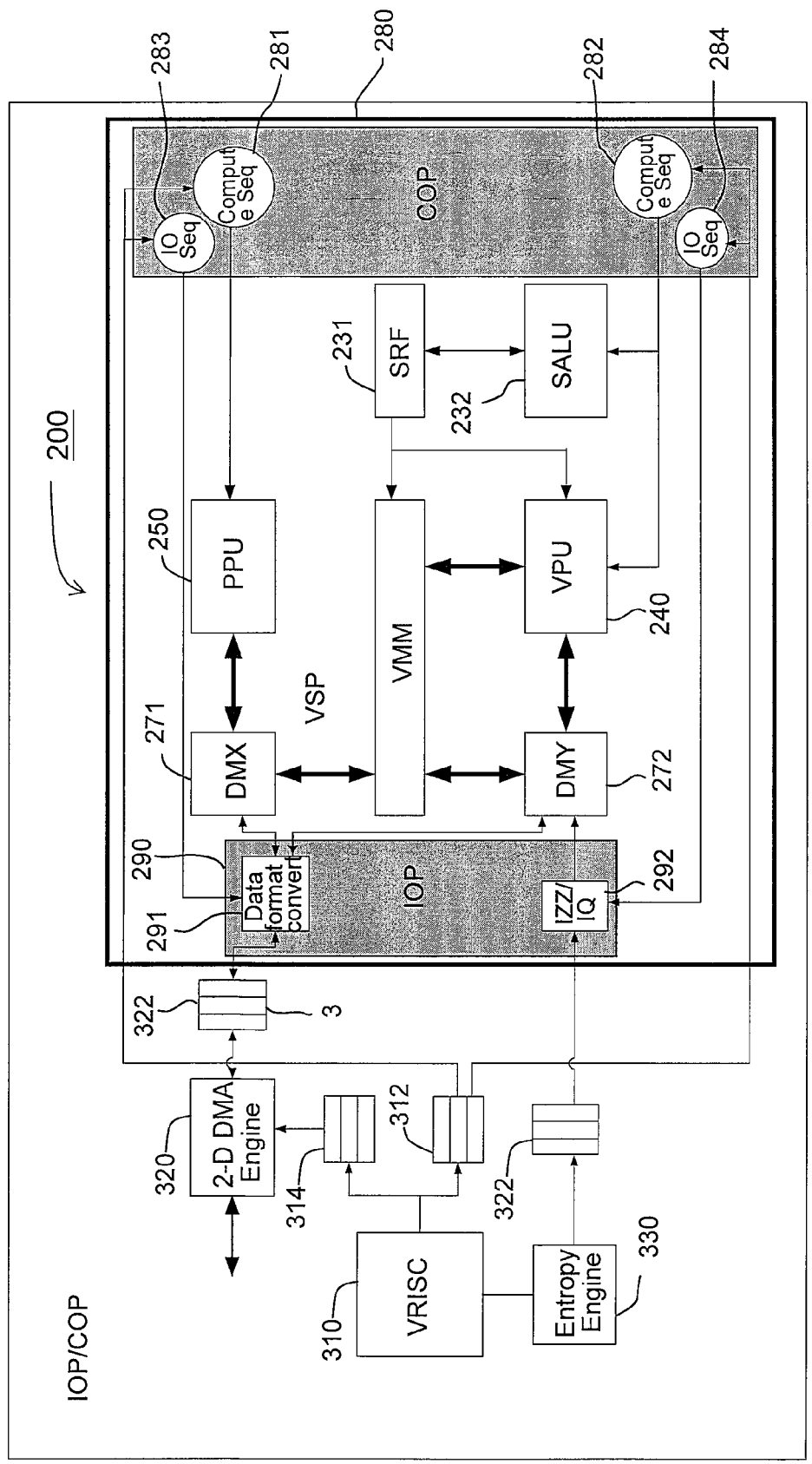
FIG. 3 illustrates one embodiment of connection of an external CPU or DSP and the VSP through the COP and the IOP.

The VSP 200 and an external CPU or DSP exchange the commands and data through a COProcessor interface ("COP" hereinafter) 280. The VSP 200 and external memory exchange the bulk data through IOProcessor interface ("IOP" hereinafter). Please refer to FIG. 3, which show the connection between the external CPU or DSP and the VSP through the COP and the IOP. An external VRISC 310, 2-D DMA Engine 320 and an entropy engine 330 are coupled to the VSP 200 respectively through a VSP command data queue 312, a Data FIFO 322, and a coefficient FIFO 332. The VRISC 310 is coupled to the 2-D DMA Engine 320 through a DMA command data queue 314. In COP 280, the commands from the VSP command data queue 312 to the VSP 200 are dispatched into four separate command sequencers according to different command types. Two compute sequencers 281 and 282 are for computation, including PSQ and PSQ2. Two IO sequencers 283 and 284 are for IO operations. The compute sequencer 281 controls the execution of PPU. The other compute sequencer 282 controls the execution of the VPU 240 and the SALU 232 of the SPU 230. The IO sequencer 284 controls the transfer between an external Entropy processor 330 and the DMY 272. The IO sequencer 283 controls the transfer between the external 2-D DMA Engine 320 and the DMX 271 or DMY 272. The DMA commands and the VSP commands are decoupled so that VSP operations and DMA transfer operations can be done in parallel. The DMA commands are sent from VRISC 310 to the DMA command data queue 314. The VSP commands are sent from VRISC 310 to the VSP command data queue 312.

The IOP contains two pieces of IO state machine 291 and 292. The IO state machine 290 controls the data format covert between DMX 271 or DMY 272 and the external Data FIFO 322. The IO state machine 292 controls the inverse scan and inverse Quantization and the transfer between DMY 272 and the Coefficient FIFO 332. VSP provides high computation throughput as well as high IO throughput. The VSP 200 provides efficient synchronization mechanism for IO and computation. IO and computation can be done in parallel so that IO transfer cycles can be hidden. The VSP provides efficient communication mechanism with external processors. VSP has efficient communication interface with DMA engine, VRISC and VLX.

Figure 4:
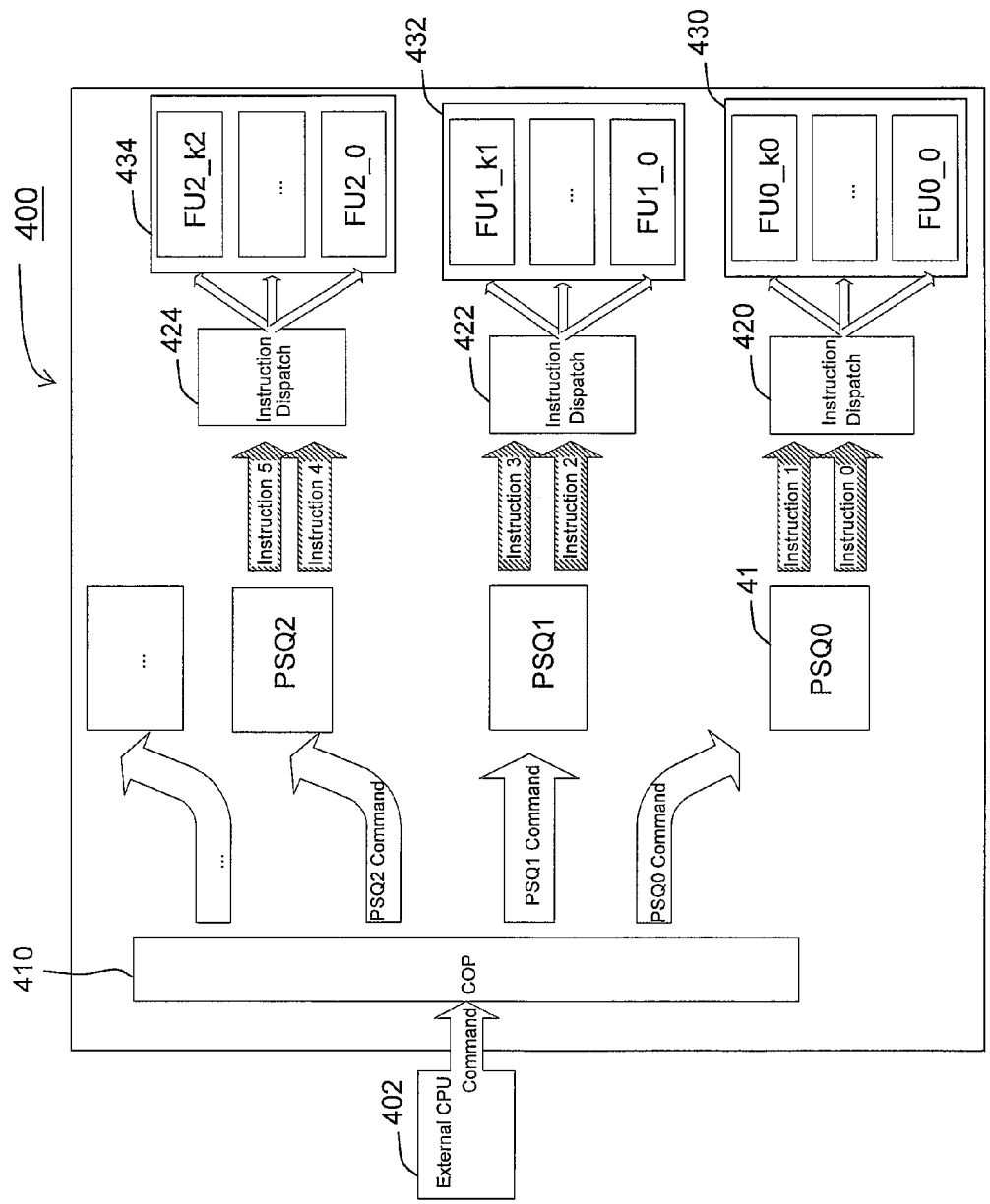
FIG. 4 illustrates one embodiment of multiple issue multiple datapath architecture used in a video signal processor of the invention.

In one embodiment, a video signal processor 400 of the present invention uses multiple issue multiple datapath architecture, which is described in FIG. 4. The external RISC or the external CPU 402 sends out the commands to COP 410. The COP 410 routes different types of commands to respective Program Sequencers, for example, program sequencers PSQ0, PSQ1, PSQ2, as shown in FIG. 4, and IO processor and Configure registers. Each PSQ can send the instruction packet flow to a corresponding Instruction Dispatch unit, for example, the program sequencers PSQ0, PSQ1, PSQ2 respectively send instructions to instruction dispatch units 420, 422 and 424. Each PSQ has its own program memory to store the instructions. Each PSQ can execute different program at the same time. Each instruction packet includes one or more instructions. The Instruction Dispatch unit sends the instructions in the instruction packet to respective Functional Unit, for example, the instruction dispatch units 420, 422 and 424 respectively send instructions to functional module 430, 432 and 434, each of which has at least one or more function units.

Figure 5:
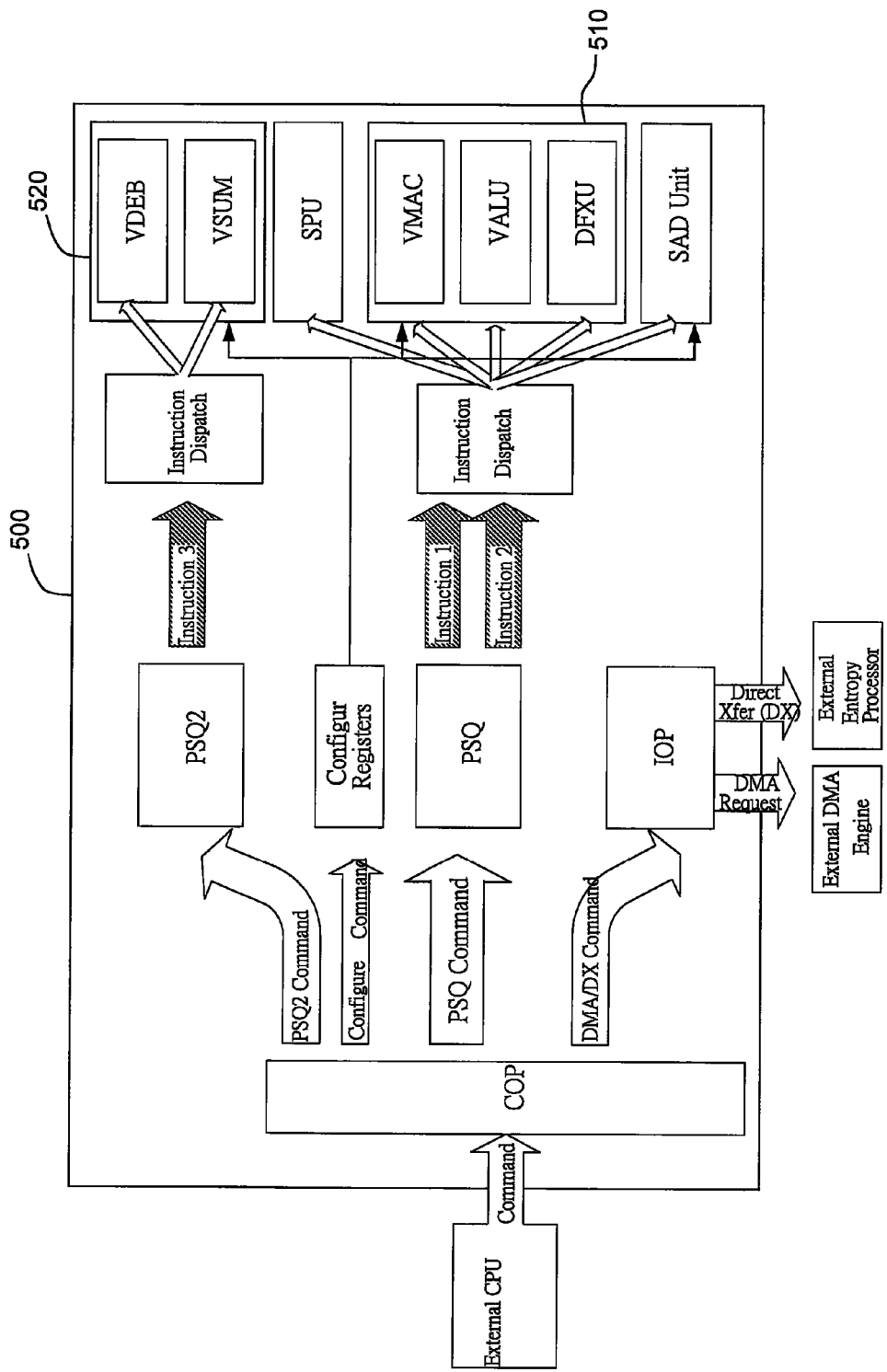
FIG. 5 illustrates one embodiment of a plurality of instruction flows controlling different datapaths in a video signal processor of the present invention.

In one embodiment, a video signal processor 500 of the present invention uses three instruction flows controlling different datapaths, which is described in FIG. 5. To exploit the task/thread parallelism, there are two separate program sequencers. Two of the three instruction flows controlling different datapaths are packed into one long instruction word and issued by one program sequencer and the third one is issued by the other program sequencer. For example, as shown in FIG. 5, two instruction flows are coupled to the program sequencers PSQ and PSQ2, and the other instruction flow is coupled to the IOP for DMA or DX commands. The packed instruction pair exploits the instruction-level parallelism. There are two types of arithmetic functional units, which are connected to the instruction flows from the program sequencers PSQ and PSQ2. One type of the arithmetic functional units includes several homogeneous functional units, which is indicated as reference number 510. These functional units handle the arithmetic operations, including add, sub, multiply, shift, saturate, etc. The arithmetic unit can be split into 16 8-bit or 8 16-bit sub-units so that sixteen or eight data can be processed in one cycle. The splitable arithmetic unit uses the data level parallelism. The other type of the arithmetic functional units includes several heterogeneous functional units, which is indicated as reference number 520. These functional units handle the video specific tasks, including Motion compensated (MC) interpolation, SAD operations for Motion Estimation, deblocking filtering, etc.

The example of instruction flow to control homogeneous datapath. The details of the instructions will be introduced later.

[1] m.pmac0 c6 vm3 {ac0} && a.mov dxc vm5
[2] f.mov vm0 dyb && a.add $8 vm6 {rise}

In a word, VSP exploits all levels of parallelism, including instruction level parallelism (ILP), data level parallelism (DLP) and task level parallelism (TLP).

In one embodiment, the two instructions from PSQ are dispatched and executed in the same cycle according to one of the following combinations:
 (1) SPU|VALU
 (2) VMAC|VALU
 (3) DFXU|VALU
 (4) SPU|VMAC
 (5) SPU|DFXU
 (6) SPU|SAD In one embodiment, the commands from COP can be executed in parallel in the following combinations:
 (1) PSQ2 Command|DMA Command
 (2) PSQ2 Command|DX CommandPSQ Command|DMA Command
 (3) PSQ Command|DX Command
 (4) Configure Command|DMA Command
 (5) Configure Command|DX Command
 (6) DX command|DMA Command
 (7) PSQ Command|PSQ2 Command The second command of the above pairs can be issued and executed even the first command is still ongoing.

In other cases, the command on top of the command data queue is issued only after the previous command has been finished.

There is a synchronization command, called SYNC Command, which will block the following commands inside the Command Data Queue to execute until the previous command has finished.

The Scalar Processing Unit (SPU)

One embodiment of the scalar processing unit (SPU) of a video signal processor of the present invention is described hereafter. The scalar processing unit includes a 16 16-bit general purpose scalar register file (SRF), a 16-bit scalar arithmetic logic unit (SALU) and a multiplication and division operation unit (MUL/DIV). The SALU does scalar arithmetic computation, address register initialization, etc. The SRF is organized as three read port and one write port. The SALU unit reads two source operands from the first two read ports and writes the result to the write port. The third read port provides source operands for the Vector ALU (VALU) unit when the Scalar instruction and Vector instruction are paired. The third read port can also provide the scalar coefficient/operands for VMAC. The SPU also controls the operational modes of DMU. The SPU can support the bit-by-bit multiplication and division. The condition codes can be updated or not for each operation.

The sixteen scalar registers in SRF are called: $0, $1, $2, $3, $4, $5, $6, $7, $8, $9, $a, $b, $c, $d, $e, $f.

Example

The example of moving the data from the third port of SRF to the General Vector Register File (GVRF).

r.add $1 $2 && a.mov $3 vm1 {sr}

The first instruction "r.add $1 $2" means: add $1 and $2 and save result into $2. {sr} is one of the VALU modes, meaning that move from SPU scalar register to General Vector Register File. The vm1 is one of the vector registers in the General Vector Register File (GVRF).

Vector Processing Unit (VPU)

In one embodiment, the vector processing unit (VPU) contains 128-bit Vector ALU (VALU), the 128-bit Vector MAC Unit (VMAC), the Data Format & eXchange Unit (DFXU) and an eight-entry 128-bit or four-entry 256-bit six-port General Purpose Vector Register File (GVRF). The GVRF provides four read ports and two write ports. GVRF can also be used as 16 64-bit registers by the Data Exchange Unit. To support the adaptive property of compression algorithms, the GVRF can be conditionally written based on the previous compare operations. Both the VALU and VMAC can be split as sixteen 8-bit computations or eight 16-bit computations.

The 8-bit computation is used for pixel intensive algorithms, including motion compensation, spatial prediction, vertical/horizontal scaling, etc. The 16-bit computation is used for computations with higher precision, including DCT/IDCT, Quantization, DC/AC prediction etc. Special instructions have been designed to support 32-bit arithmetic operations. To speed up the butterfly operations in DCT/IDCT, the Vector ALU can do eight 16-bit additions and eight 16-bit subtractions in parallel. To speed up the integer transform in some standards, for example, H.264 and VC1, the Vector ALU can do eight 16-b additions with shift and eight 16-b subtractions with shift in parallel. The Vector ALU and Vector MAC operations can be paired. The results from ALU and MAC can be written to different ports of GVRF at the same time.

Figure 6:
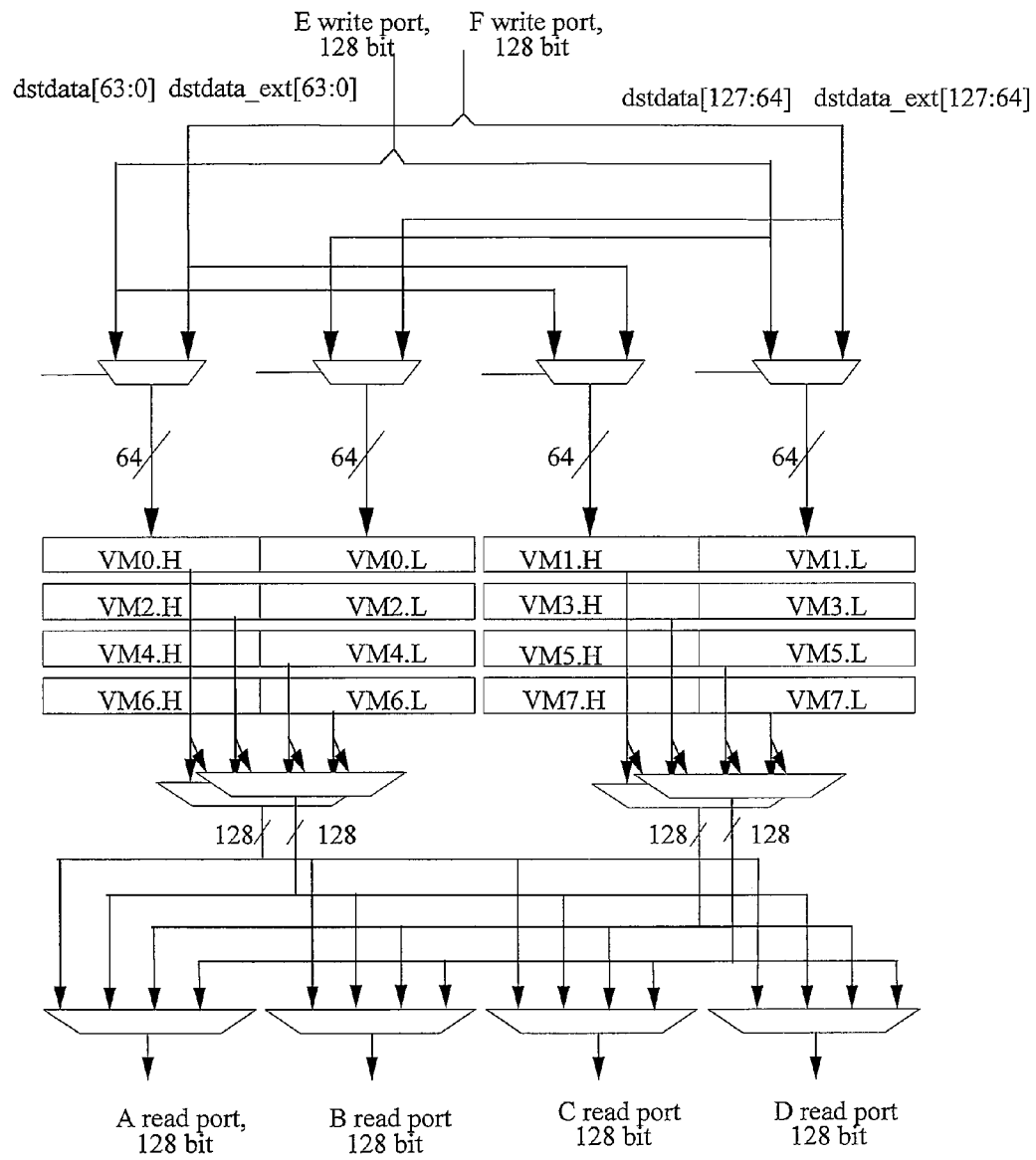
FIG. 6 illustrates one embodiment of a structure of a general purpose vector register file (GVRF).

In one embodiment, the structure of the aforesaid GVRF is shown in FIG. 6, the GVRF has four Read ports (A, B, C and D) and two Write Ports (E and F). In one embodiment, for single-instruction, the read ports A and B and the write port E are used. For a Data Exchange instruction, the read port A or C is used for read port, while the write port E or F is used for write port. For a dual-instruction, A, B and E are used for the first instruction, while C, D and F are used for the second instruction. For instruction which needs three source operands, like a.pkadd, A, B and D read ports and E write port are used.

There are M general purpose vector registers. Each vector register contains 2*N pixels. The number M and N depend on different design as desired. In this embodiment, M=8, N=8 and the pixel is represented in 8-bit. The vector register contains 128-bit. The configuration is big enough to hold one 8×8 block in transform domain which is usually in 16-bit accuracy. There is no need to transfer the data between the GVRF and the DMU engine during the processing of one 8×8 block. The vector registers are named as VM0, VM1, VM2, VM3, VM4, VM5, VM6, VM7, as shown in FIG. 6. Each vector register consists of higher portion and lower portion, for example, the vector register VM0 contains a higher portion VM0,H and a lower portion VM0,L. The higher portion and lower portion have different control logics and can be written independently. The M general purpose vector registers can be paired as M/2 register pair. In this embodiment, there are 4 register pairs: {VM0:VM1}, {VM2: VM3}, {VM4:VM5}, {VM6:VM7}, as shown in FIG. 6.

Figure 7:
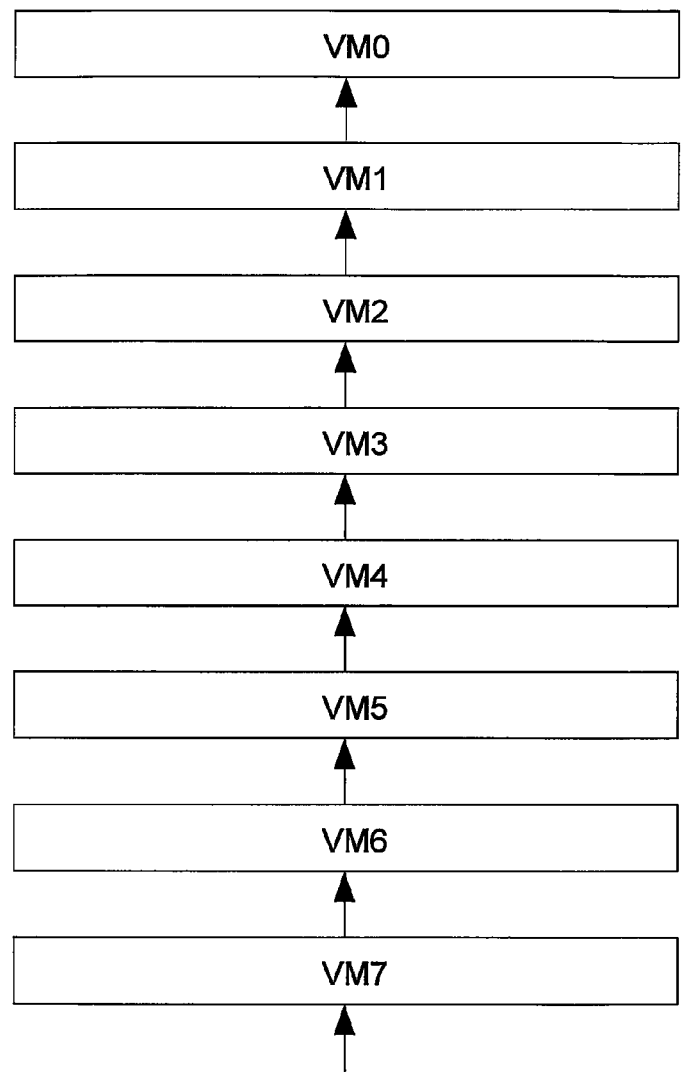
FIG. 7 illustrates one embodiment of M general purpose vector registers operated in a shift register array mode and being configured as a shift register array.

In one embodiment, the M general purpose vector registers can be configured as a shift register array. The shift register array mode is described in FIG. 7. In the shift register array mode, the value in VM1 is written into VM0, the value in VM2 is written into VM1, . . . , the value in VM7 is written into VM6, the value of the write port E is written into VM7. The shift register array mode is useful to save instructions when loading an array from the data memory into the general purpose vector register file.

Figures 8, 9:
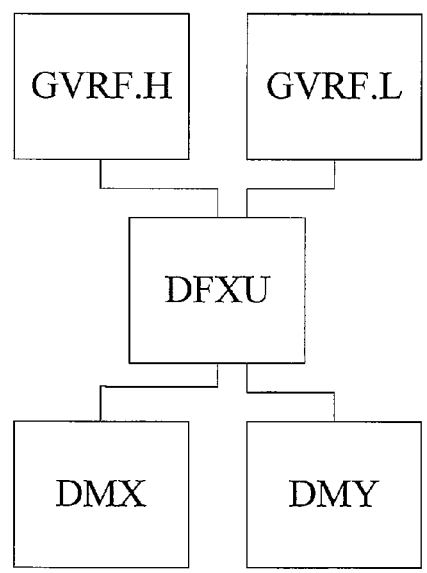
FIG. 8 illustrates one embodiment of organization of a general purpose vector register file (GVRF).
FIG. 9 illustrates one embodiment of data format translation as well as data exchange between a data fatch and exchange unit (DFXU) and a general purpose vector register file (GVRF) and a data memory unit (DMU).

In one embodiment, GVRF is organized as FIG. 8. The GVRF contains eight 128-bit registers: vm0, vm1, vm2, vm3, vm4, vm5, vm6, vm7. These eight registers can also be paired as four 256-bit registers: vm0:vm1, vm2:vm3, vm4:vm5, vm6:vm7. The GVRF can be split into two groups: GVRF.H and GVRF.L. The VMAC, DFXU and VALU access GVRF.H and GVRF.L by using vm0, vm1, . . . vm7. VMAC, DFXU, VALU can access GVRF.L by using vm0.L, vm1.L, vm2.L, . . . vm7.L. The other names for vm0.L, vm1.L, vm2.L, . . . vm7.L are vm8, vm9, . . . , vm15.

In one embodiment, the GVRF can operate in a shift register mode. In the mode, vm7, vm6, . . . vm0 behave like a shift register chain. The vm7 data is copied to vm6, vm6 data is copied to vm5, . . . and vm1 data is copied to vm0. All these data movement happens in just one cycle. This mode is very useful to do the filter-like operations.

Example of Moving from A Port of DMX to GVRF
f.mov dmxa vm7 {shr}
{shr} indicates that GVRF is in the shift register mode. The above instruction implies the following 8 operations:

vm0=vm1 vm1=vm2 vm2=vm3 vm3=vm4 vm4=vm5 vm5=vm6 vm6=vm7 vm7=dmxa

Example of Rotating Registers in GVRF
f.mov vm0 vm7 {shr}
implies the following operations:

vm0=vm1 vm1=vm2 vm2=vm3 vm3=vm4 vm4=vm5 vm5=vm6 vm6=vm7 vm7=vm0

Data Fetch And Exchange Unit (DFXU)

In one embodiment, the data fatch and exchange unit (DFXU) does the data format translation, e.g. 8-bit to 16-bit, as well as data exchange between the GVRF and DMU. As shown in FIG. 9, the DFXU 910 contains a crossbar interconnect network which exchanges vector data between GVRF.H 912, GVRF.L 914, DMX 916 and DMY 918. The possible connection includes a connection between GVRF.H and GVRF.L, between GVRF.H and DMX, between GVRF.H and DMY, GVRF.L and DMX, GVRF.L and DMY, DMX and DMY. The interconnection network can be configured to exchange data in 8-bit or 16-bit chunks. DFXU can be configured in several operating modes, for example, mirror operation mode, a byte permutation mode, a short permutation mode, a DWORD permutation mode, QWORD permutation mode, and right rotate operation mode.

Mirror Operation f.mir #mask VM[n]

mask is 8-b immediate field.

Figure 10A:
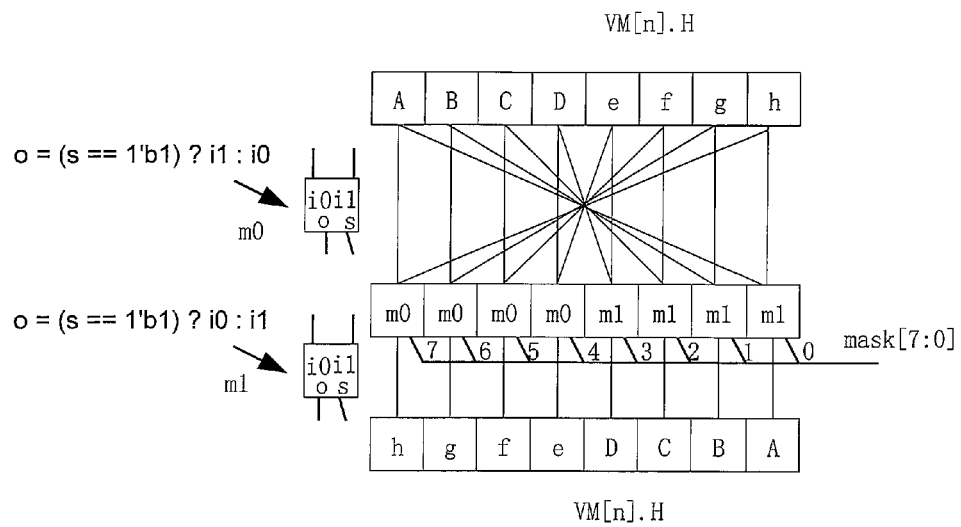
FIGS. 10A and 10B illustrate one embodiment of mirror operation of bytes of an input vector data.
Figure 10B:
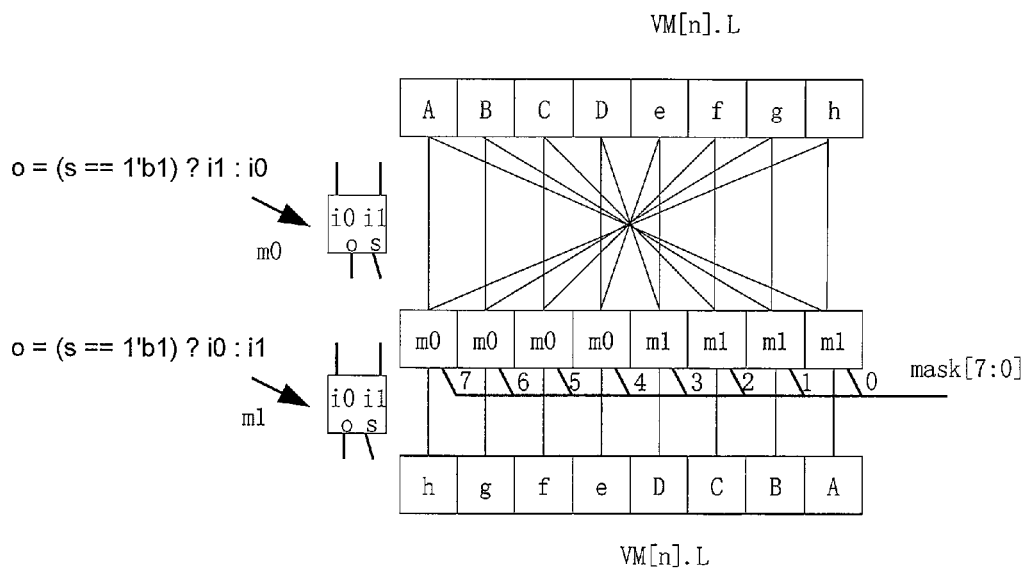

In FIGS. 10A and 10B, A, B, C, D, e, f, g, h are 8 bytes of the input vector data. Mask=0xff means the mirror operations of all the eight bytes are enabled. The result of mirror operation is h, g, f, e, D, C, B, A.

In FIGS. 10A and 10B, there are two types of mask operators: m0 and m1. Each mask operator is controlled by the port named "s." The output port "o" is selected from one of two input ports "i0" and "i1". The 8 bits in the mask are connected to the "s" port of eight mask operators. The most significant bit of the mask controls the most significant byte of the input vector data.

Byte Permutation

Figure 11A:
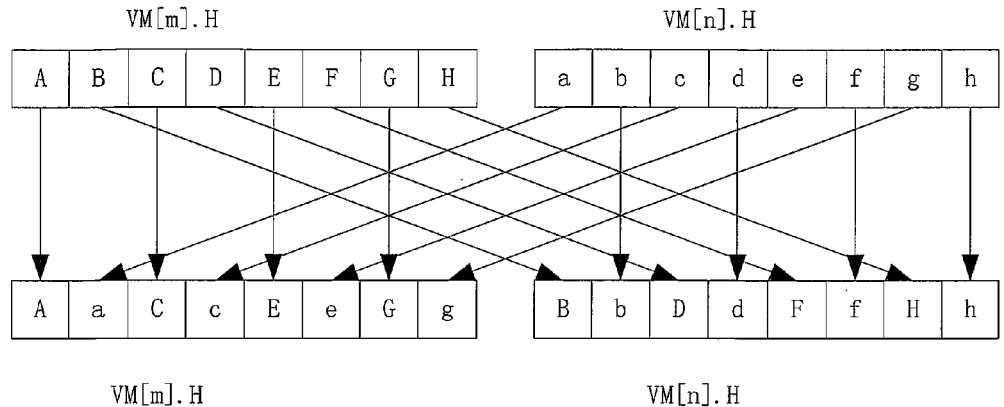
FIGS. 11A and 11B illustrates one embodiment of byte permutation.
Figure 11B:
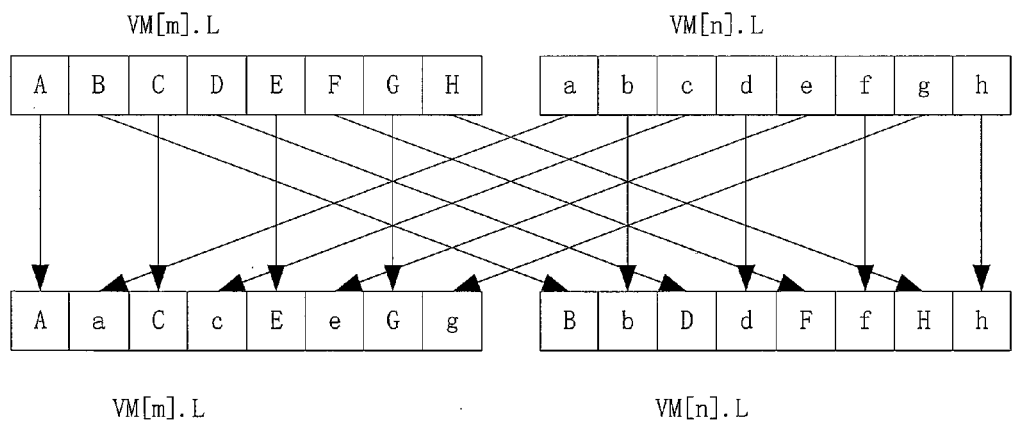

The byte permutation as shown in FIG. 11A and FIG. 11B. is carried out by executing the instruction f.swp VM[n] VM[m] {swpb}

Short Permutation (16-bit)

Figure 12A:
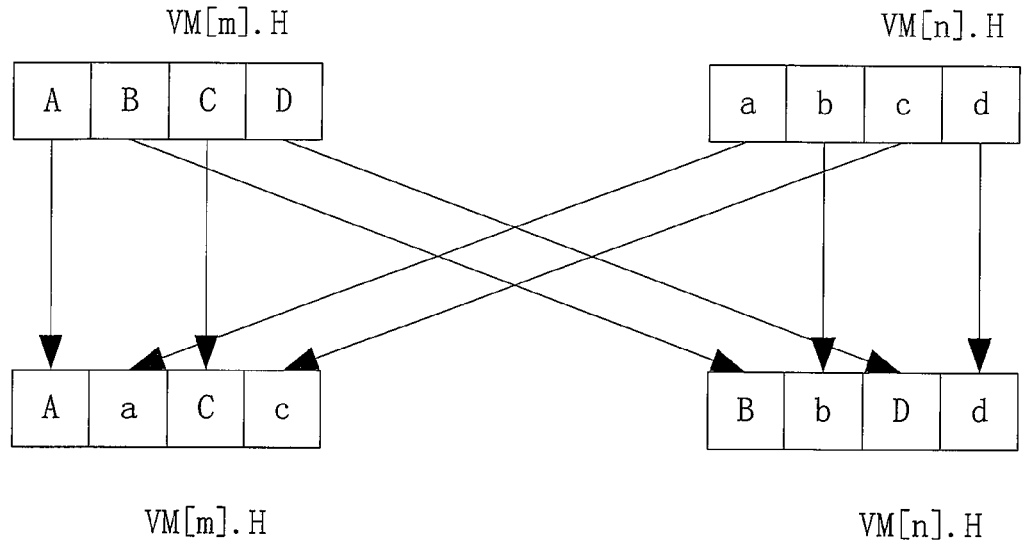
FIGS. 12A and 12B illustrates one embodiment of short permutation.
Figure 12B:
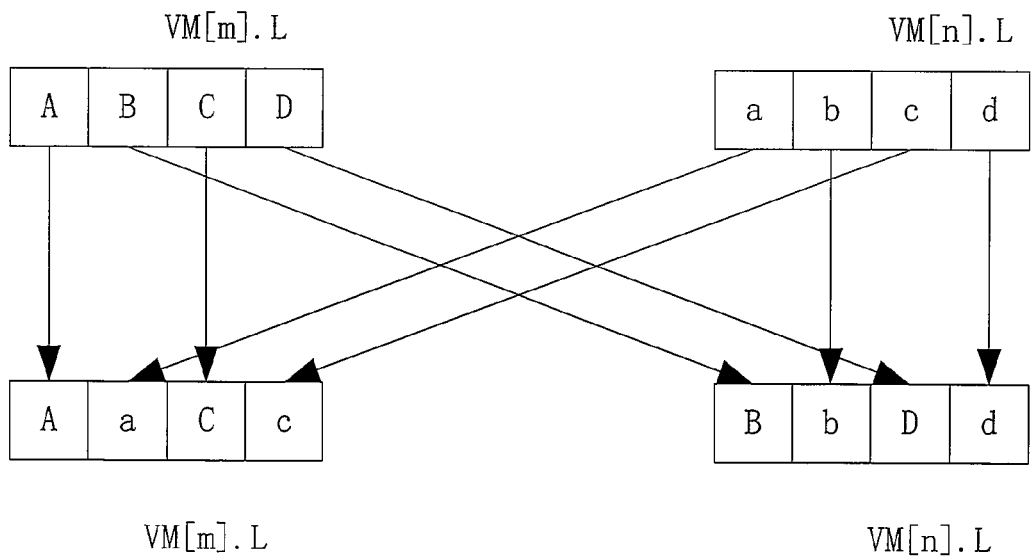

The short permutation as shown in FIGS. 12A and 12B is carried out by executing the instruction f.swp VM[n] VM[m] {swps}

DWORD Permutation (32-b)~

Figure 13A:
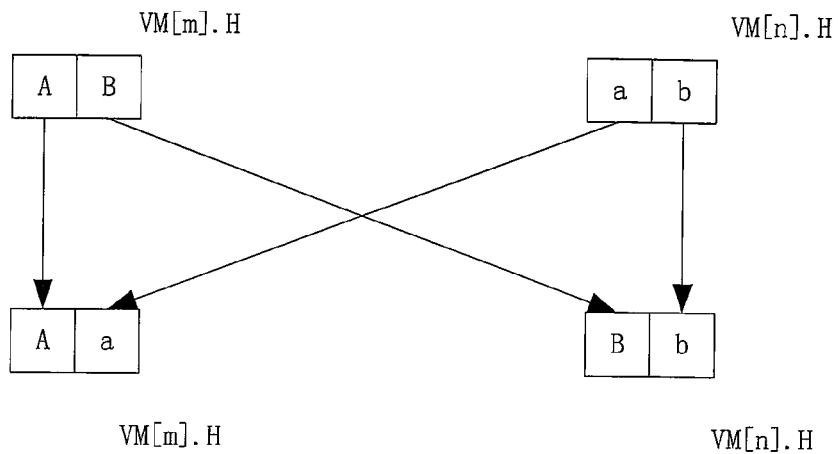
FIG. 13A~13C illustrates one embodiment of DWORD permutation.
Figure 13B:
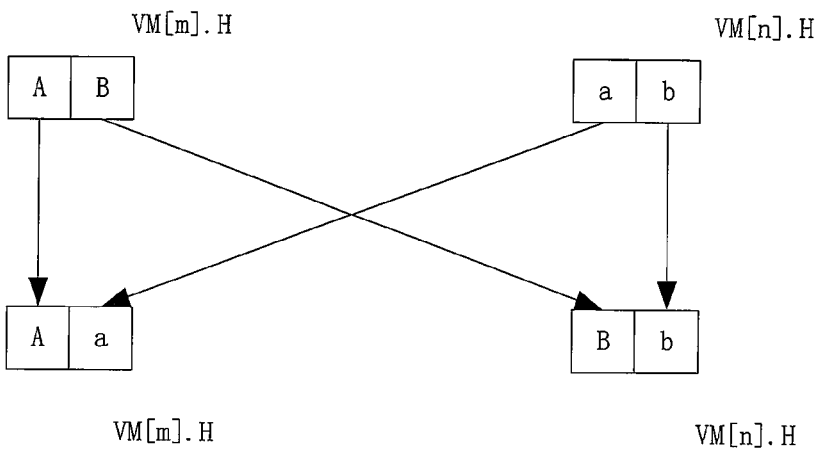
Figure 13C:
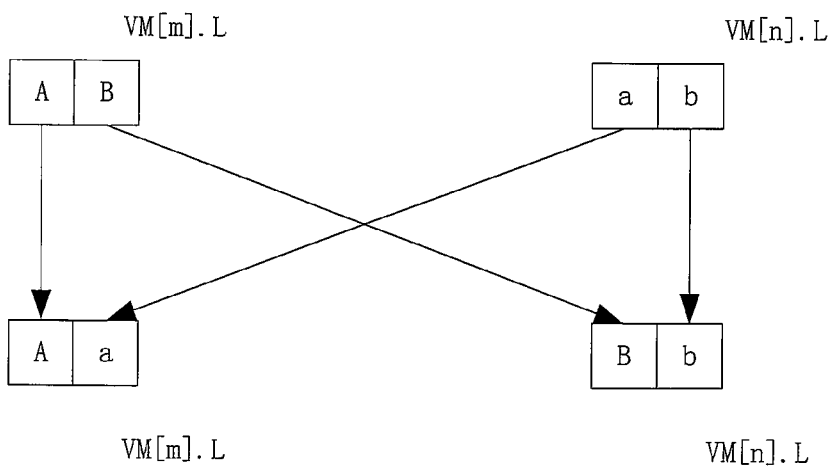

The dword permutation as shown in FIGS. 13A~13C is carried out by executing the instruction f.swp VM[n] VM[m] {swpd}

QWORD Permutation (64-b)

Figure 14:
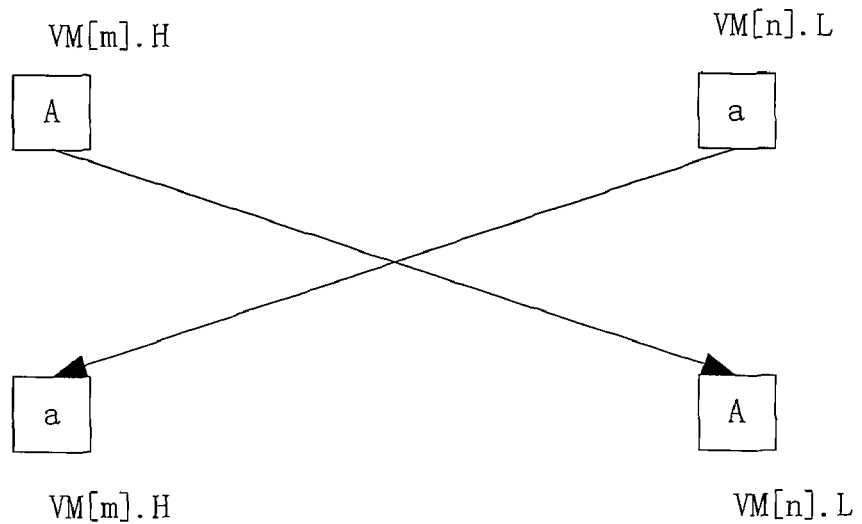
FIG. 14 illustrates one embodiment of QWORD permutation.

The QWORD permutation as shown in FIG. 14 is done by executing the following instruction:

f.mov VM[n] VM[m] {smr}

Right Rotate Operation

Figure 15:
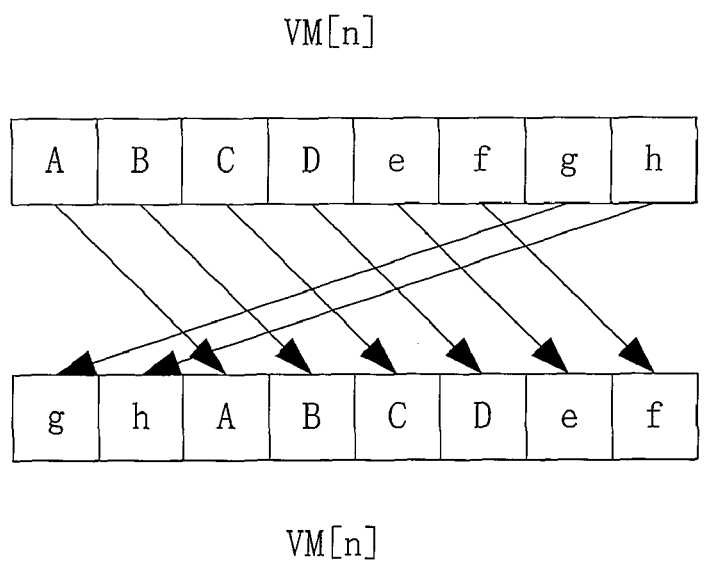
FIG. 15 illustrates one embodiment of byte rotate operation.

The right shift is done on byte units. The shift amount is 1, 2, . . . , 7. The example with shift amount equal to 2 is shown in FIG. 15. It is carried out by executing the instruction:

f.rot #2 VM[n]

Padding Operation

Figure 16:
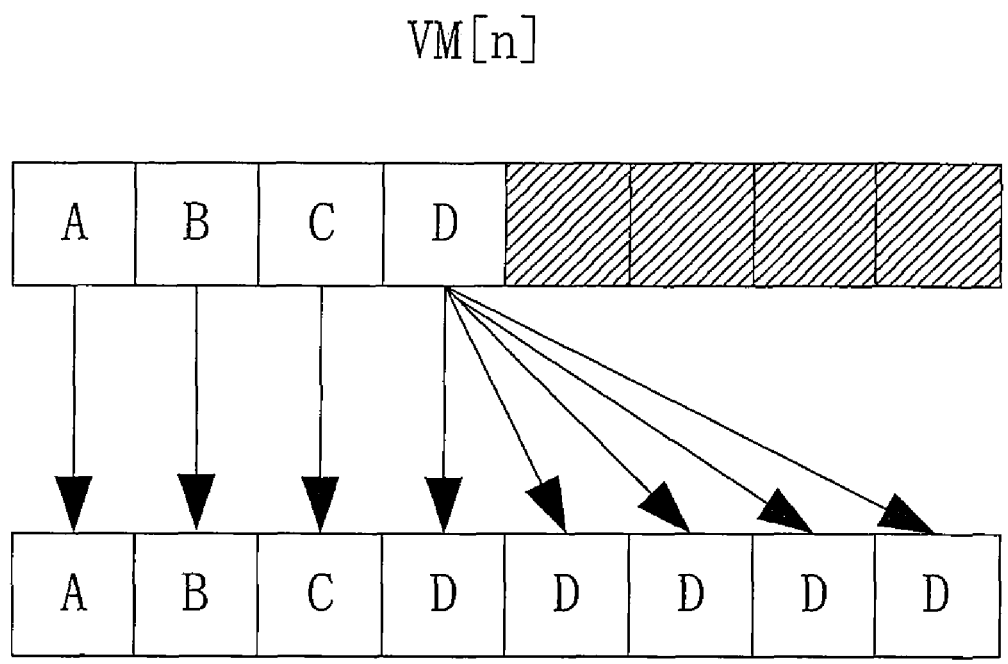
FIG. 16 illustrates one embodiment of padding operation.

In one embodiment, padding operation is shown in FIG. 16. The rightmost pixel is extended by four copies. The padding operation is done in one cycle. It is carried out by executing the following instruction:

a.mov VM[n] VM[m] {div2}

Packing Operation

Figure 17A:
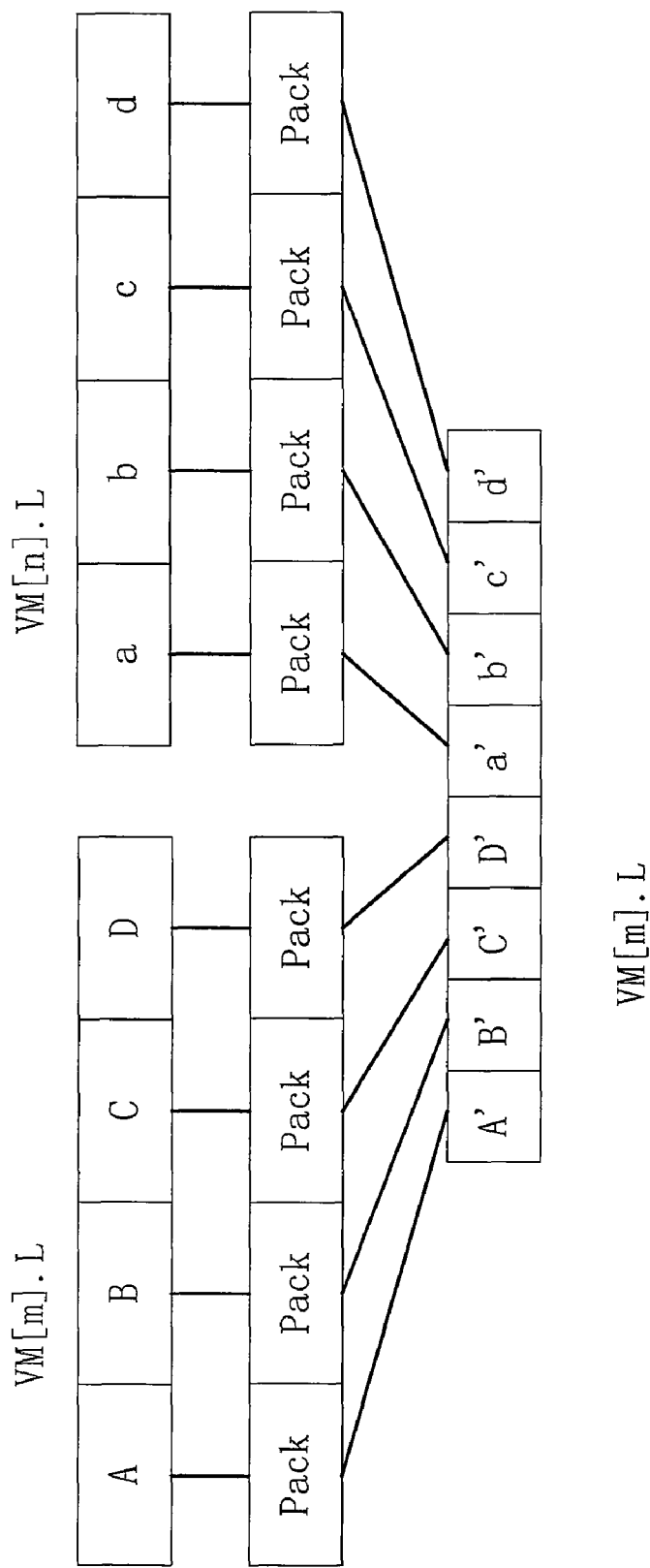
FIGS. 17A and 17B illustrates one embodiment of packing operation.
Figure 17B:
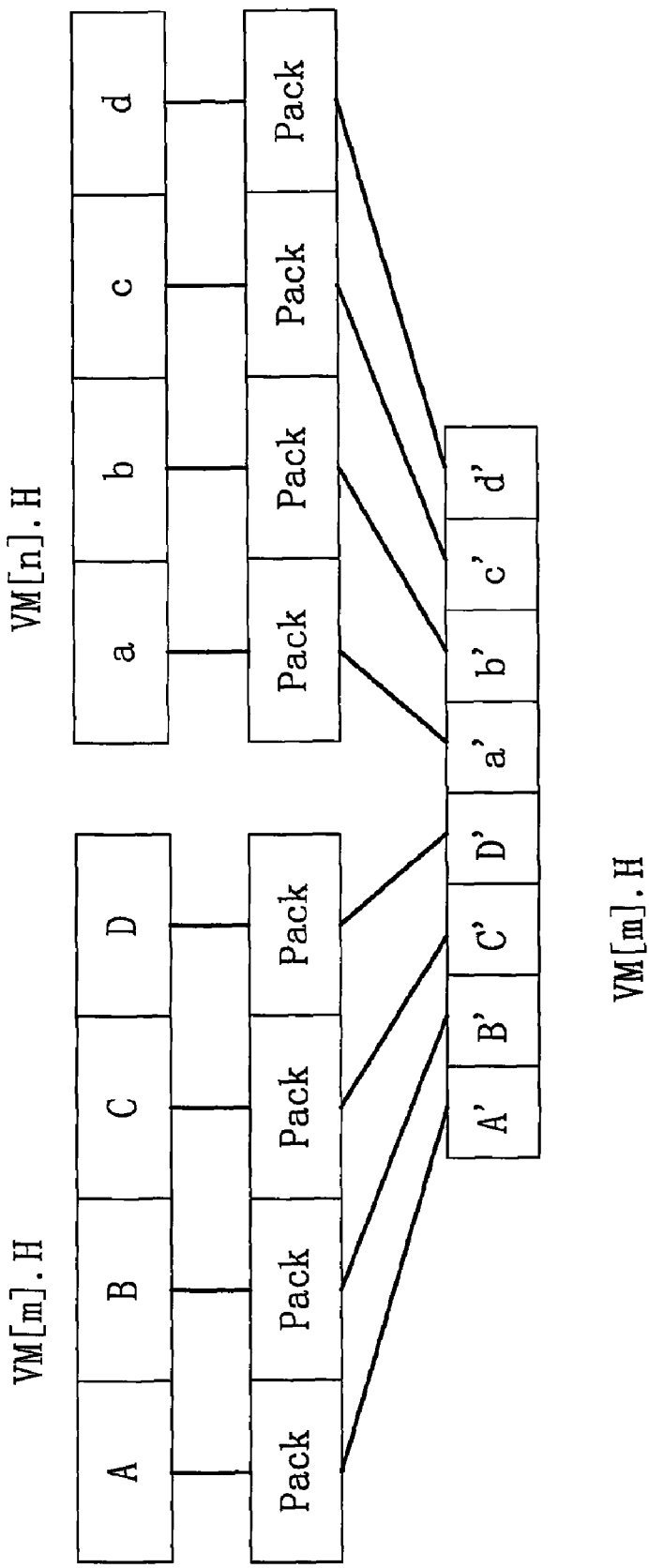

In one embodiment, packing operation is shown in FIGS. 17A and 17B. The behavior of pack unit is:

Pack($x$)=$x$<−128?−128:$x$>127?127:$x$

The packing operation is carried out by executing the following instruction:

f.swp VM[n] VM[m] {pack}

Transpose Operation

In one embodiment, the 4×4 transpose operation is carried out by executing 4 consecutive instructions. Suppose the 4×4 matrix is stored in VM[0] VM[1] VM[2] VM[3]. The 4×4 matrix before and after the transpose is shown in FIG. 18.

The transpose is done by executing four instructions as follows.

f.swp VM[1] VM[0] {swps}
f.swp VM[3] VM[2] {swps}
f.swp VM[2] VM[0] {swpd}
f.swp VM[3] VM[1] {swpd}//

Vector Multiplication and Accumulation Operations Unit (VMAC)

Figure 19:
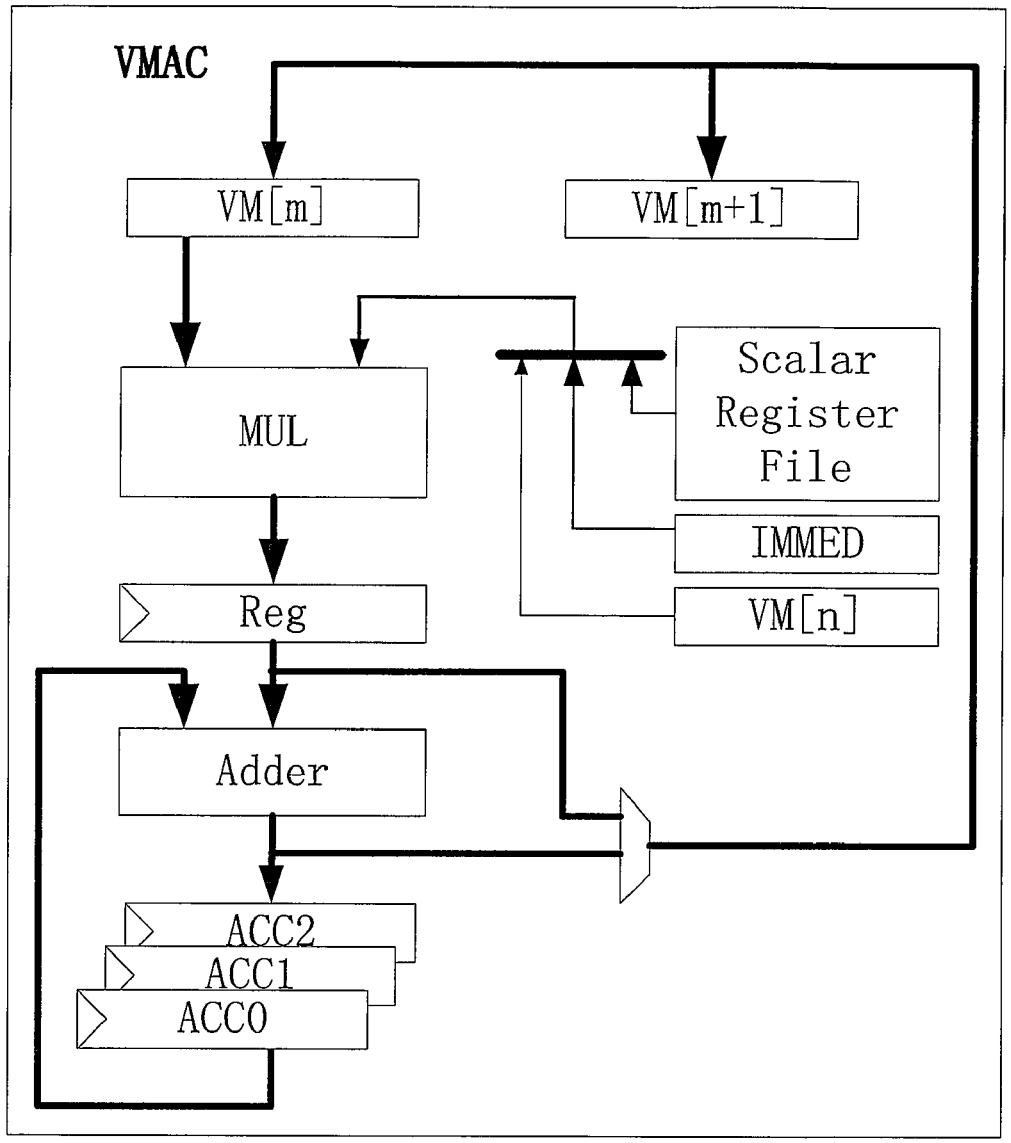
FIG. 19 illustrates one embodiment of a structure of a vector multiplication and accumulation operation unit (VMAC).

In one embodiment, a vector multiplication and accumulation operation unit (VMAC) structure is shown in FIG. 19. VMAC can be split as sixteen 8-bit by 8-bit or eight 16-bit by 16-bit. It supports two rounding modes (round toward zero, and truncate toward zero). Both signed and unsigned multiplications are supported. The multiplication result is stored into one of three 40-bit accumulators or GVRF directly. In FIG. 19, the VMAC includes two VM[m] and VM[m+1], a multiplication unit MUL; a register Reg, an adder Adder and three ACC registers, ACC0, ACC1 and ACC2. One input of the MUL is coupled to the VM[m], and the other input is coupled to one of the data from VM[n], immediate data IMMED or scalar register file. The output of accumulators can be shifted, saturated and then stored into GVRF.

Figure 20:
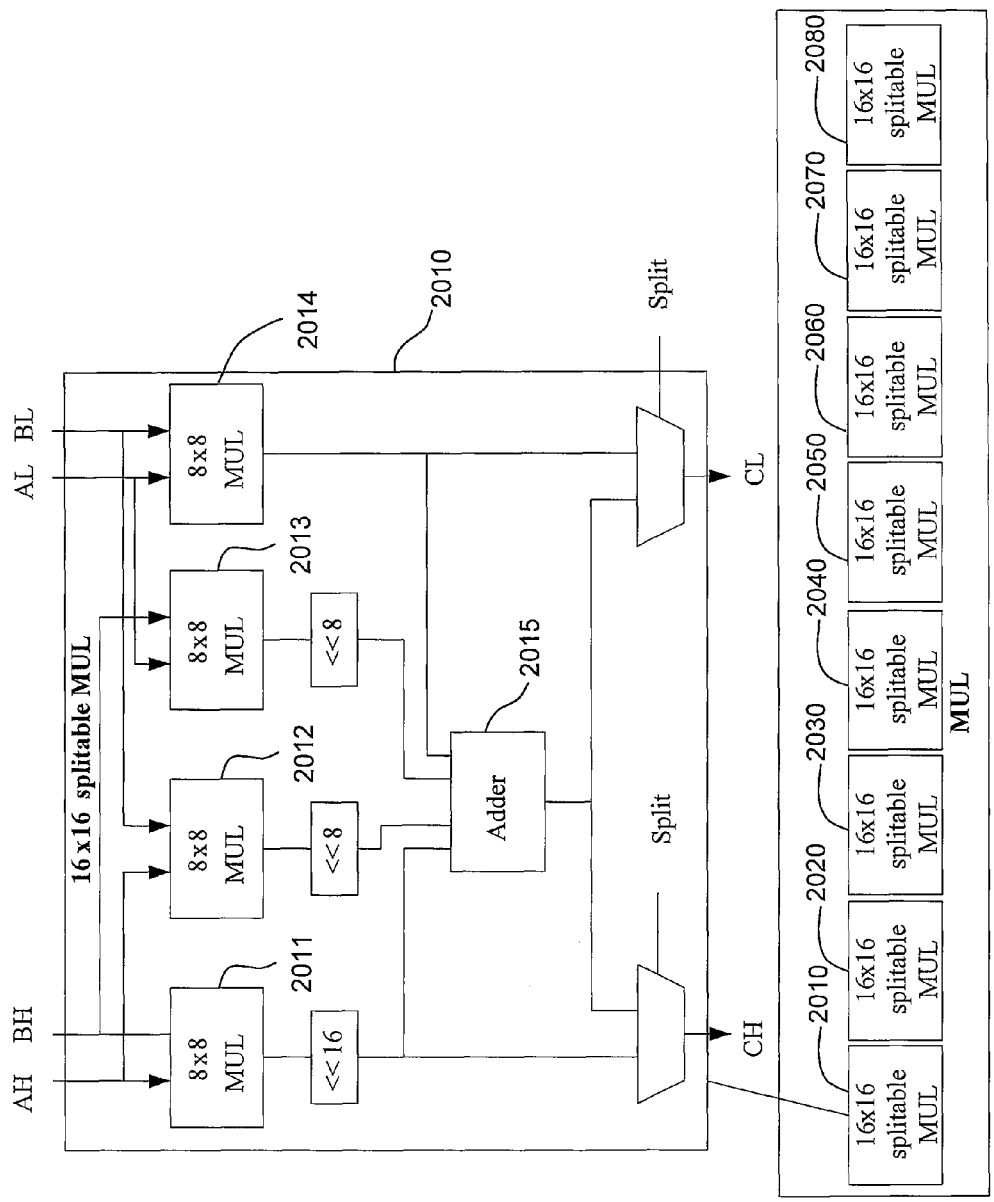
FIG. 20 illustrates one embodiment of a structure of an eight 16-bit by 16-bit splitable MUL.

The eight 16-bit by 16-bit splitable MUL is illustrated in FIG. 20. The VMAC includes eight 16×16 splitable MUL 2010, 2020, 2030, . . . 2080. The structure of the splitable MUL 2010 is shown in FIG. 20 for explanation and the other splitable MUL 2020, 2030, . . . 2080 are the same as the splitable MUL 2010. The splitable MUL 2010 includes four 8×8 multiplication units 2011, 2012, 2013 and 2014.

The 8-bit/16-bit MAC operations are executed by executing the following instructions:

m.pmac/m.mac vm_src vm_src2 {ac} where the instruction m.pmac is 8-bit operation; the M.mac is 16-bit operation; the vm_src and vm_src2 can be one of 8 vector registers, VM0, VM1, . . . VM7; and "ac" can be one of three ACC registers, ACC0, ACC1, ACC2.

m.pmac[0][1][2]/m.mac[0][1][2] vm_src vm_dst wherein the instruction m.pmac is 8-bit operation. The M.mac is 16-bit operation. The vm_src and vm_dst can be one of 8 vector registers, VM0, VM1, . . . VM7. The m.pmac0 and m.mac0 use ACC0 as the source for accumulation. The m.pmac1 and m.mac1 use ACC1 as the source for accumulation. The m.pmac2 and m.mac2 use ACC2 as the source for accumulation.

m.pmac[0][1][2]/m.mac[0][1][2] #imm8 vm {ac} where vm can be one of 8 vector registers, VM0, VM1, . . . VM7; ac can be one of three ACC registers, ACC0, ACC1, ACC2.

m.pmac[0][1][2]/m.mac[0][1][2] c0 vm {ac} where vm can be one of 8 vector registers; VM0, VM1, . . . VM7; ac can be one of three ACC registers; ACC0, ACC1, ACC2. C0 is the $0 of SRF; and C0 can be replaced with $1, $2, . . . $f.

The 8-b MUL or 16-bit MUL operations are executed by executing the following instructions:

m.pmul/m.mul vm_src vm_dst where the instruction m.pmul is 8-bit operation; M.mul is 16-bit operation; vm_src and vm_dst can be one of 8 vm registers, VM0, VM1, . . . VM7 m.pmul/m.mul vm_src vm_src2 {ac} wherein the instruction m.pmul is 8-bit operation; M.mul is 16-bit operation; vm_src and vm_src2 can be one of 8 vector registers, VM0, VM1, . . . VM7; and "ac" can be one of three ACC registers, ACC0, ACC1, ACC2.

m.pmul/m.mul #imm8 vm where vm can be one of 8 vector registers, VM0, VM1, . . . VM7; the result is stored in one of the eight VM registers specified in the instruction dest field.

m.pmul/m.mul c0 vm where vm can be one of 8 vector registers, VM0, VM1, . . . VM7; the result is stored in one of the eight VM registers specified in the instruction dest field. C0 is the $0 of SRF. C0 can be replaced with $1, $2, . . . $f.

Vector Arithmetic Logic Unit (VALU)

Figure 21:
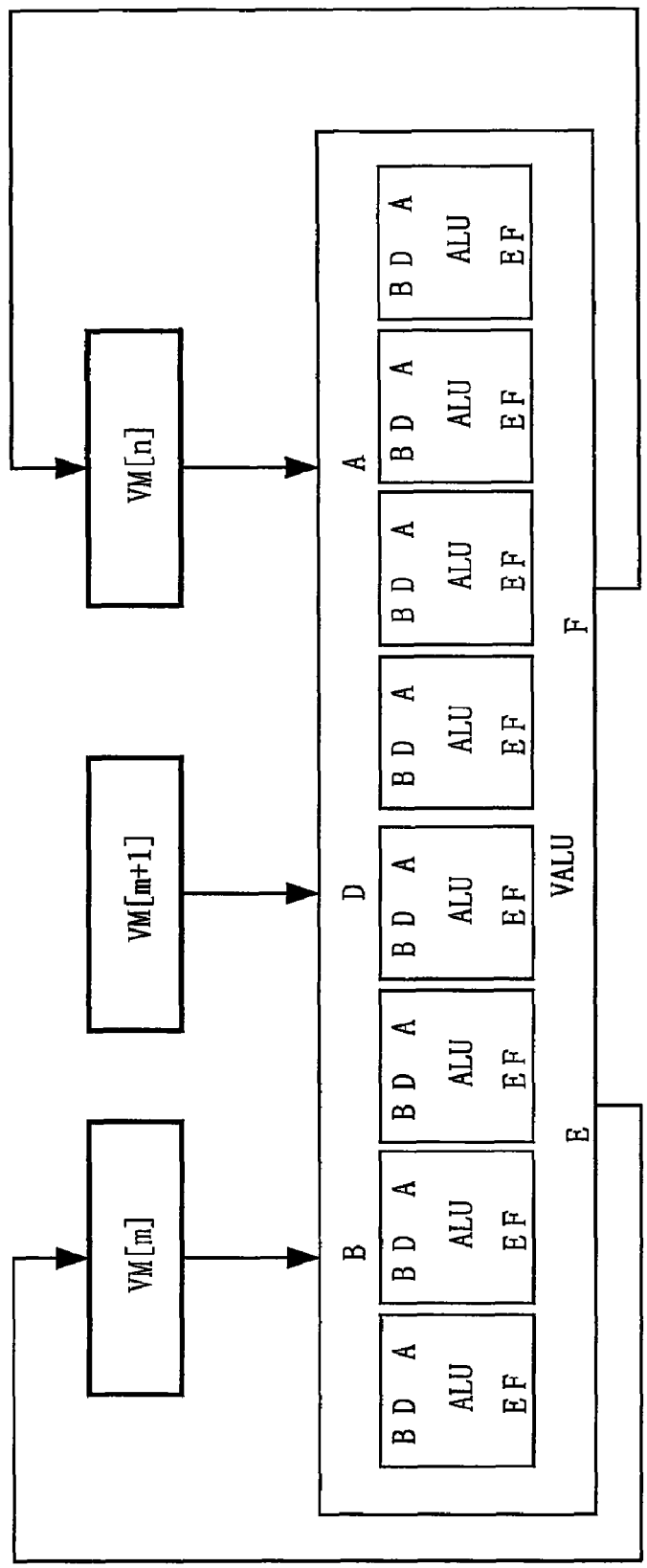
FIG. 21 illustrates one embodiment of a structure of a vector arithmetic logic unit (VALU).
Figure 22:
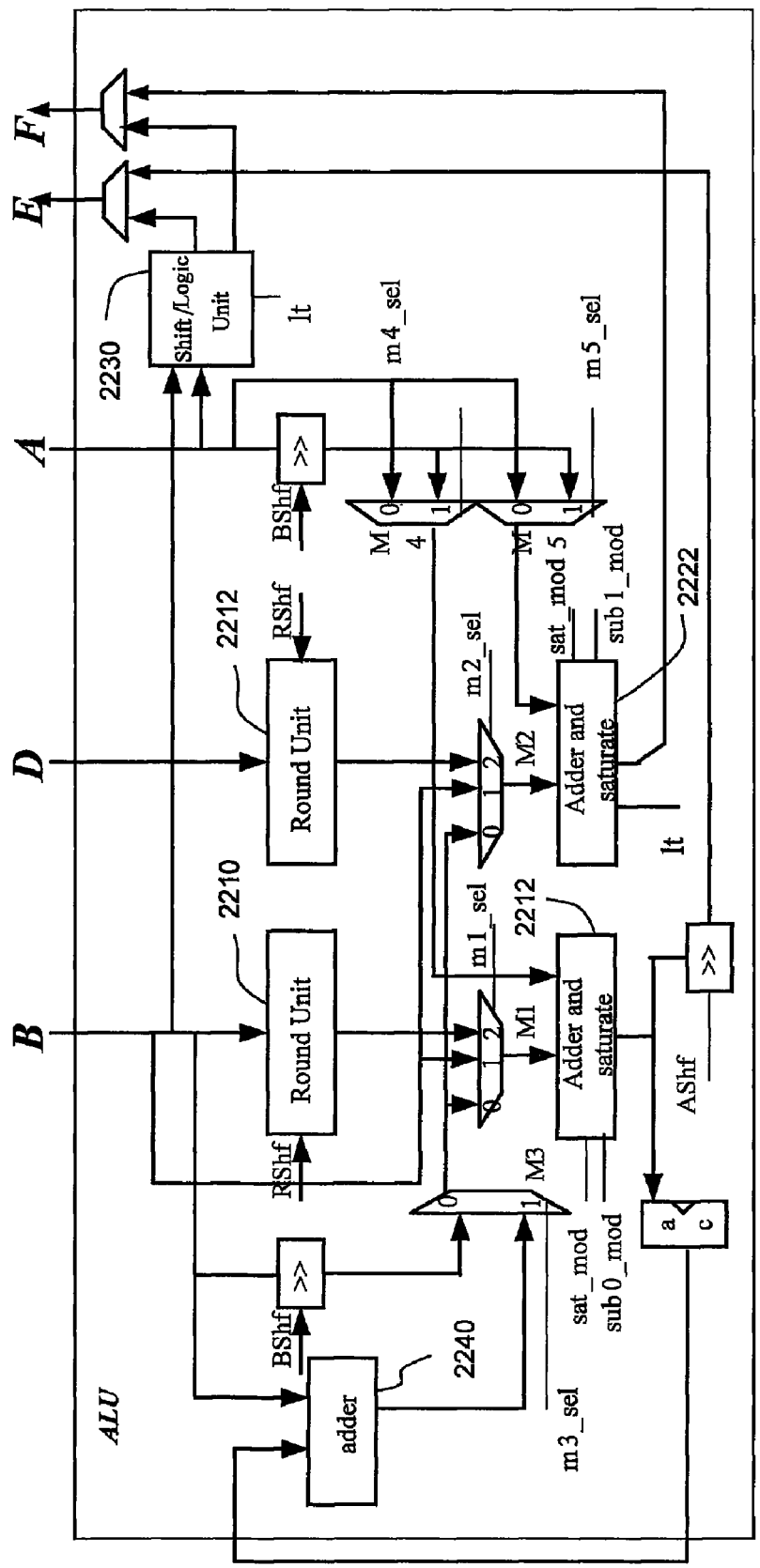
FIG. 22 illustrates one embodiment of a structure of an arithmetic logic unit (ALU) modules.

In one embodiment, a vector arithmetic logic unit (VALU) structure is shown in FIG. 21. The VALU structure 2100 includes eight arithmetic logic unit (ALU) modules 2110~2180. One embodiment of the ALU module structure is shown in FIG. 22. One ALU can be split as two 8-b arithmetic operations. The VALU has very high bandwidth computation throughput. It can take in two 128-b inputs and output two 128-b arithmetic results (add/sub or min/max) at the same time. VALU supports saturation and average operations. In one embodiment, the ALU module structure 2200 includes two round Units 2210 and 2212, two add and saturate units 2220 and 2222, one shift and logic unit 2230, and one adder unit 2240.

Figure 23:
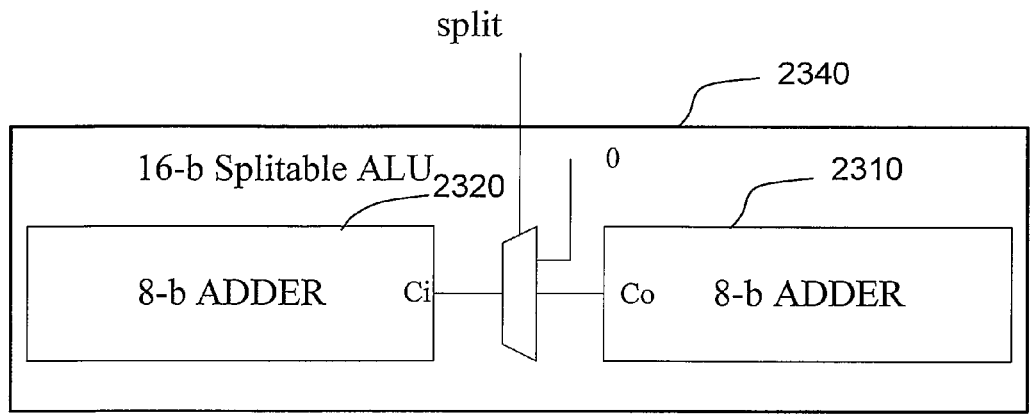
FIG. 23 illustrates one embodiment of a structure of a splitable Adder supporting 8-bit operation.

In one embodiment, the 8-bit operation is used when a {split} mode is specified. For example, a.add vm0 vm1 {split} means 8-bit Add operation, or sixteen 8-bit Add operations are done in one cycle. A.add vm0 vm1 means 16-bit add operation, or eight 16-bit add operations are done in one cycle. The 8-bit operations are supported by splitable Adder as shown in FIG. 23. The splitable Adder 2240 includes two 8-bit adders 2310 and 2320.

Figure 24:
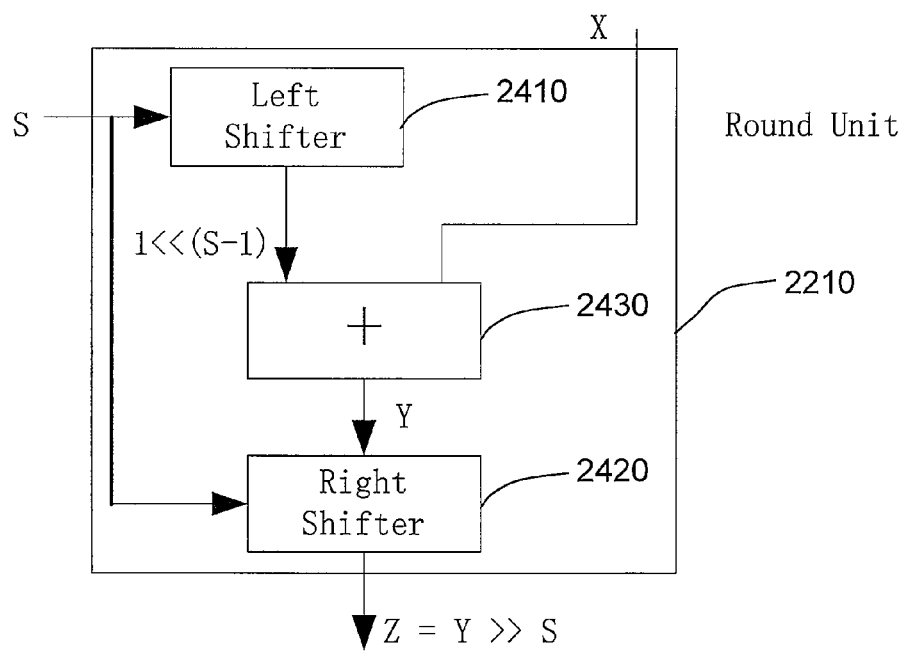
FIG. 24 illustrates one embodiment of the structure of a round unit.

In one embodiment, the structure of the round units 2210 or 2212 is shown in FIG. 24, and the round unit 2210 is shown as an example. In the round unit 2210, for example, there are one left shifter 2410, one right shifter 2420 and one adder 2430 inside the round unit 2210. The logic of Round Unit is identical to Z=(X+(1<<(S−1)))>>S, where S and X are the inputs of the round unit 2210.

In one embodiment, the shift and logic unit 2230 has Min-max logics inside. The minmax logics are identical to: Z1= lt ? a:b, where lt=(a<b), which is generated from the Adder and Staturate Unit. Z2=lt ? b:a. Z1 and Z2 are routed to the E and F port of the VALU.

In one embodiment, there are Boolean logics including AND, OR, XOR, ANDN inside the Shift and Logic Unit 2230. In one embodiment, there is one 16-b shifter inside Shift and Logic Unit 2230. It is configurable for unsigned and signed shift operations. The direction of shift is also configurable.

Figure 25:
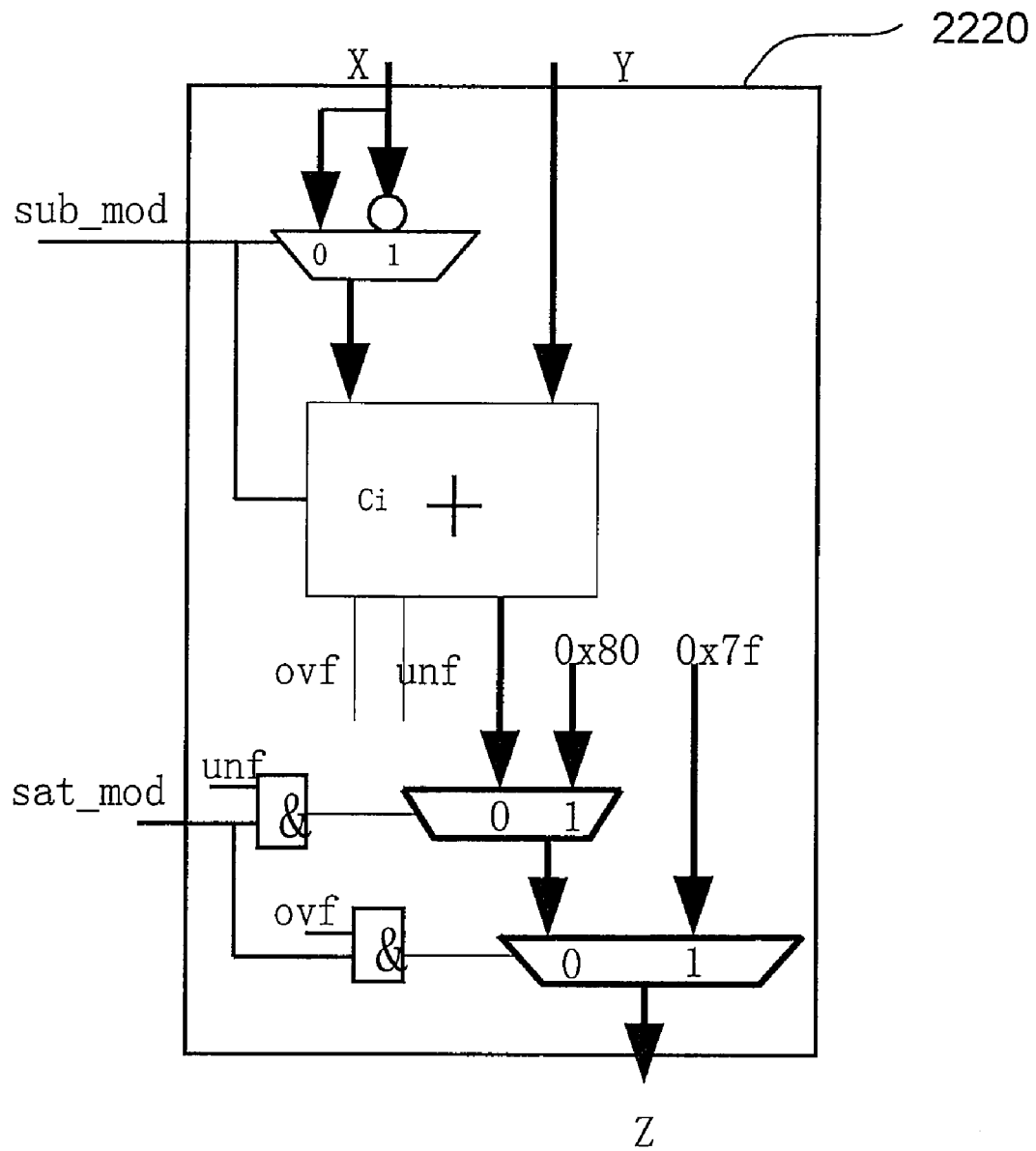
FIG. 25 illustrates one embodiment of an adder and saturate unit.

In one embodiment, there are one adder and three multiplexers inside the Adder and Saturate Unit 2220 or 2222, as shown in FIG. 25. The logic of Adder and Saturate Unit 2220 or 2222, for example, is identical to Z=Y−X when sub_mod=1. The logic of Adder and Saturate Unit 2220 or 2222 is identical to Z=X+Y when sat_mod=0 and sub_mod=0. The logic of Adder and Saturate Unit 2220 or 2222 is identical to Z'=X+Y. Z=Z'<−128 ?−128:Z'>127 ? 127:Z' when sat_mod=1 and sub_mod=0.

In one embodiment, the AShf and Bshf, as shown in FIG. 22, are decoded from the instructions as in Table 1 and Table 2. RShf is derived from the configure registers.

TABLE 1

AShf Decode Logic

| Instruction | AShf |
|---|---|
| a.avg {div2} | 1 |
| a.avg {div4} | 2 |
| Others | 0 |

TABLE 2

BShf Decode Logic

| Instruction | BShf |
|---|---|
| a.add {bfy} | 0 |
| a.add {div2} | 1 |
| a.add {div4} | 2 |

The VALU can be configured to do several operations optimized for video decoding. Please refer to FIG. 22 for further explanation.

Pack and Add Operation (a.pkadd)

In one embodiment, Pack and add operation is carried out by executing a.pkadd instruction as follows.

a.pkadd VM[n] VM[m]:VM[m+1]

VALU Control of a.pkadd

When executing the a.pkadd instruction, the input data from port "2" of M1 and "2" of M2 are selected and routed to the Adder and Saturate Unit 2212 and 2222. The input data from port "0" of M4 and "0" of M5 are selected and routed to Adder and Saturate Unit 2212 and 2222. The control signals are configured as following Table 3.

TABLE 3

| Control signals when using a.pkadd ||
|---|---|
| M1_sel | 2'b10 |
| M2_sel | 2'b10 |
| M3_sel | 1'bx |
| M4_sel | 1'b0 |
| M5_sel | 1'b0 |
| Sat_mod | 1'b0. |
| Sub0_mod | 1'b0. |
| Sub1_mod | 1'b0. |
| Rshf | 2'bxx |
| Bshf | 2'bxx |

Butterfly Operation

There are three types of Butterfly operations.

$$a=a-b, b=a+b \quad [B0]$$

$$a=(a>>1)-b, b=a+(b>>) \quad [B1]$$

$$a(a>>2)-b, b=a+(b>>2) \quad [B2]$$

In one embodiment, these three operations are carried out by executing the following three instructions respectively.

a.add {bfy} a.add {div2}, a.add {div4}.

With the instruction a.add {div2/div4}, two right shifts, one add, one substract operations are done in one cycle.

Butterfly Operation Using Traditional Instruction

With the traditional instruction, the B1 operation needs the following six instructions:

Supposed a and b are stored inside VM0 and VM1.

```
a.mov vm0 vm2 // copy of a
a.mov vm1 vm3 // copy of b
a.shf #1 vm0; // a >> 1
a.shf #1 vm1; // b >> 1
a.sub vm0 vm3 // vm3 <= (a>>1) − b
a.add vm1 vm2 // vm2 <=a + (b>>1)
```

With the traditional instruction, the B2 operation needs the following six instructions:

Supposed a and b are stored inside VM0 and VM1.

```
a.mov vm0 vm2 // copy of a
a.mov vm1 vm3 // copy of b
a.shf #2 vm0; // a >> 2
a.shf #2 vm1; // b >> 2
a.sub vm0 vm3 // vm3 <= (a>>2) − b
a.add vm1 vm2 // vm2 <=a + (b>>2)
```

Butterfly Operation Using a.add div2/div4

With a.add {div2}, only one instruction is needed to do B1.

a.add vm0 vm1 {div2}; //vm0<=(a>>)−b; vm1<−=a+ (b>>1)

With a.add {div4}, only one instruction is needed to do B2.

a.add vm0 vm1 {div4}; //vm0<=(a>>2)−b; vm1<=a+ (b>>2)

VALU Control of a.add {bfy}

When executing the a.add {bfy} instruction, the control signals are configured as Table 3.

TABLE 3

| control signals when executing a.add bfy instruction | |
|---|---|
| M1_sel | 2'b01 |
| M2_sel | 2'b01 |
| M3_sel | 1'bx |
| M4_sel | 1'b0 |
| M5_sel | 1'b0 |
| Sat_mod | 0 |
| Sub0_mod | 1'b0 |
| Sub1_mod | 1'b1 |
| Rshf | 2'bxx |
| Bshf | 2'bxx |

VALU Control of a.add {div2}

When executing the a.add {div2} instruction, the control signals are configured as Table 4.

TABLE 4

| control signals when executing a.add div2 instruction | |
|---|---|
| M1_sel | 2'b00 |
| M2_sel | 2'b01 |
| M3_sel | 1'b0 |
| M4_sel | 1'b0 |
| M5_sel | 1'b1 |
| Sub0_mod | 1'b0 |
| Sub1_mod | 1'b1 |
| Rshf | 2'bxx |
| Bshf | 2'b01 |

VALU Control of a.add {div4}

When executing the a.add {div4} instruction, the control signals are configured as Table 5.

TABLE 5

| control signals when executing a.add div4 instruction | |
|---|---|
| M1_sel | 2'b00 |
| M2_sel | 2'b01 |
| M3_sel | 1'b0 |
| M4_sel | 1'b0 |
| M5_sel | 1'b1 |
| Sub0_mod | 1'b0 |
| Sub1_mod | 1'b1 |
| Rshf | 2'bxx |
| Bshf | 2'b10 |

Average Operation

There are three types of Average operations.

$$b=(a+b+1)/2$$

$$ac=a+b+1$$

$$b=(a+b+ac+1)/4$$

ac is an accumulation register in the VALU. It stores the temporary result from the Adder and Saturate Unit.

In one embodiment, these three operations are carried out by executing the following three instructions respectively:

a.avg {div2}, a.avg {ac}, a.avg {div4}.

Use Traditional Instruction on a 8-Bit Datapath

With traditional ALU instruction, to average 4 pixels (each pixel in 8-bit), the following 20 instructions are needed. There are several instructions used to save the carry bits.

Supposed the 4 pixels, pix_a, pix_b, pix_c, pix_d are stored in VM0, VM1, VM2, VM3.

a.mov vm0 vm4 // copy of a
a.mov vm1 vm5 // copy of b
a.mov vm2 vm6 // copy of c
a.mov vm3 vm7 // copy of d
a.and #3 vm4
a.and #3 vm5
a.and #3 vm6
a.and #3 vm7
a.add vm4 vm5 {split} // {split} indicates 8-bit ALU is used
a.add vm6 vm7 {split} //
a.add vm5 vm7 {split} //
a.add #2 vm7 {split} // (pix_a + pix_b + pix_c + pix_d + 2)
a.shf #2 vm0
a.shf #2 vm1
a.shf #2 vm2
a.shf #2 vm3
a.add vm0 vm1 {split} // {split} indicates 8-bit ALU is used
a.add vm2 vm3 {split} //
a.add vm1 vm3 {split} //
a.add vm7 vm3 // vm3 = (a+b+c+d+2)>>2

Use a.avg {div4} to do Four Pixel Average on 8-Bit Datapath.

When use a.avg {div4} to do four pixel averages on 8-bit datapath, it provides an efficient way to do 4 pixel average operations on the 8-bit ALU datapath. To do 4 pixel average, only two instructions are needed as follows:

a.avg vm0vm1{ac}// result is stored in ac, ac=a+b+1 a.avg vm2vm3{div4}// result is store in vm3, vm3=(c+d+ac+1)>>2

Considering VALU has 128-bit data width, VALU will do the 16 4-pixel average operations in two instruction cycles.

VALU Control of a.avg {div2} a.avg {ac}

When executing the a.avg {div2} or {ac} instruction, the control signals are configured as Table 6.

TABLE 6

| control signals when executing a.avg div2 instruction | |
|---|---|
| M1_sel | 2'b01 |
| M2_sel | 2'bxx |
| M3_sel | 1'bx |
| M4_sel | 1'b0 |
| M5_sel | 1'bx |
| Sub0_mod | 1'b0 |
| Sub1_mod | 1'bx |
| Rshf | 2'bxx |
| Bshf | 2'bxx |
| AShf | 2'b01 |

VALU Control of a.avg {div4}

When executing the a.avg {div4} instruction, the control signals are configured as Table 7.

TABLE 7

| control signals when executing a.avg div4 instruction | |
|---|---|
| M1_sel | 2'b00 |
| M2_sel | 2'bxx |
| M3_sel | 1'b1 |
| M4_sel | 1'b0 |
| M5_sel | 1'bx |
| Sub0_mod | 1'b0 |
| Sub1_mod | 1'bx |
| Rshf | 2'bxx |
| Bshf | 2'bxx |
| AShf | 2'b10 |

The Data Memory Unit (DAMU)

In one embodiment, the DMU 270, as shown in FIG. 2, stores block data or immediate data generated by the VPU 240 or the PPU 250. The DMU 270 has two independent memory ports, called DMX 271 and DMY 272. Both DMX 271 and DMY 272 can be accessed by the external DMA controller as well as the VPU 240 or the PPU 250. If the DMA controller and the VPU 240 or the PPU 250 access the same port of the DMU 270, the DMA controller has higher priority. The DMU 270 also contains a programmable Data Address Generator (DAG) 273. The DAG 273 is programmed by the SPU 230 and generates the address for the DMX 271 and DMY 272.

Figure 26:
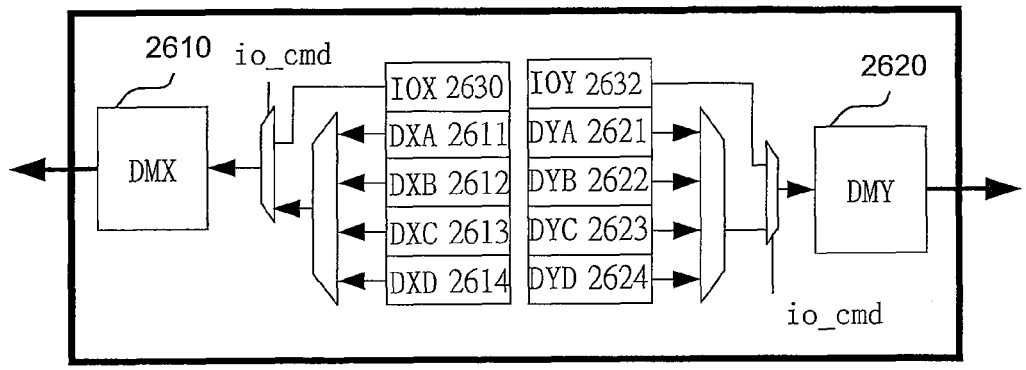
FIG. 26 illustrates one embodiment of a structure of DMU architecture.

Please refer to FIG. 26, which shows a DMU structure. In one embodiment, the DMU 2600 includes a byte addressable local data memory DMX 2610, four reconfigurable data address generators (DXA, DXB, DXC and DXD) 2611, 2612, 2613, 2614 and one IO address generator (IOX) 2630. The four reconfigurable data address generators 2611, 2612, 2613, 2614 (DXA, DXB, DXC and DXD) can be loaded with a value from a general scalar register file (the value is extended by four copies before it is written in the DMU 2600). There are 4 ports of the DMX 2600, called, DMXA, DMXB, DMXC, DMXD, which are controlled by the reconfigurable data address generators DXA, DXB, DXC, and DXD respectively. The DMXA, DMXB, DMXC, DMXD can be used as read or write ports. Accordingly, the DXA, DXB, DXC, and DXD can be used as read or write address generators.

DMX

Figure 27:
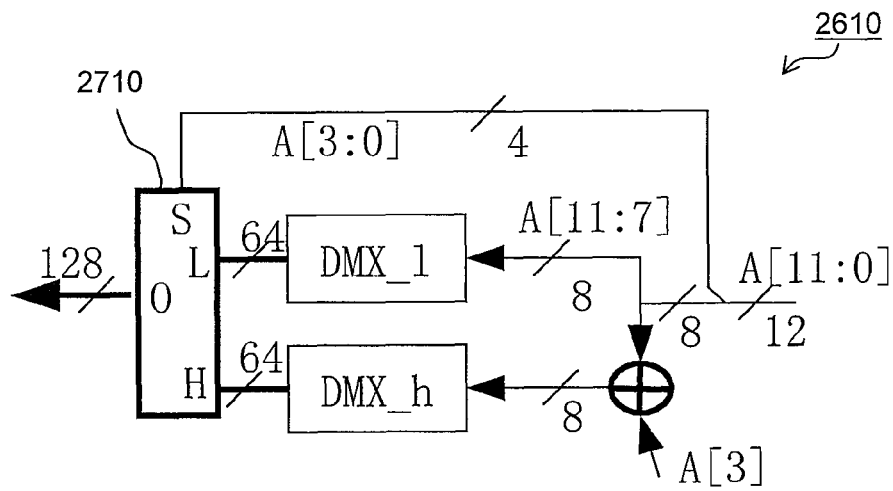
FIG. 27 illustrates one embodiment of a structure of DMX.

Please refer to FIG. 27, which shows the structure of the DMX 2610. The input of the DM 2610 is N pixels and output of the DMX is 2*N pixels. In this embodiment, N=8, and the output of the DMX 2610 is 128 pixels. The DMX 2610 includes two memory unit DMX_1 and DMX_h and a byte aligner 2710. The memory units DMX_1 and DMX_h can be two pieces of a static random access memory (SRAM).

Figure 28:
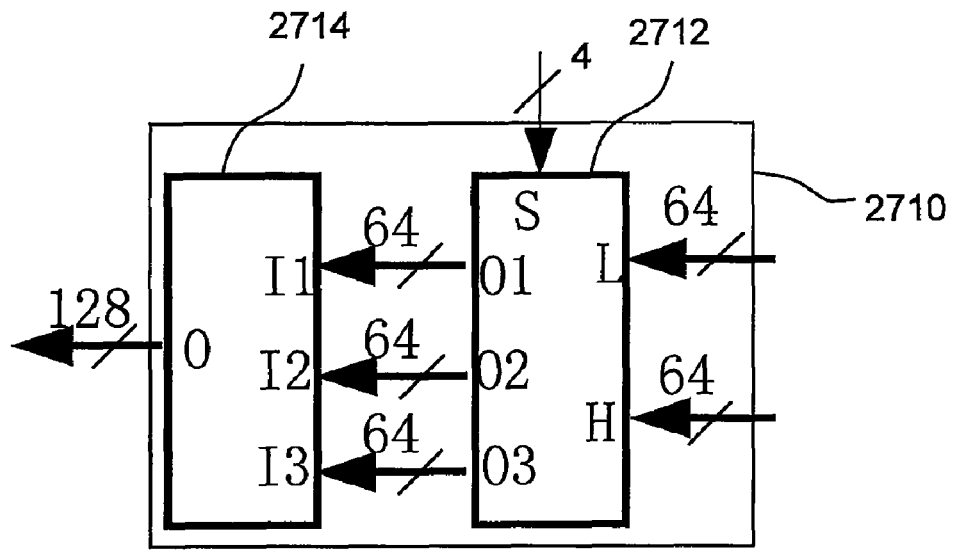
FIG. 28 illustrates one embodiment of a structure of a byte aligner.

In one embodiment, the byte aligner structure is shown in FIG. 28. The byte aligner 2710 has three inputs, i.e. 64-bit H port, 64-bit L port, and 4-bit S port, and one output, i.e. 128-bit 0 port. The byte aligner 2710 is implemented as a left shifter and an output generator. The left shifter has the following identical operations:

{O3[63:0], O2[63:0], O1[63:0]}={H[63:0], L[63:0]}<<{S[3:0], 3'b0}.

The output generator has the following identical operations:

$O[63:0] = \{I2[63:0], I1[63:0]\} | \{64'h0, I3[63:0]\}$.

The DMX 2610 is byte addressable. The input of the DMX 2610 is 64-bit and the output of the DMX 2610 is 128-bit. The address of the DMX 2610 has a unit of one byte. The DMX 2610 is configured as 160×16 Bytes or 80×32 Bytes single port SRAM depending on the mode register setting. Other configuration is possible.

Internal 64-b QWORD Access

Figure 29:
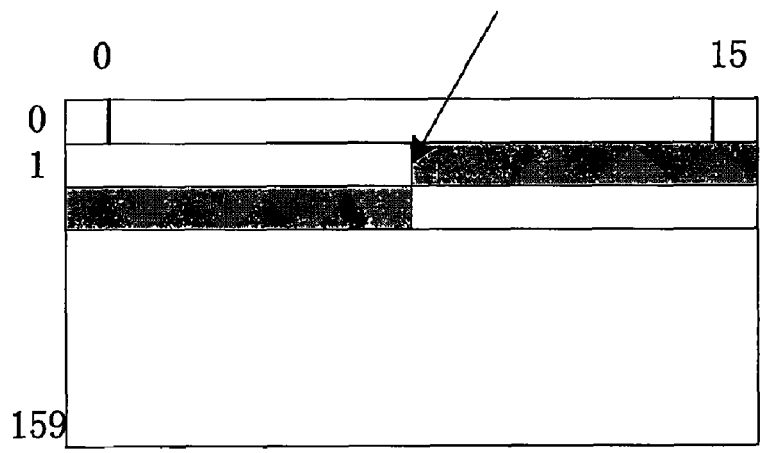
FIG. 29 illustrates one embodiment of a DMX QWORD access.

If the address of the DMX 2610 is on 64-bit boundary. All the 128-bit output of DMX can be used. The QWORD access can be described in FIG. 29.

Internal Byte Access

Figure 30:
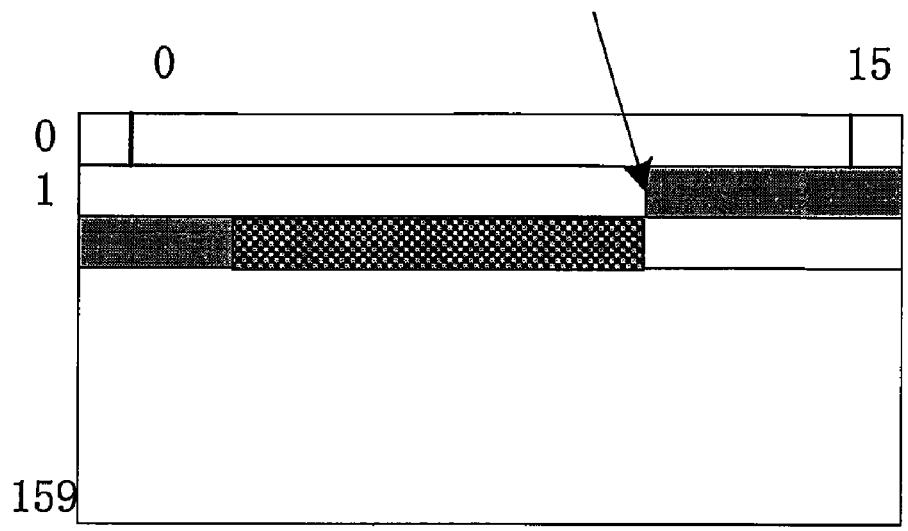
FIG. 30 illustrates one embodiment of a DMX Byte access.

If the address of the DMX 2610 is not on 64-bit boundary, it is byte aligned access. Only high 64-bit of 128-bit output of the DM 2610 can be used. The byte aligned access can be described in FIG. 30.

External Short Access

External DMA access of the DMX 2610 can be done in short address boundary. Four bytes are accessed for each read or write IO operation.

DMY

In one embodiment, please refer to FIG. 26, the DMU 2600 further includes one QWORD (64-b) addressable local data memory DMY 2620, four reconfigurable data address generators (DYA, DYB, DYC and DYD) 2621, 2622, 2623, 2624 and one IO address generator (IOY) 2632. The four reconfigurable data address generators (DYA, DYB, DYC and DYD) can be loaded with a value from general scalar register file. There are 4 ports of DMY, called, DMYA, DMYB, DMYC, DMYD, which are controlled by the four reconfigurable data address generators DYA, DYB, DYC, and DYD respectively. The DMYA, DMYB, DMYC, DMYD can be configured as read or write ports. The input of DMY is N pixels and output of DMU is 2*N pixels. In this embodiment, N=8, and the output is 128 pixels.

The DMY 2620 can only support 64-bit boundary data access. The input of the DMY 2620 is 64-bit and the output of DMY is 128-bit. The address of the DMY 2620 has a unit of 8 bytes. The DMY 2620 is configured as 128×16 Byte or 256×8 Byte single port SRAM depending on the mode register settings. Other configuration is possible.

Internal 64-b QWORD Access

Figure 31:
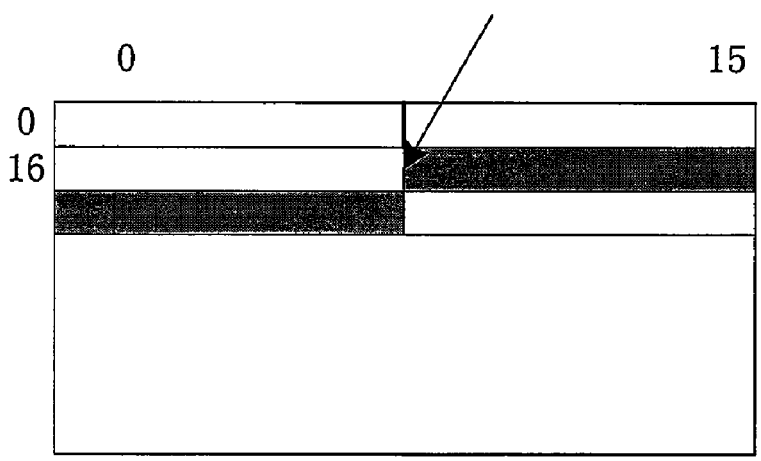
FIG. 31 illustrates one embodiment of a DMY Byte access.

The access of the DMY 2620 should be on 64-b boundary. All the 128-bit output of the DMX 2610 can be used. The QWORD access is shown FIG. 31.

External Short Access

External DMA access of the DMY 2620 can be done in short address boundary. Four bytes are accessed for each read or write IO operation.

DAG

As shown in FIG. 26, the DMX 2610 and DMY 2620 both have four configurable address registers. The address registers of the DMX 2610 are labeled as dxa, dxb, dxc, dxd. The address registers of the DMY 2620 are labeled as dya, dyb, dyc, dyd. Each address register is automatically updated after each memory access based on the address mode registers. The increment value for the DMX 2610 can be 0~63. The increment value for DMY can be 0~7. The increment values are controlled by the mode register settings. All these address registers can be used as read or write pointers.

DXA/DXB/DXC/DXD

Figure 32:
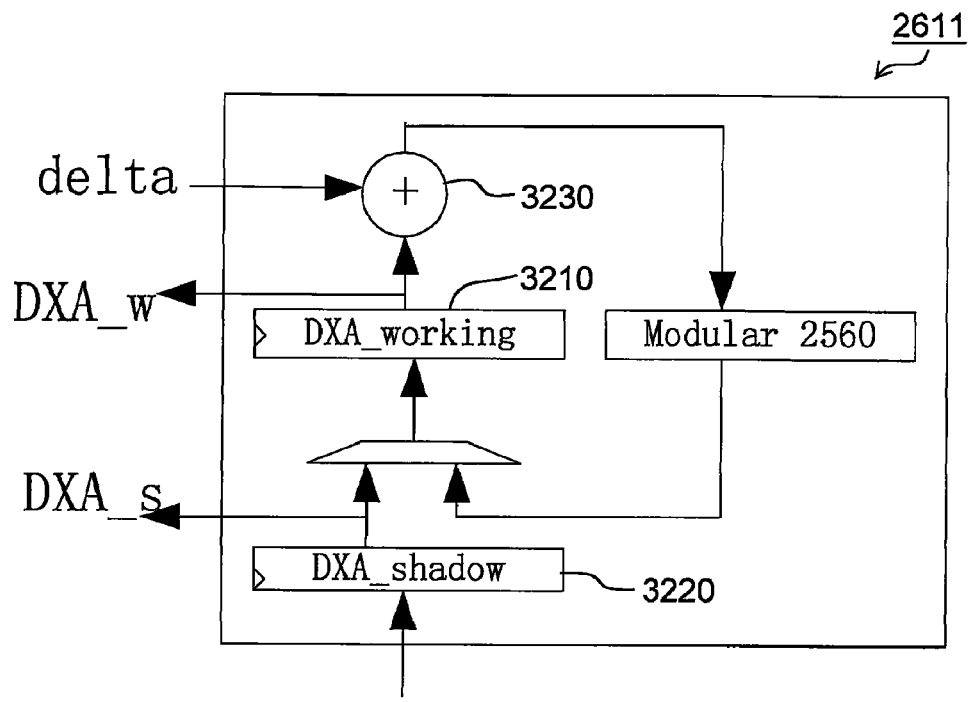
FIG. 32 illustrates one embodiment of a structure of one of reconfigurable data address generator.

In one embodiment, the structure of the reconfigurable data address generators DXA, DXB, DXC and DXD can be shown in FIG. 32, in which the DXA is used as example for explanation. The DXA 2611 has two registers DXA_working 3210 and DXA_shadow 3220, adder 3230 and a modular 2560. The DXA_shadow 3220 is updated by the Scalar Processing Unit. The DXA_shadow 3220 is not changed during memory access operation (load/store). The DXA_working 3210 is incremented during load/store operations by "delta" through the adder 3230. The value of delta is stored in a mode register which can be written by Scalar Processing Unit. In the next cycle after Scalar Processing Unit loads a value into the DXA_shadow 3220, the value inside the DXA_shadow 3220 is loaded into the DXA_working 3210. During the DMX memory load/store operations, the output of the Modular 2560 is loaded into the DXA_working 3210.

The output of the adder 3230 is connected to the Modular 2560. This module functions as:

$F(x) = x \% 2560$.

DMX is organized as 160×32 Bytes, which means there are 160 rows and each row has 32 byte. After one memory access, the address of the DMX will be incremented by 32 bytes. When the address points to the last row of the DMX (the 160th row), the next address will be wrapped around to 0.

Figure 33:
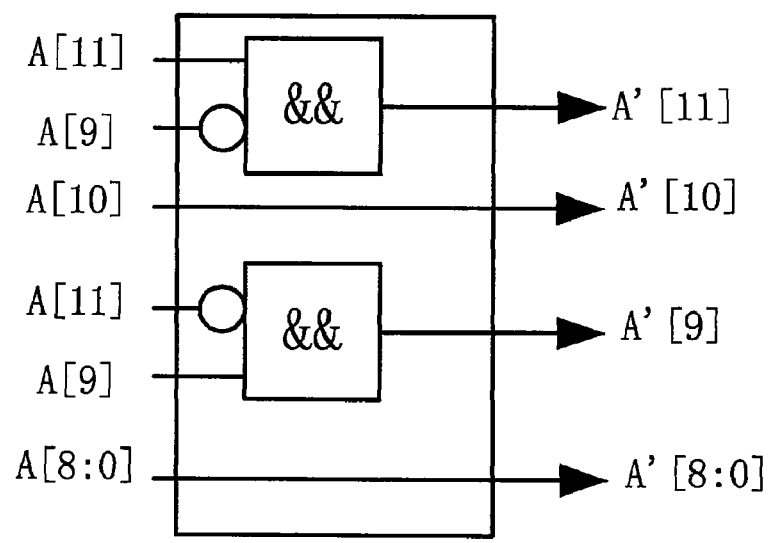
FIG. 33 illustrates one embodiment of a structure of a Modular 2560.

In one embodiment, the Modular 2560 is implemented in FIG. 33.

Figure 34:
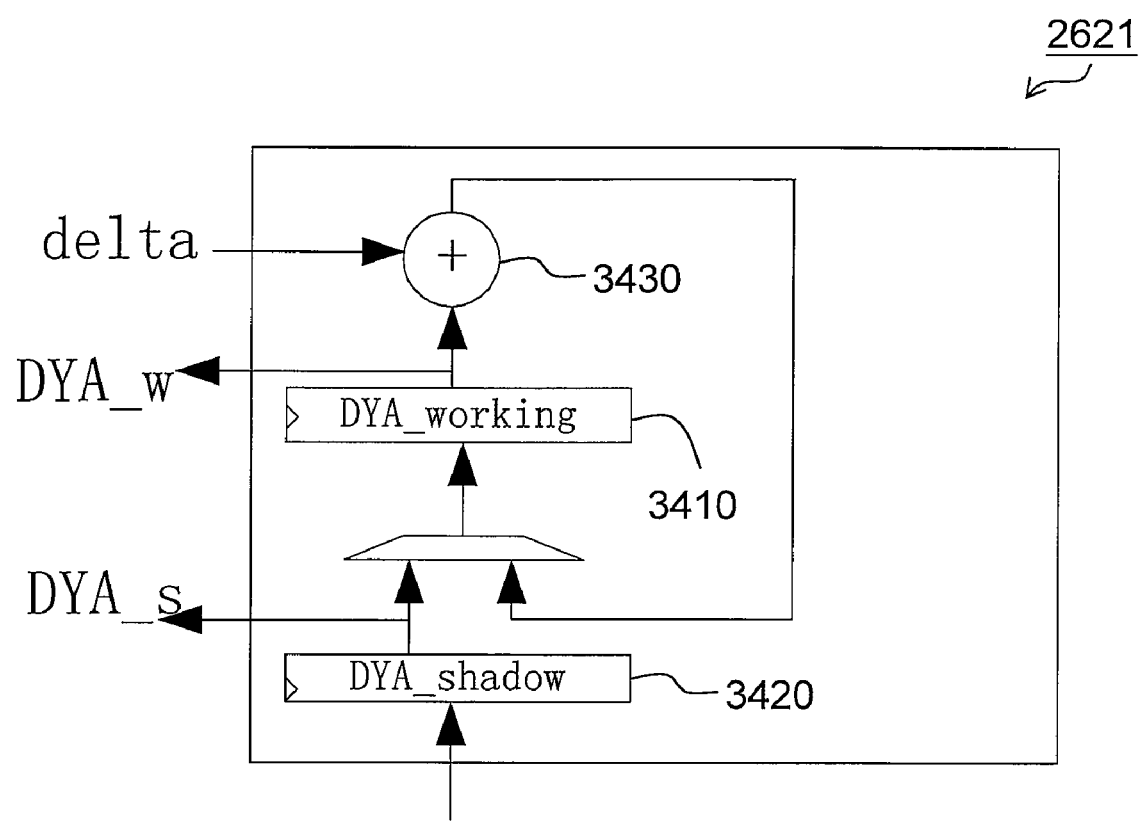
FIG. 34 illustrates one embodiment of a structure of a reconfigurable data address generator (DYA).

In one embodiment, the structure of one of the four reconfigurable data address generators (DYA, DYB, DYC and DYD) is shown in FIG. 34, and the DYA 2621 is used as an example for explanation. The DYA 2621 has two registers DYA_working 3410, DYA_shadow 3420, and an adder 3430. The DYA_shadow 3420 is updated by the Scalar Processing Unit. The DYA_shadow 3420 is not changed during DMY memory access operation (load/store). The DYA_working 3410 is incremented during load/store operations by "delta" through the adder 3430. The value of delta is stored in a mode register which can be written by Scalar Processing Unit. In the next cycle after Scalar Processing Unit loads a value into the DYA_shadow 3420, the value inside the DYA_shadow 3420 is loaded into the DYA_working 3410. During the DMY memory load/store operations, the output of Adder is loaded into the DYA_working 3410.

Sum of Absolute Difference (SAD) Unit

Figure 35:
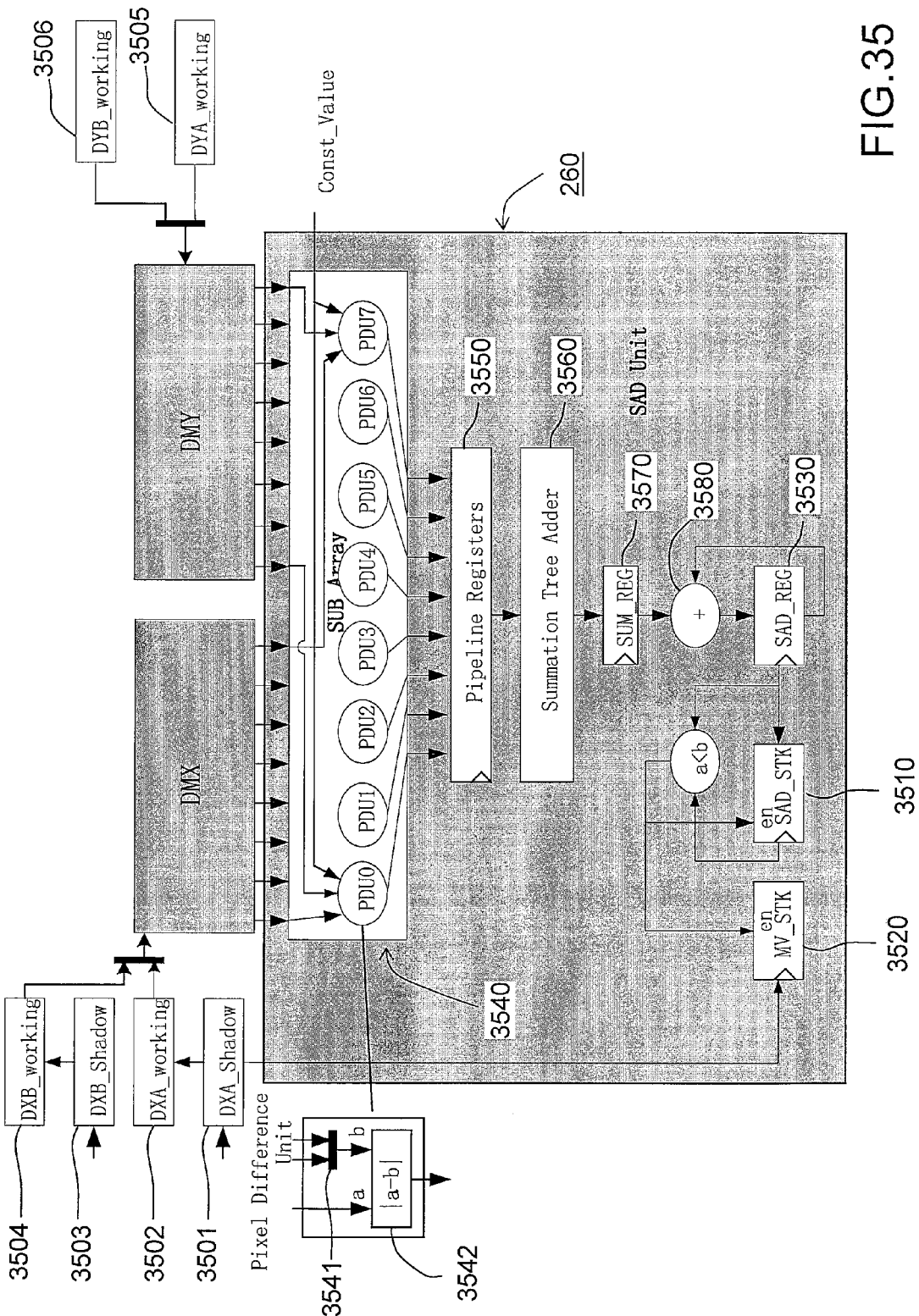
FIG. 35 illustrates one embodiment of a structure of a sum of absolute difference (SAD) Unit.

In one embodiment, a sum of absolute difference (SAD) Unit is designed for calculating the sum of absolute difference (SAD). The structure of the SAD is shown in FIG. 35. It is useful for Motion Estimation (ME) with the assist of the Scalar Processing Unit. The SAD unit is a pipelined computation datapath.

In one embodiment, one SAD operation includes eight pixel read from DMX, eight pixel read from DMY, eight pixel value absolute difference calculation and summation of the eight absolute pixel difference. At the same time, the address pointers of the DMX and DMY, called DMXA, DMYA, are adjusted according to the mode setting.

In one embodiment, as shown in FIG. 35, the SAD unit 260 is a highly parallel module which can accelerate the ME operation greatly. The SAD unit 260 includes one SAD Stack register (SAD_STK) 3510, one MV Stack register (MV_STK) 3520, and one SAD register (SAD_REG) 3530. The value in the DMXA_shadow register 3501 is stored into the MV_STK 3520 and the value in the SAD_REG 3530 is stored in the SAD_STK 3510 if the SAD_REG 3530 is smaller than the SAD_STK 3510.

In one embodiment, the SAD unit 260 further includes a SUB Array 3540. The SUB Array 3540 includes eight Pixel Difference Units (PDU0, PDU1, . . . PDU7). Each Pixel Difference Unit has three 8-bit inputs, one from the output of DMX, one from the output of DMY, and the other from a configure register Const_Value, as shown in FIG. 35. The outputs of eight Pixel Difference Units are routed to Pipeline Registers 3550. The outputs of the Pipeline Registers 3550 are routed to a Summation Tree Adder 3560. The output of the Summation Tree Adder 3560 is latched into a SUM_REG register 3570. The output of the SUM_REG register 3570 and the output of the SAD_REG 3530 are added through an adder 3580 and the result is stored back into the SAD_REG 3530.

In one embodiment, each Pixel Difference Unit contains a multiplexer 3541 and a Difference unit |a−b| 3542, as shown. The multiplexer 3541 selects from the DMY output or from the Const_Value supplied by the configure register.

In one embodiment, there are two address registers used to address DMX in the SAD operations: DXA_shadow register 3501 and DXA_working register 3502. The DXA_shadow register 3501 is loaded with the value from one of the Scalar General Register.

In case of DMXA port of the DMX is used, in the next cycle, the DXA_working register 3502 is loaded with the value in the DXA_shadow register 3501. After one SAD operation is done, the DXA_working register 3502 and a DYA_working register 3505 connected to the DMY is updated according to the setting, however, the DXA_shadow register 3501 is not changed.

In one embodiment, there are two address registers used to address DMX in SAD operations: DXB_shadow register 3503 and DXB_working register 3504. The DXB_shadow register 3503 is loaded with the value from one of the Scalar General Register.

In case of a DMXB port of the DMX is used, in the next cycle, the DXB_working register 3504 is loaded with the value in DXB_shadow register 3503. After one SAD operation is done, the DXB_working register 3504 and DYB_working register 3506 connected to the DMY is updated according to the setting, however, DXB_shadow is not changed.

Figure 36:
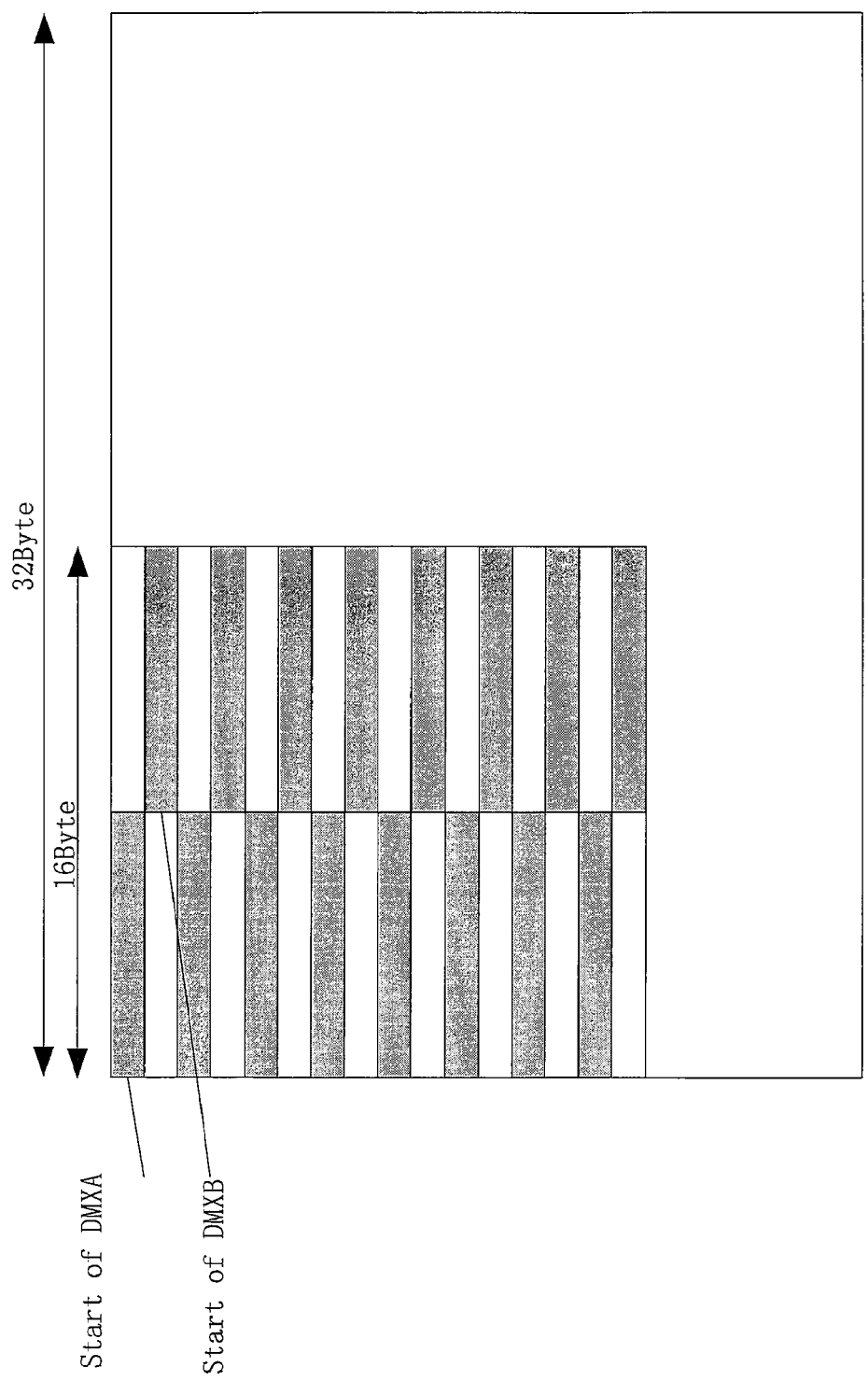
FIG. 36 illustrates one embodiment of sub-sampled SAD operation performed by the SAD unit.

In one embodiment, two address ports of DMX and DMY are used in order to support sub-sampled SAD operations. The 16×16 macro block is divided in two parts. On the left part, only the even rows are used for SAD operations; on the right part, only the odd rows are used for SAD operations. The total cycle for sub-sampled SAD operations is reduced by half. The saved cycles can be used for searching more candidate points. The power consumption can be greatly reduced. The sub-sampled SAD operation is shown in FIG. 36.

In one embodiment, the SAD_FIRST operations are carried out by executing the following instruction:

f.sad A/B {fst}

The first source operand of above instruction could be dxa or dxb.

The SAD_FIRST operations include the following operations:

Set MV_STK=0,
Set SAD_STK=0xffff (Maximum value)
Select DMY output as the input of |a−b| operator.
Do one SAD operation above.

In one embodiment, the SAD_CONTINUE operations are carried out by executing the following instruction:

f.sad A/B {cont}

The first source operand of above instruction could be dxa or dxb.

The SAD_CONTINUE operations include the following operations:

MV_STK and SAD_STK are kept the same;
Select DMY output as the input of |a−b| operator.
Do one SAD operation above.

In one embodiment, the SAD_LAST operations are carried out by executing the following instruction:

f.sad A/B {last}

The first source operand of above instruction could be A or B. A will use DXA and DYA, B will use DXB and DYB.

The SAD_LAST operations include the following operations:

Select DMY output as the input of |a−b| operator.
Do one SAD operation above.
If SAD_REG is bigger than SAD_STK, Set SAD_STK=SAD_REG, SET MV_STK=DXA_shadow. Else MV_STK and SAD_STK are kept the same.

Example of Doing one SAD Operations of 16×16 Macro Block r.mov #0 dxa//set the start address of DMXA port for reference block data
r.mov #0 dya//set the start address of DMYA port for current block data
r.mov #8 dxb//set the start address of DMXB port for reference block data r.mov #1 dyb//set the start address of DMYB port for current block data
f.sad A {fst}
f.sad B {fst}
f.sad A {cont}//continue, increment dxa by 32, increment dya by 2
f.sad B {cont}// continue, increment dxb by 32, increment dyb by 2
. . . //repeat the above two instructions for 13 times
f.sad A {last}//
f.sad B {last}
Example of Doing One Subsampled SAD Operations of 16×16 Macro Block
r.mov #0 dxa//set the start address of DMXA port for reference block data, first even row of left part
r.mov #0 dya//set the start address of DMYA port for current block data, first even row of left part
r.mov #40 dxb//set the start address of DMXB port for reference block data, first odd row of right part
r.mov #3 dyb//set the start address of DMYB port for current block data, first odd row of right part
f.sad A {fst}
f.sadB {fst}
f.sad A {cont}//continue, increment dxa by 64, increment dya by 4
f.sad B {cont}//continue, increment dxb by 64, increment dyb by 4
. . . //repeat the above two instructions for 5 times
f.sad A {last}//
f.sad B {last}
In one embodiment, the SIGMA operations are carried out by executing the following instruction:

f.sigma
Select Const_Value as the input of |a−b| operator.
Do one SAD operation above.

The Pixel Processing Unit (PPU)

In one embodiment, the PPU 250 as shown in FIG. 2 is specially designed for pixel based video processing, including Quarter or Half pixel interpolation (QPEL) and deblocking filtering (DEB). The PPU has two types of datapath. One type of datapath includes four vector summation elements (VSUM0, VSUM1, VSUM2, VSUM3). Each VSUM calculates the dot-product of the input 8-pixel vector and the fixed-coefficient vector. The VSUM uses configurable multiplication-free computation unit to reduce the hardware cost. The VSUM can be configured to support the different types of interpolation filter. The other type of datapath consists of several hardwired deblocking filters for specified video coding standards (VDEB_H264, VDEB_VC1, etc). Each type of filter does the conditional deblocking filtering based on the input eight pixels by executing one instruction. The deblocking filter datapath has multiple pipeline stages. The implementation of H.264 deblocking filter and the implementation of VC1 deblocking filter can be referenced as aforesaid.

In one embodiment, the H.264 chroma and luma filter operations are carried out in the same filter datapath VDEB_H264.

Figure 37:
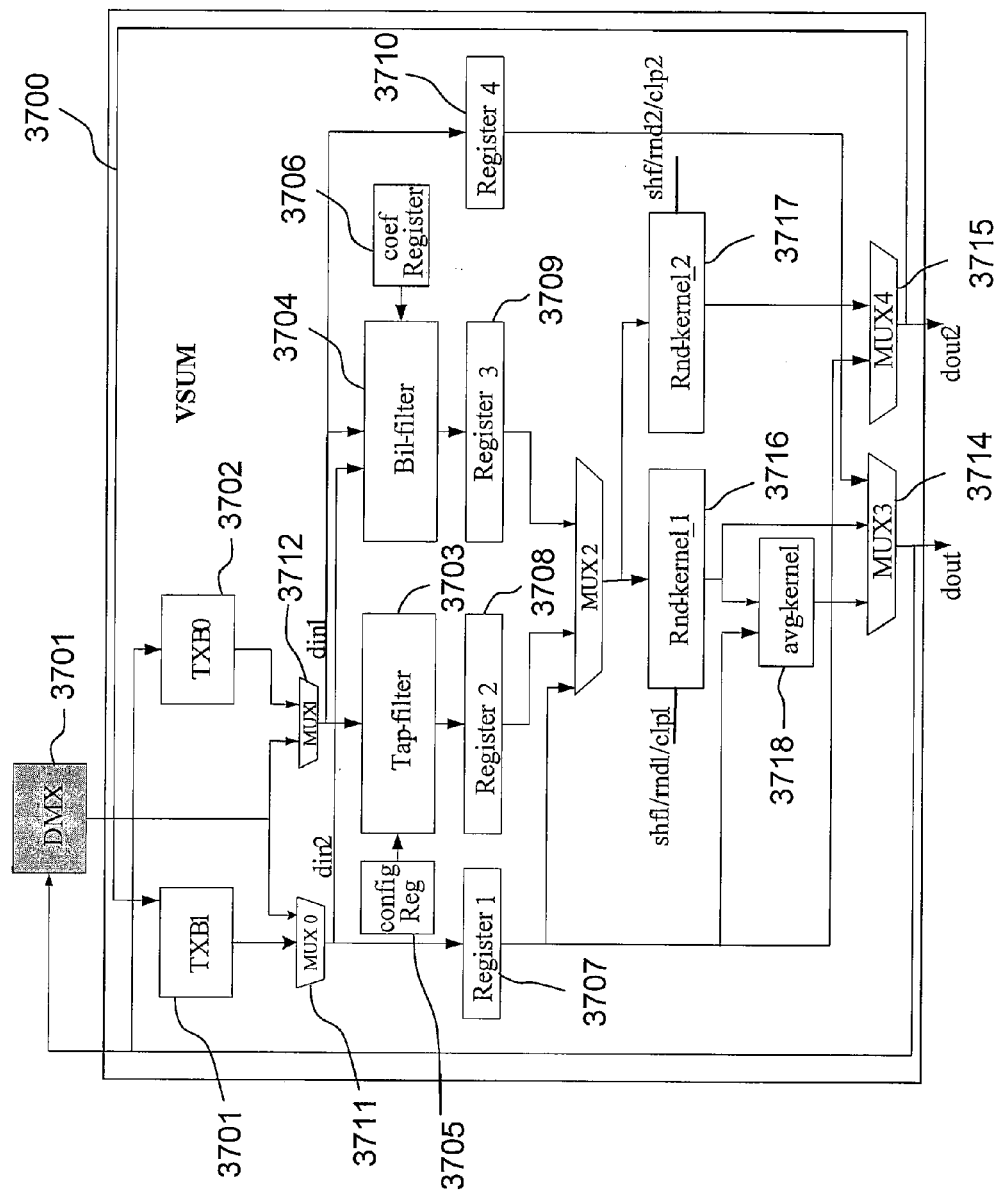
FIG. 37 illustrates one embodiment of a structure of a vector summation element (VSUM).

In one embodiment, the structure of a vector summation element (VSUM) is described in FIG. 37. The VSUM 3700 includes a pair of Temporary piXel Buffers (TXB0 and TXB1) 3701, 3702, a tap-filter 3703, a Bil-filter 3704, a configuration register 3705 connected to the tap-filter 3703, a coefficient register 3706 connected to the Bil-filter 3704, a plurality of registers (register1~register4) 3707, 3708, 3709, 3710, a plurality of multiplexers (MUX0~MUX4) 3711, 3712, 3713, 3714, two Rnd-kernel modules (rnd-kernel_1, rnd-kernel_2) 3716, 3717, and an avg-kernel module (avg-kernel) 3718.

The one input of the tap-filter 3703 is connected to the output of MUX1. The output of MUX1 is selected from DMX and TXB0 output. The other input port of the tap-filter 3703 is connected to the configuration register 3705. The one input of the Bil-filter 3704 is connected to the output of the MUX1. The other input of the Bil-filter 3704 is connected to the output of TXB1. The third input of the Bil-filter 3704 is connected to the coefficient register 3706. The select signals of the multiplexers (MUX0~MUX4) inside VSUM are controlled according to the resource table as shown in following Table 8.

TABLE 8

| | Computation resource usage used in VSUM | | | | |
|---|---|---|---|---|---|
| | Tap_filter | Bil_filter | Rnd_kernel_1 | Rnd_kernel_2 | Avg_kernel |
| F.bil | N | Y | N | N | N |
| F.bil_rs | N | Y | Y | N | N |
| F.bil_rs_v | N | Y | Y | N | N |
| F.bil_rs2 | N | Y | Y | N | N |
| F.Filt2 | Y | N | Y | Y | N |
| F.Filt | Y | N | Y | N | N |
| F.Filt_rs | Y | N | Y | N | N |
| F.copy | N | N | N | N | N |
| F.bypass | N | N | N | N | N |
| F.avg_rs | N | N | Y | N | Y |
| F.Filt_rs2 | Y | N | Y | N | N |
| F.copy_rs | N | N | Y | N | N |

In one embodiment, the Tap-filter 3703, Rnd-kernel_1 3716 and avg-kernel module 3718 are connected in a cascade structure, which is organized in two pipeline stages. In the first pipeline stage, multiple-tap filtering operation is done. In the second pipeline stage, the round and average operations are done.

Figure 38:
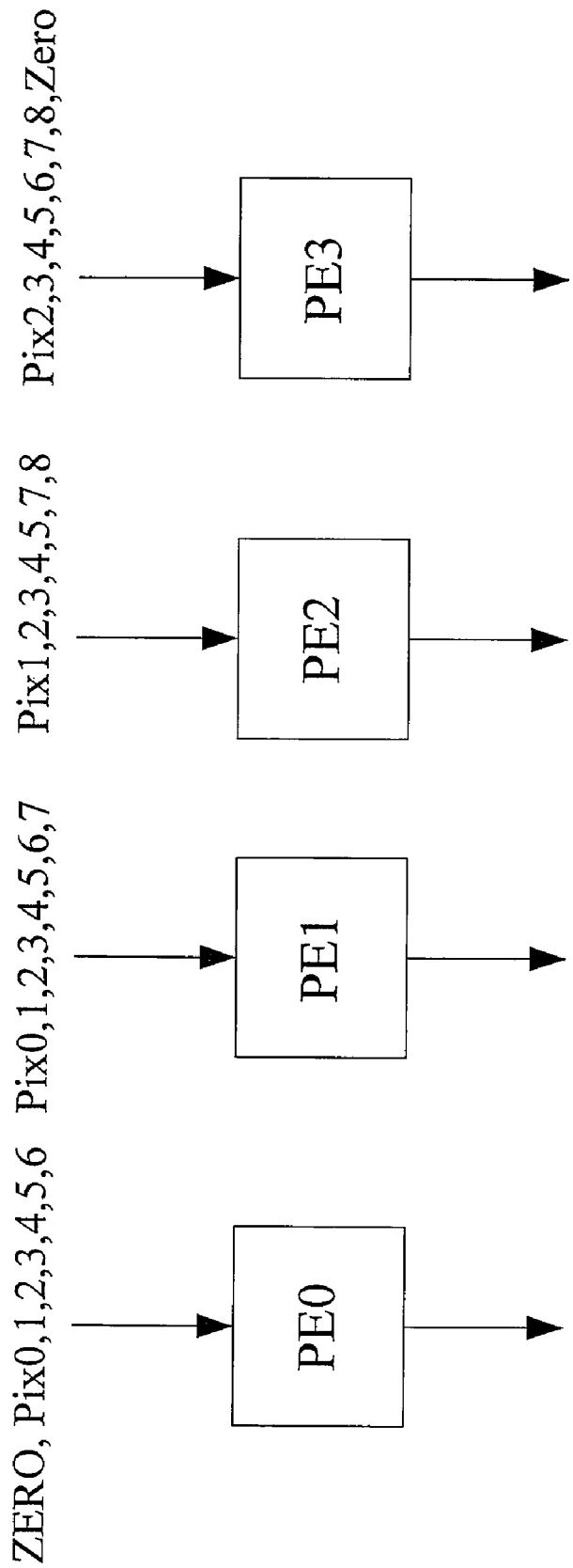
FIG. 38 illustrates one embodiment of four Processing Elements including PE0, PE1, PE2 and PE3 inside a tap filter.

In one embodiment, there are multiple Processing Elements (PE) inside the tap filter. One PE can produce one filtering result. By using multiple PEs, the memory access cycles can be reduced. In the embodiment, there are four Processing Elements including PE0, PE1, PE2 and PE3 are shown in FIG. 38 inside the tap filter 2703. To calculate 4 filtering results, totally 9 pixels (see FIG. 38, Pix0, 1, . . . 8) are needed to calculate four 6-tap filtering results. Since the DMX 271 of the DMU 270 of FIG. 2 can provide up to 16 pixels at one cycle, only one cycle is needed to read out the all 9 pixels and generate the four filtering results. If only one PE is used, to calculate one filter result, 6 pixels are read out from the DMX 271. Totally 4 cycles are needed to generate four filtering results.

Figure 39:
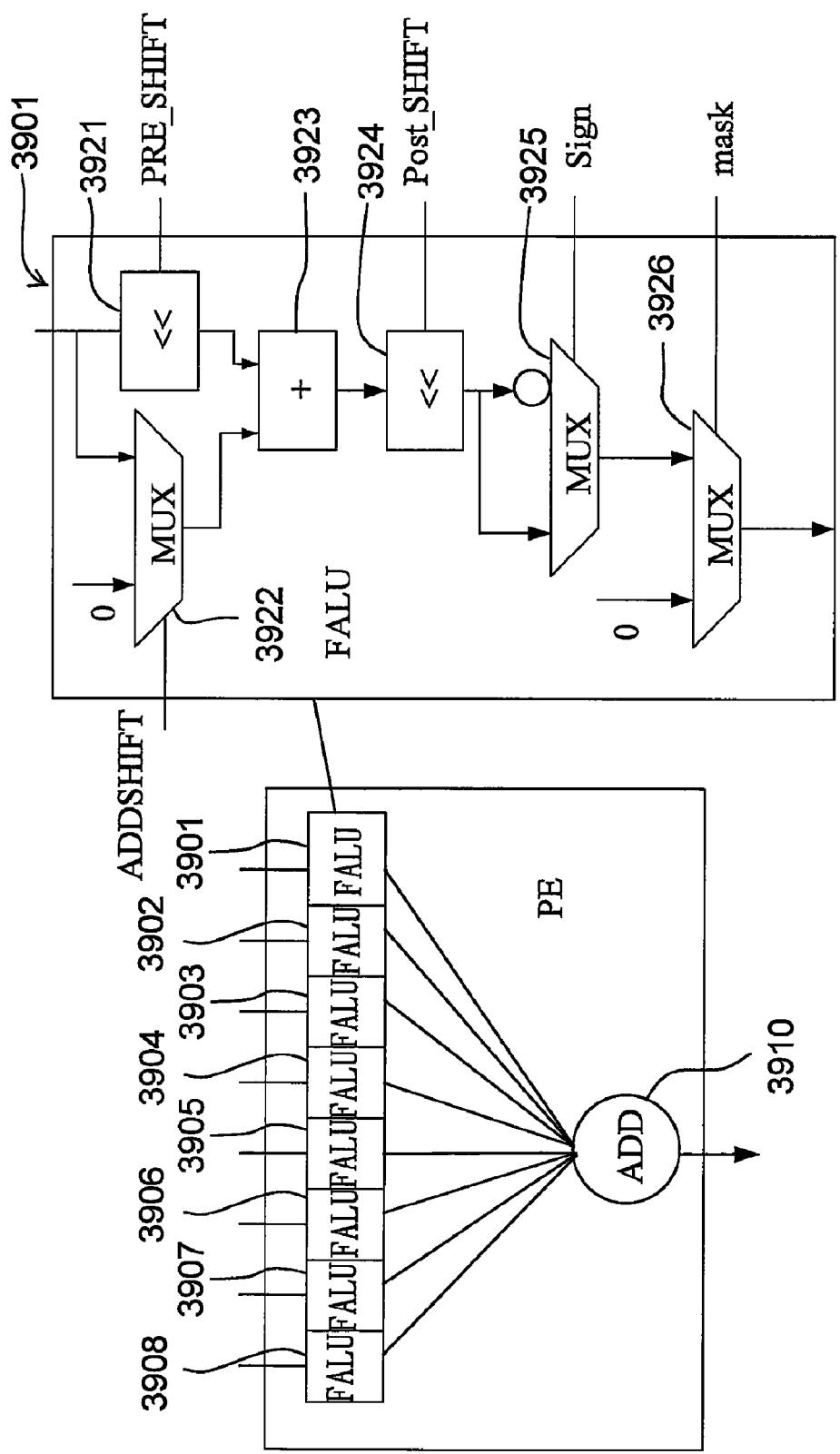
FIG. 39 illustrates one embodiment of a structure of the PE inside the tap-filter module.

In one embodiment, a structure of the PE inside the tap-filter module is described in FIG. 39. Each PE has 8 input and includes 8 configurable Filter ALU (FALU) 3901~3908 and an adder 3910. The structure of the FALU 3901 is used for explanation, for example. In one embodiment, the FALU 3901 includes a preshifter 3921, a multiplexer 3922, an adder 3923, a postshifter 3924, a negative operator 3925 and another multiplexer 3926. The FALU 3901 is controlled by five control signals: PRE_SHIFT, POST_SHIFT, SIGN, ADDSHIFT, and MASK. The SIGN=1 means that the negated value is selected. ADDSHIFT=1 means that a+(b<<s) operation is selected. By configuring these control signals, the tap-filter can be used to do interpolation filter for different video coding standards. Compared with the traditional method, the tap-filter in this embodiment does not need any multiplication, so that the power consumption and the hardware cost is greatly reduced.

In one embodiment, the control bits for FALU are got from a misc register, which is updated by the Scalar Processing Unit.

In one embodiment, the FALU can be configured as shown in Table 9 to do H.264 six tap filtering.

TABLE 9

FALU control bits for H.264 six tap filter (1, −2, 5, 5, −2, 1)

|            | FALU0 | FALU1 | FALU2 | FALU3 | FALU4 | FALU5 | FALU6 | FALU7 |
|------------|-------|-------|-------|-------|-------|-------|-------|-------|
| PRE_SHIFT  | 0     | 0     | 1     | 2     | 2     | 1     | 0     | 0     |
| POST_SHIFT | 0     | 0     | 0     | 0     | 0     | 0     | 0     | 0     |
| ADDSHIFT   | 0     | 0     | 0     | 1     | 1     | 0     | 0     | 0     |
| SIGN       | 0     | 0     | 1     | 0     | 0     | 1     | 0     | 0     |
| MASK       | 0     | 1     | 1     | 1     | 1     | 1     | 1     | 0     |

In one embodiment, the FALU can be configured as shown in Table 10 to do MPEG4 eight tap filtering.

TABLE 1

FALU control bits for MPEG4 eight tap filter (−1, 2, −5, 20, 20, −5, 2, −1)

|            | FALU0 | FALU1 | FALU2 | FALU3 | FALU4 | FALU5 | FALU6 | FALU7 |
|------------|-------|-------|-------|-------|-------|-------|-------|-------|
| PRE_SHIFT  | 0     | 0     | 1     | 2     | 2     | 1     | 0     | 0     |
| POST_SHIFT | 0     | 1     | 0     | 2     | 2     | 0     | 1     | 0     |
| ADDSHIFT   | 0     | 0     | 1     | 1     | 1     | 1     | 0     | 0     |
| SIGN       | 1     | 0     | 1     | 0     | 0     | 1     | 0     | 1     |
| MASK       | 1     | 1     | 1     | 1     | 1     | 1     | 1     | 1     |

In one embodiment, the FALU can be configured as shown in Table 11 to do AVS four tap filtering.

TABLE 11

FALU control bits for four tap filter (−1, 5, 5, −1)

|            | FALU0 | FALU1 | FALU2 | FALU3 | FALU4 | FALU5 | FALU6 | FALU7 |
|------------|-------|-------|-------|-------|-------|-------|-------|-------|
| PRE_SHIFT  | 0     | 0     | 0     | 2     | 2     | 0     | 0     | 0     |
| POST_SHIFT | 0     | 0     | 0     | 2     | 2     | 0     | 0     | 0     |
| ADDSHIFT   | 0     | 0     | 0     | 1     | 1     | 0     | 0     | 0     |
| SIGN       | 0     | 0     | 1     | 0     | 0     | 1     | 0     | 0     |
| MASK       | 0     | 0     | 1     | 1     | 1     | 1     | 0     | 0     |

Figure 40:
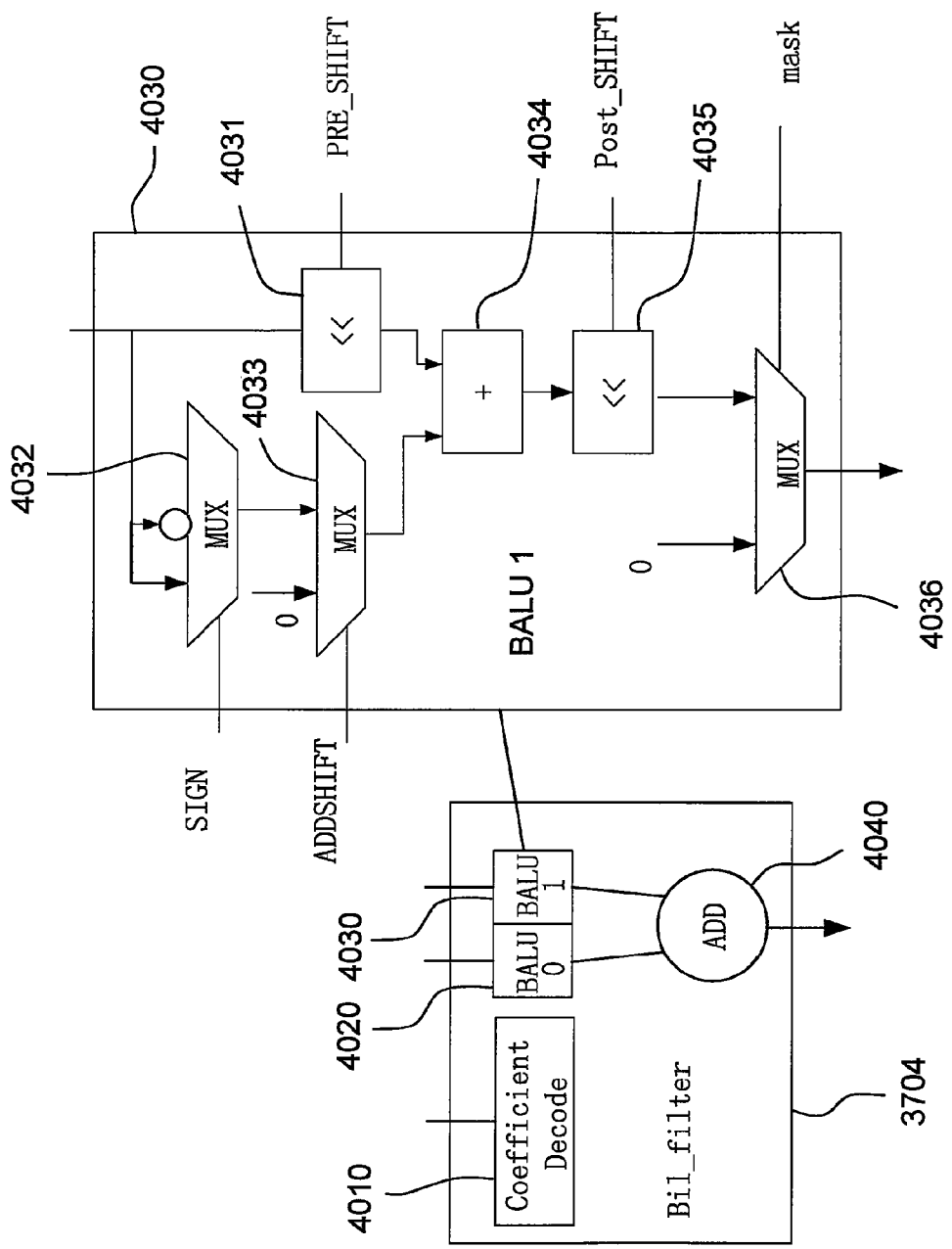
FIG. 40 illustrates one embodiment of a structure of the structure of Bil_filter.

In one embodiment, the structure of Bil_filter is shown in FIG. 40. The Bil_filter 3704 includes a coefficient decode unit 4010, two Bilinear ALUs (BALU) BALU0 and BALU1 and an adder 4040. The coefficient decode unit 4010 stores a coefficient decode logic table, which is shown in following Table 12 and Table 13. The output of the two Bilinear ALUs BALU0 and BALU1 are added by the adder 4040. The configurable structure of BALU is shown in FIG. 40, in which the BALU1 4030 is shown for example. The BALU1 4030 includes a pre-shifter 4031, a negative operator 4032, two multiplexers 4033 and 4036, an adder 4034 and a post-shifter 4035. The Bilinear ALUs BALU0 and BALU1 can support the bilinear operation as a*c+b*(8−c), without the introduction of the multipliers. The hardware cost is saved.

TABLE 12

BALU0 control bits for Chroma bilinear filter

| | Chroma pixel location | | | | | | | |
|---|---|---|---|---|---|---|---|---|
|            | (0,8) | (1,7) | (2,6) | (3,5) | (4,4) | (5,3) | (6,2) | (7,1) |
| PRE_SHIFT  | 0 | 0 | 0 | 1 | 0 | 2 | 1 | 3 |
| POST_SHIFT | 0 | 0 | 1 | 0 | 2 | 0 | 1 | 0 |
| ADD_SHIFT  | 0 | 0 | 0 | 1 | 0 | 1 | 1 | 1 |
| SIGN       | 0 | 0 | 0 | 0 | 0 | 0 | 0 | 1 |
| MASK       | 0 | 1 | 1 | 1 | 1 | 1 | 1 | 1 |

TABLE 2

BALU1 control bits for Chroma bilinear filter

| | Chroma pixel location | | | | | | | |
|---|---|---|---|---|---|---|---|---|
| | (0,8) | (1,7) | (2,6) | (3,5) | (4,4) | (5,3) | (6,2) | (7,1) |
| PRE_SHIFT | 0 | 3 | 1 | 2 | 0 | 1 | 0 | 0 |
| POST_SHIFT | 3 | 0 | 1 | 0 | 2 | 0 | 1 | 0 |
| ADD_SHIFT | 0 | 1 | 1 | 1 | 0 | 1 | 0 | 0 |
| SIGN | 0 | 1 | 0 | 0 | 0 | 0 | 0 | 0 |
| MASK | 1 | 1 | 1 | 1 | 1 | 1 | 1 | 1 |

When luma interpolation is carried out, only the tap_filter 3703 is needed, and the bil_filter 3704 can be disabled in order to save power consumption.

When chroma interpolation is carried out, only the Bil_filter 3704 is needed, and the tap_filter 3703 can be disabled in order to save power consumption.

Figure 41:
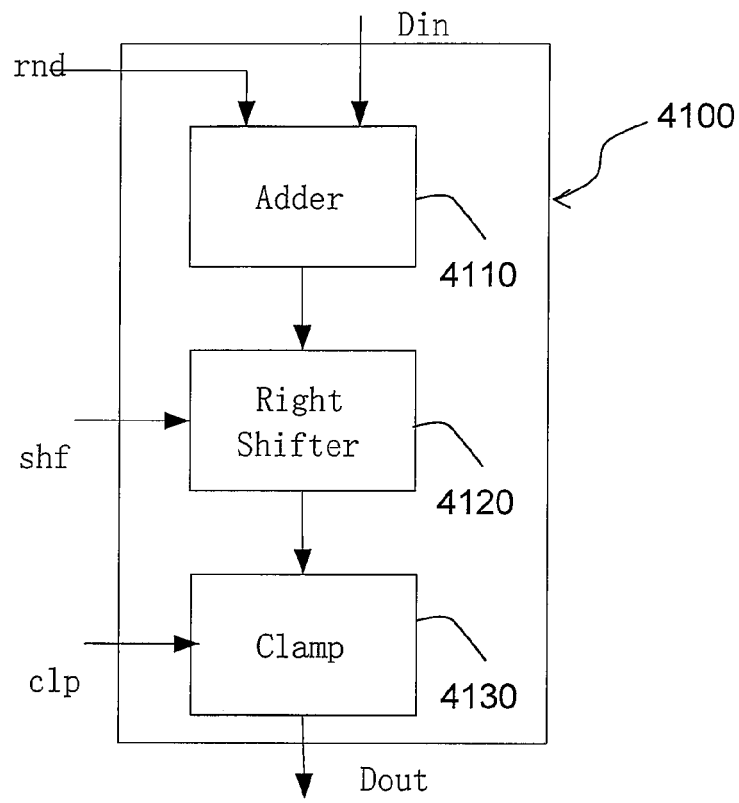
FIG. 41 illustrates one embodiment of a structure of an rnd-kernel module.

In one embodiment, two rnd-kernel modules including rnd-kernel_1 3716 and rnd-kernel_2 3717, as shown in FIG. 37, are used to do two rounding operations at the same time. The structure of the rnd-kernel module is described in FIG. 41. The rnd-kernel module 4100 includes an adder 4110 receiving signals rnd and Din, a right shifter 4120 receiving a signal shf and the output of the adder 4110, and a clamp unit 4130 receiving output of the right shifter 4120 and a signal clp and outputting the signal Dout. The round and shift values of the two rnd-kernel modules rnd-kernel_1 3716 and rnd-kernel_2 3717 are decoded from the instruction and generated from IDU3 223 in PSQ2 220 of FIG. 2 as shown in Table 14.

TABLE 14

Instruction decode table of VSUM

| | Shf1 | Rnd1 | Clp1 | Shf2 | Rnd2 | Clp2 | Comments |
|---|---|---|---|---|---|---|---|
| F.bil | 0 | 0 | 0 | 0 | 0 | 0 | hor bilinear |
| F.bil_rs | 3 | 4 | Y | 0 | 0 | 0 | hor bilinear with right shift by 3 |
| F.bil_rs_v | 3 | 4 | Y | 0 | 0 | 0 | ver bilinear with right shift by 3 |
| F.bil_rs2 | 6 | 32 | Y | 0 | 0 | 0 | ver bilinear with right shift by 6 |
| F.Filt2 | 0 | 0 | N | 5 | 16 | Y | interpolation filter, two filter results written |
| F.Filt | 0 | 0 | N | 0 | 0 | N | interpolation filter, one filter and one bypass result written |
| F.Filt_rs | 5 | 16 | Y | 0 | 0 | N | interpolation filter, one filter and one bypass result written |
| F.Filt_copy | 0 | 0 | N | 0 | 0 | N | Copy and one bypass result written |
| F.bypass | 0 | 0 | N | 0 | 0 | N | Copy and one bypass result written |
| F.avg_rs | 5 | 16 | Y | — | — | — | Average operation |
| F.Filt_rs2 | 5 | 0 | N | 0 | 0 | N | Interpolation filter, one filter without clamp and one bypass result written |
| F.copy_rs | 5 | 16 | Y | 0 | 0 | N | Copy operation |

In one embodiment, in rnd_kernel module, the output of Dout is identical to the following operations:

$$dout = clp == 0\,?\,din:\text{clamp}((din+rnd)>>shf),\ \text{where}$$
$$\text{clamp}(x) = x<-128\,?\,-128:x>127\,?\,127:x;$$

Figure 42:
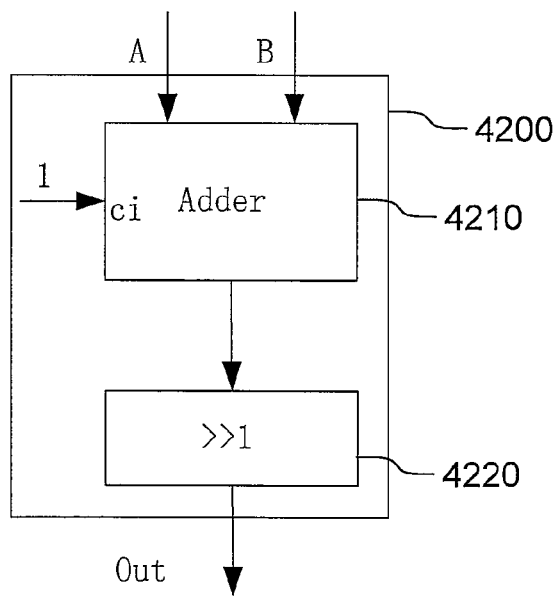
FIG. 42 illustrates one embodiment of a structure of an avg-kernel module.

In one embodiment, the structure of the aforesaid avg-kernel is shown in FIG. 42. The avg-kernel module 4200 contains an adder 4210 and a right shifter 4220 with shift value as 1. The structure of avg-kernel module is described in FIG. 41.

In one embodiment, the instruction decode table is shown in the Table 14. The shf1, rnd1, clp1, shf2, rnd2, clp2 control signals are used to control the VSUM's configurable datapath described above.

Figure 43:
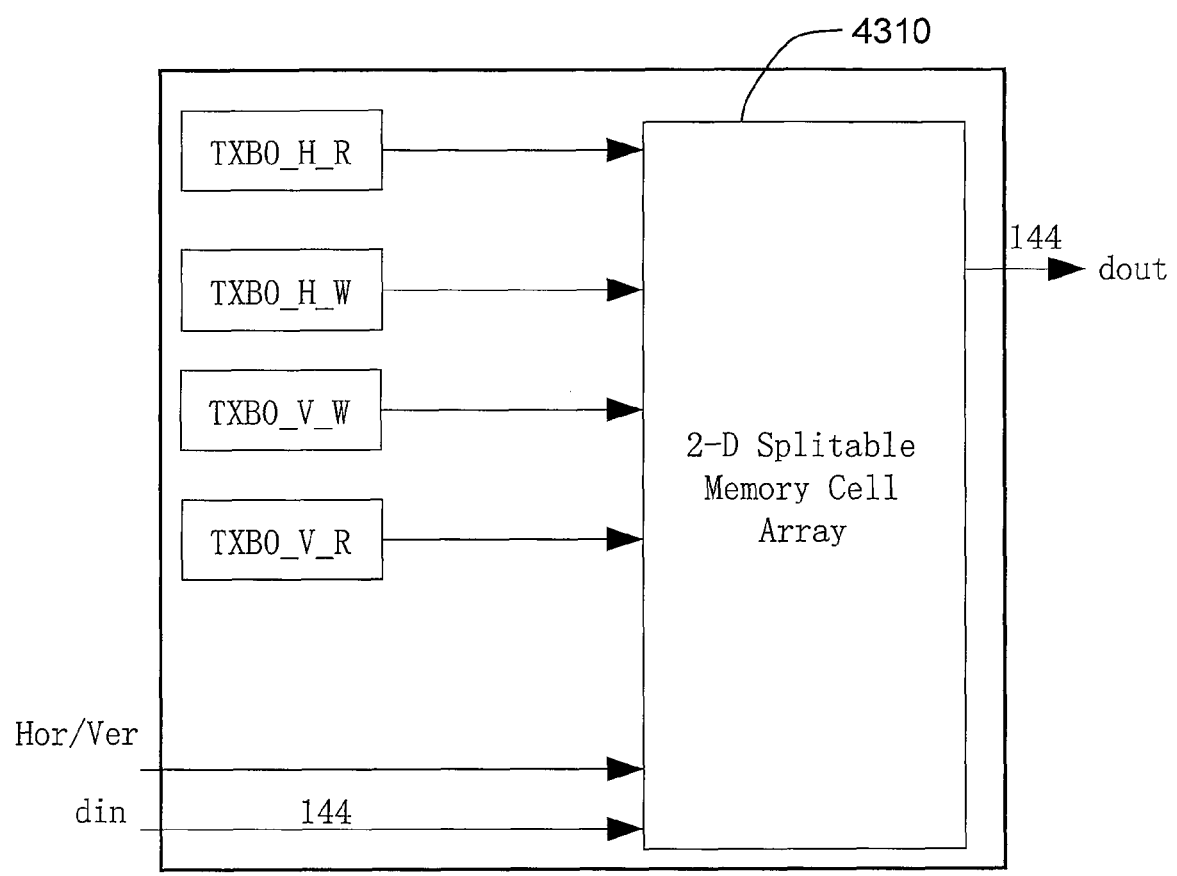
FIG. 43 illustrates one embodiment of a structure of a temporary pixel buffer (TXB).

In one embodiment, the output of each VSUM/VDEB is stored into a pair of Temporary piXel Buffers (TXB0 & TXB1) 3701 and 3702 in FIG. 37. The structure of TXB0 is shown in FIG. 43. The structure of TXB1 is similar as TXB0. The TXB0 includes two write ports including H_W, V_W, two read port including H_R, V_R. H_W and H_R ports, and a 2-D splitable memory cell array 4310.

The output of the temporary pixel buffers TXB0/TXB1 can be routed back to the VSUM or VDEB arrays, which then generate the final interpolated results. The TXB0/TXB1 is organized as 9×4 or 9×8 Register File, which can be accessed in horizontal or vertical direction. In 9×4 mode, TXB0 has four 16-bit words in horizontal direction and 9 rows in the vertical direction. TXB1 has four 16-bit words in horizontal direction and 9 rows in vertical direction. In 9×8 mode, TXB0 has eight 8-b words in horizontal direction and 9 rows in vertical direction. TXB1 has eight 8-b words in horizontal direction and 9 rows in vertical direction. The TXB0/TXB1 has two write ports H_W, V_W and two read port H_R, V_R. The write port H_W and the read port H_R are addressable in horizontal direction. The write port V_W and the read port V_R are addressable in vertical direction. There are dedicated address generators for horizontal or vertical read or write. Totally there are 8 address generators called TXB0_H_R, TXB0_H_W, TXB0_V_R, TXB0_V_W and TXB1_H_R, TXB1_H_W, TXB1_V_R, TXB1_V_W.

In one embodiment, the temporary pixel buffers TXB0 and TXB1 can be written back in the same cycle. It has increased the throughput of write operations.

In one embodiment, when executing f.filt instruction, one filter operation is carried out. One copy operation is implicitly carried out. The filter operation dataflow is: DM/TXB0→tap_filter→TXB0/TXB0. The copy operation dataflow is: DMX→TXB1.

In one embodiment, when executing f.copy instruction, the first copy operation is carried out. And the second copy operation is implicitly carried out. The first copy operation dataflow is: DMX/TXB0→TXB0/TXB0. The second copy operation dataflow is: DMX→TXB1.

In one embodiment, when executing f.copy_rs instruction, one copy operation with round and shift is carried out. And one copy operation is implicitly carried out. The filter operation dataflow is: DMX/TXB0→rnd_kernel_1→TXB0/TXB0. The copy operation dataflow is: DMX→TXB1.

In one embodiment, when executing f.filt2 instruction, one filter operation is carried out. And one round and shift operation is implicitly carried out. The filter operation dataflow is: DMX/TXB0→tap_filter→TXB0/TXB0. The copy operation dataflow is: DMX→rnd_kernel_2→TXB1.

In one embodiment, when executing f.filt_rs2 instruction, one filter operation with shift operation is carried out. And one copy operation is implicitly carried out. The filter operation dataflow is: DMX/TXB0→tap_filter→ rnd_kernel_→ TXB0/TXB0. The copy operation dataflow is: DMX→TXB1.

In one embodiment, when executing f.filt_rs instruction, one filter operation with round and shift operation is carried out. And one copy operation is implicitly carried out. The filter operation dataflow is: DMX/TXB0→tap_filter→rnd_kernel_→TXB0/TXB0. The copy operation dataflow is: DMX→TXB1.

In one embodiment, when executing f.bil instruction, one bilinear filter operation is carried out. One source of bilinear filter comes from Horizontal port of TXB0 and the other source of bilinear filter comes from Horizontal port of TXB1. The filter operation dataflow is: TXB0 and TXB1→bil_filter→TXB0. This instruction uses the lower 3 bits of the coefficient register.

In one embodiment, when executing f.bil_rs instruction, one bilinear filter operation with round and shift is carried out. One source of bilinear filter comes from Horizontal port of TXB0 and the other source of bilinear filter comes from Horizontal port of TXB1. The filter operation dataflow is: TXB0 and TXB1→bil_filter→rnd_kernel_1→→TXB0. This instruction uses the lower 3 bits of the coefficient register.

In one embodiment, when executing f.bil_rs2 instruction, one bilinear filter operation is carried out. One source of bilinear filter comes from Vertical port of TXB0 and the other source of bilinear filter comes from Vertical port of TXB0. The filter operation dataflow is: TXB0→bil_filter→TXB0. This instruction uses the higher 3 bits of the coefficient register.

In one embodiment, when executing fbil_rs_v instruction, one bilinear filter with round and shift operation is carried out. One source of bilinear filter comes from Horizontal port of TXB0 and the other source of bilinear filter comes from Horizontal port of TXB1. The filter operation dataflow is: TXB0 and TXB1→bil_filter→rnd_kernel_1→TXB0/DMX. This instruction uses the higher 3 bits of the coefficient register.

In one embodiment, as shown in FIG. 43, the direction signal Hor/Ver is decoded from IDU3 (as the IDU3 223 of the PSQ2 220 in FIG. 2). The TXB0 includes the 2-D splitable Memory Cell Array 4310, four address generators: TXB0_H_R, TXB0_H_W, TXB0_V_R, TXB0_V_W.

Figure 44:
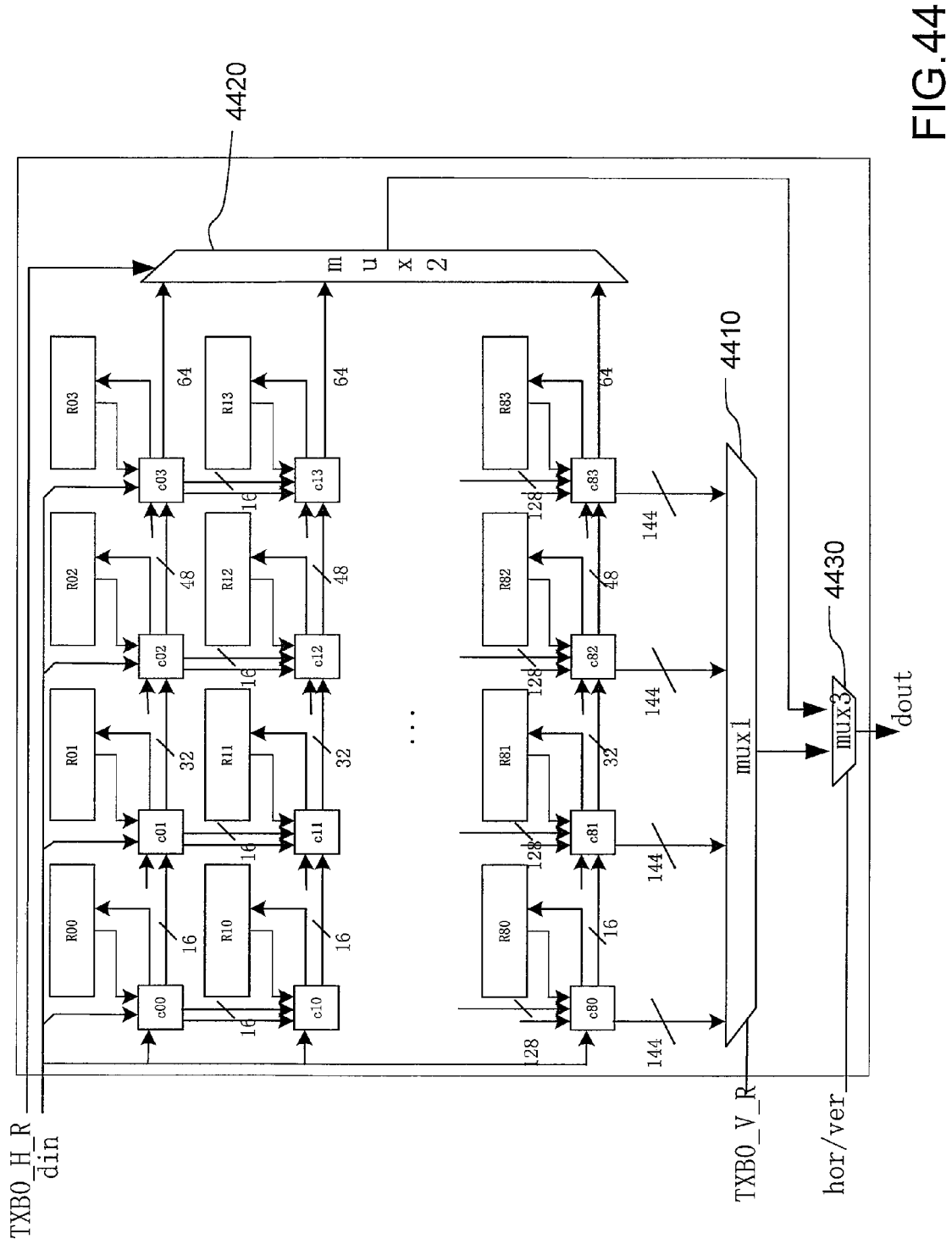
FIG. 44 illustrates one embodiment of a structure of a 2-D splitable Memory Cell Array.

In one embodiment, the structure of the 2-D splitable Memory Cell Array 4310 is shown in FIG. 44. The splitable Memory Cell Array 4310 includes 9 rows, each row includes four 16-bit registers. The 36 registers are named as Rij, i represents the row number, $0<=i<=8$, the j represents the column number, $0<=j<=3$. The register Rij are controlled by a local controller, called cij. The controller cij generates the write signal for register Rij. The controller cij receives the input data from neighboring controller from top and left, as well as the output of the register Rij. The controller cij generates the output data according to the value of address generators and the direction Hor/Ver.

Figure 45:
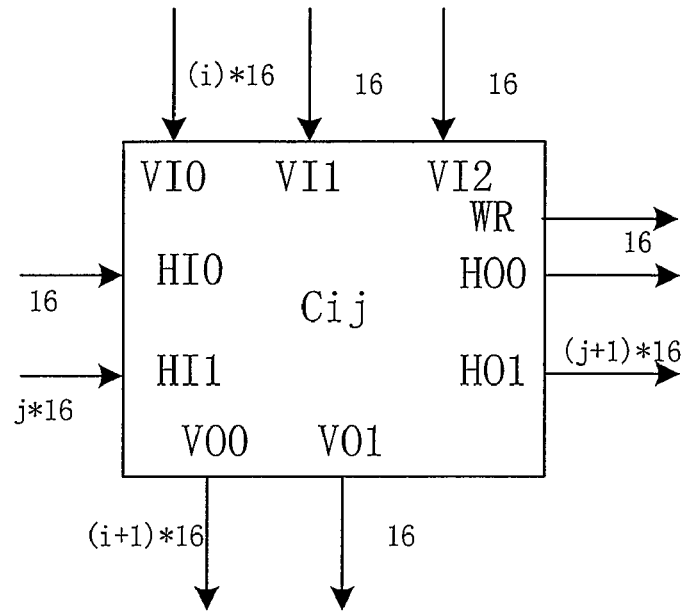
FIG. 45 illustrates one embodiment of a structure of a controller cij structure inside the 2-D splitable Memory Cell Array.

In one embodiment, the controller cij structure is shown in FIG. 45. The relation of the input and output is described as follows. WR controls the write operation of the Register Rij. VI1 and HI0 are taken from the respective bit fields from the input "Din". HO0 are connected to input port of the respective register "Rij". HI1 are connected to the output port "HO1" of the left neighboring Cij. VI0 are connected to the output port "VO0" of top neighboring Cij.

VO0={VI0,VI2};

VO1=VI1;

HO0=Hor?HI0:VI1;

HO1={HI1,VI2};

$WR=Hor?(i==TXB0\_H\_W):(j==TXB0\_V\_W).$

Pixel Processing Unit (PPU) Operation

H.264 Interpolation Operation

Figure 46:
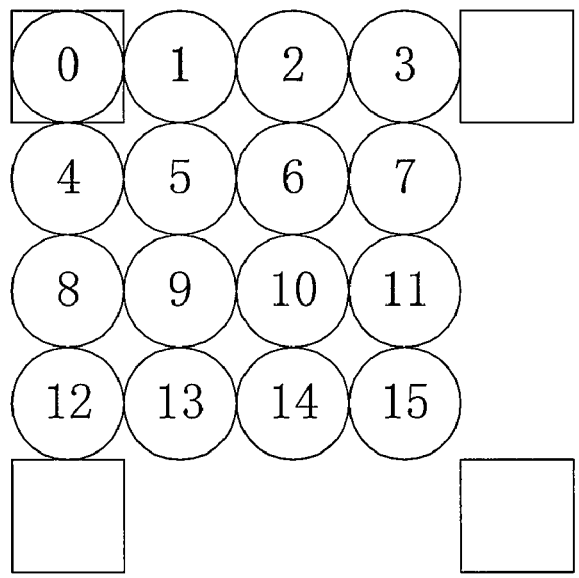
FIG. 46 illustrates one embodiment of locations of fractional pixels, in which the square represents the integer pixel locations, and the circle represents the 16 fractional pixel locations.

There are 16 different fractional locations for luma interopation. The luma interpolation process is described in the reference "Draft ITU-T Recommendation and Final Draft International Standard of Joint Video Specification (ITU-T Rec. H.264|ISO/IEC 14496-10 AVC)." The locations of fractional pixels are shown in FIG. 46, in which the square represents the integer pixel locations, and the circle represents the 16 fractional pixel locations.

The TXB0 and TXB1 work as four 16-bit words in horizontal direction when doing interpolation.

Luma Interpolation Example 1

To do H.264 interpolation operation for "5" and "7", the following instruction is executed. Txb01_h means both TXB0 and TXB1 are the destination.

| [1] | | f.copy dxa txb01_h | $1 // repeat 2 times |
| [2] | | f.filt dxa txb01_h | $3 // repeat 4 times |
| [3] | rst | f.copy dxa txb01_h | $2 // repeat 3 times |
| [4] | rst | f.filt_rs txb1_v txb1_v | $3 // repeat 4 times |
| [5] | jnu | f.avg_rs txb01_h dxd | $3 // repeat 4 times |

In the above programs, fcopy, f.filt_rs, f.filt, f.avg_rs instructions are used.

In [4], f.filt_rs means filter with the round and shift operations. The dataflow is: TXB1→tap_filter→rnd_kernel_1→TXB1.

In [2], f.filt means filter only. The dataflow is: DMX→tap_filter→TXB0; DMX→TXB1.

In [1], f.copy means copy only. The dataflow is: DMX→TXB0; DMX→TXB1.

In [5], Jnu means the program finishes and the sequencer will go to the idle state. And the favg_rs txb01_h dxd $3: means average with the clamp and shift operations. The dataflow is: TXB0→rnd_kernel_1→avg_kernel→DMX;

Luma Interpolation Example 2

To do H.264 interpolation operation for "9" and "11", the following instruction is executed.

| rst | f.filt dxa txb01_h $8 // repeat 9 times |
| rst | f.filt_rs2 txb0_v txb0_v $3 // repeat 4 times |
| rst | f.filt_rs txb1_v txb1_v $3 // repeat 4 times |
| jnu | f.avg_rs txb01_h dxd $3 // repeat 4 times | where f.filt_rs2 means filter without the clamp and with shift operations.

Luma Interpolation Example 3

To do H.264 interpolation operation for "10", the following instruction is executed.

| rst | f.filt dxa txb0_h $8 // repeat 9 times |
| rst | f.filt_rs2 txb0_v txb0_v $3 // repeat 4 times |
| | f.copy_rs txb0_h dxd $3 // repeat 4 times | where fcopy_rs means copy with the clamp and shift operations.

Luma Interpolation Example 4

To do H.264 interpolation operation for "6", the following instruction is executed.

```
f.filt dxa txb0_h      $1 // repeat 2 times
f.filt2 dxa txb01_h    $3 // repeat 4 times
rst  f.filt dxa txb0_h $2 // repeat 3 times
rst  f.filt_rs2 txb0_v txb0_v $3 // repeat 4 times
jnu  f.avg_rs txb01_h dxd $3 // repeat 4 times
``` where the f.filt2 dxa txb01_h: means the result of rnd_kernel_1 is written into TXB0, the result of rnd_kernel_2 is written into TXB1. The dataflow is: DMX→tap_filter→rnd_kernel_1→TXB0; DM→rnd_kernel_2→TXB1.

Chroma Interpolation Example

The chroma interpolation process is described in the aforesaid reference "Draft ITU-T Recommendation and Final Draft International Standard of Joint Video Specification (ITU-T Rec. H.264|ISO/EC 14496-10 AVC)." To do H.264 chroma interpolation operation, the following instruction is executed for fractional pixels which have both horizontal and vertical fractional motion vector.

```
[1] rst  f.copy dxa txb01_h $4 // repeat 5 times
[2] rst  f.bil txb01_h txb0_h $4 // repeat 5 times
[3] rst  f.bil_rs2 txb0_v txb0_v $3 // repeat 4 times
[4] rst  f.copy txb0_h dxd $3 // repeat 4 times
``` where
[1] copy from DMX to TXB0 and TXB1.
[2] do the horizontal bilinear filter and save results in TXB0
[3] do the vertical bilinear filter and save results in TXB0.
[4] copy from TXB0 to DMX.

H.264 Deblock Filtering Operation

The H.264 deblock filtering process is described in the aforesaid reference "Draft ITU-T Recommendation and Final Draft International Standard of Joint Video Specification (ITU-T Rec. H.264|ISO/IEC 14496-10 AVC)." To do H.264 deblock filter operation, the following instruction is executed.

[1] {rst} d.ilf_jvt_1 source dest {$times}.
[2] {rst} d.ilf_jvt_c source dest {$times}.
[3] d.ilf_jvt_1 means H.264 Deblock filter for Luma.
[4] d.ilf_jvt_c means H.264 Deblock filter for Chroma.

where "source" can be dxa, dxb, dxc, dxd, or txb0_h, txb0_v, txb1_h, txb1_v, txb01_h, "dest" can be dxa, dxb, dxc, dxd, or txb0_h, txb0_v, txb1_h, txb1_v, txb01_h. The txb0_h means access the TXB0 in horizontal direction. Txb0_v means access the TXB0 in vertical direction. Txb01_h means access TXB0 and TXB1 in horizontal direction at the same time.

The TXB0 and TXB1 work as 8 8-bit word in horizontal direction when doing deblocking filter.

{$times} means the repeat times of the filter operations minus 1.

{rst} means reset the TXB0_H/V counter.

Luma Deblocking Filter Operation Example 1

In one embodiment, the Horizontal Luma filter is carried out by executing the following instruction flow. The dxa and dxb stores the starting address of DMXA and DMXB at the beginning.

```
[I1]  d.copy dxa txb0_h      $7 // repeat 8 times
[I2]  rst  d.copy dxb txb1_h $7 // repeat 8 times
[I3]  d.ilf_jvt_1 txb0_v txb0_v  $7 // repeat 8 times
[I4]  rst  d.ilf_jvt_1 txb1_v txb1_v  $7 // repeat 8 times
[I5]  d.copy txb0_h dxd $7 // repeat 8 times
[I6]  d.copy txb1_h dxc $7 // repeat 8 times
```

Pipeline Stage in PPU Operations

In the PPU operation, there are 5 pipeline stages: Instruction fetch (IF), instruction decode and Register File Read (ID), Instruction execute (IE), second Instruction Execute (IE2), write back (WB).

Method to Avoid the Resource Conflict

Figure 47:
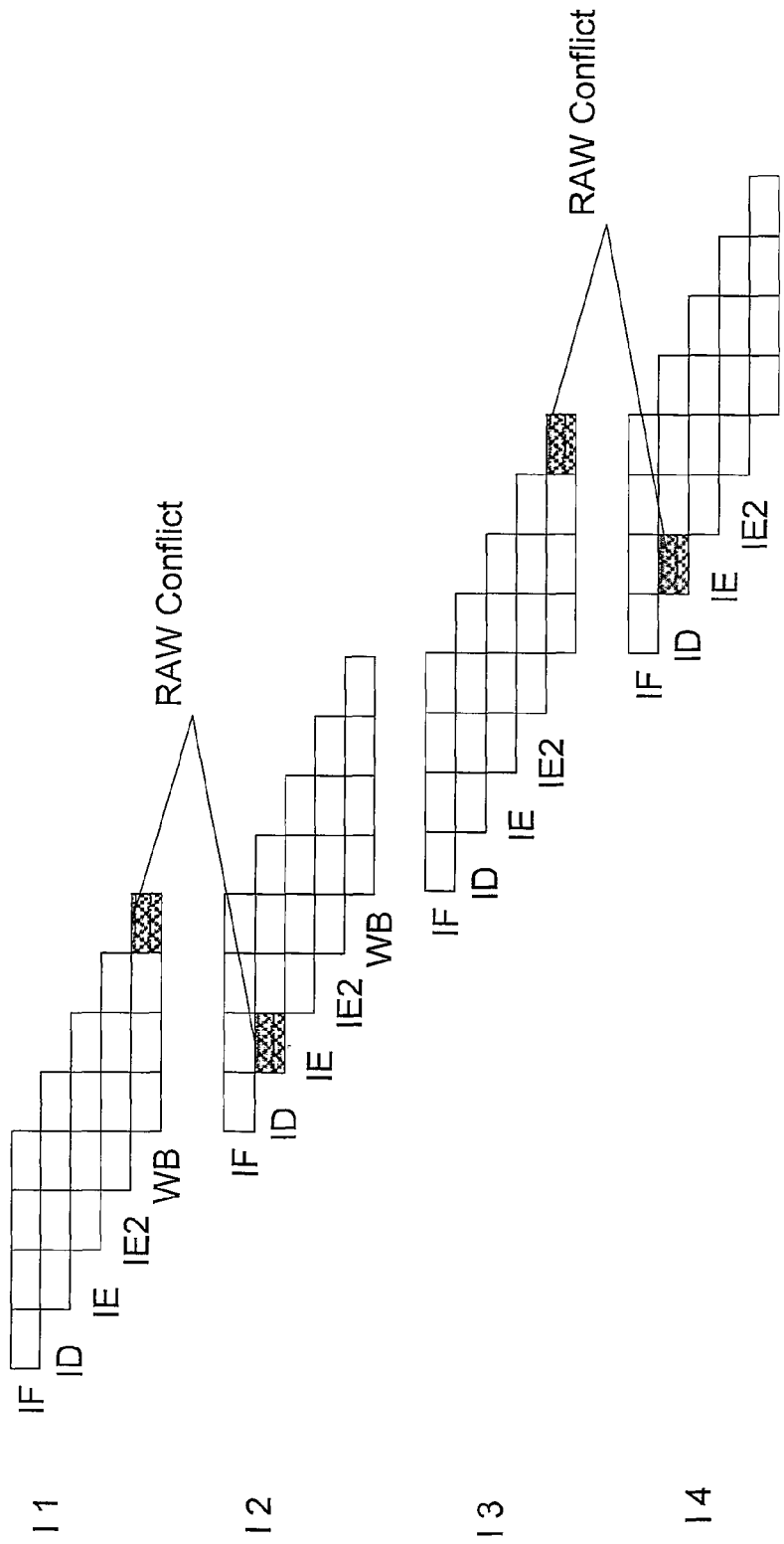
FIG. 47 illustrates one embodiment of a case that there is resource conflict due to the pipeline delay of writing back to the TXB0 and TXB1.

In one embodiment, there is read after write (RAW) resource conflict in the following example. There are 3 pipeline delay stages from ID to WB. The first vector instruction repeats the copy for 8 times. The second vector instruction does the luma horizontal edge filtering, which reads the pixel in the vertical direction. It takes three extra cycles for the first instruction to write back into the last row (the eighth row). The second instruction [I2] reads the first column which still contains three pixels not updated yet. As shown in FIG. 47, there is resource conflict due to the pipeline delay of writing back to the TXB0 and TXB1.

```
[I1]  d.copy dxa txb0_h      $7 // repeat 8 times
[I2]  d.ilf_jvt_1 txb0_v txb0_v  $7 // repeat 8 times
[I3]  d.copy dxa txb1_h      $7 // repeat 8 times
[I4]  d.ilf_jvt_1 txb1_v txb1_v  $7 // repeat 8 times
```

Figure 48:
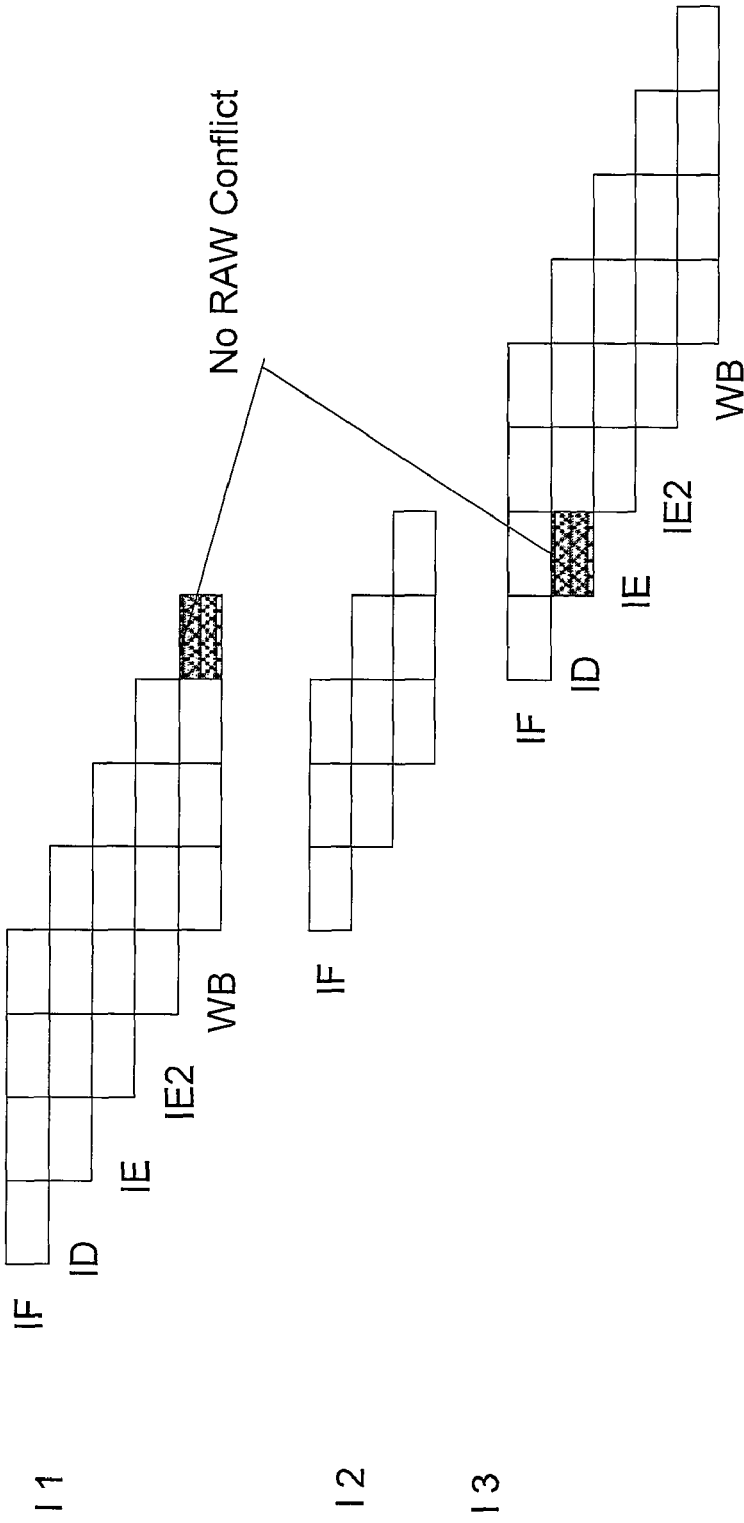
FIG. 48 illustrates one embodiment of three nops inserted in the delay slot to avoid the RAW conflict, and three cycles are wasted.

In one embodiment, three nops are inserted in the delay slot to avoid the RAW conflict. Three cycles are wasted, as shown in FIG. 48.

```
[I1]  d.copy dxa txb0_h      $7 // repeat 8 times
[I2]  d.nop $2 // repeat nop for 3 times
[I3]  d.ilf_jvt_1 txb0_v txb0_v  $7 // repeat 8 times
```

In one embodiment, the sequence of the instruction is optimized so that there is no need to insert delay slot between horizontal operation and vertical operation.

```
[I1]  d.copy dxa txb0_h      $7 // repeat 8 times
[I2]  d.copy dxa txb1_h      $7 // repeat 8 times
[I3]  d.ilf_jvt_1 txb0_v txb0_v  $7 // repeat 8 times
[I4]  d.ilf_jvt_1 txb1_v txb1_v  $7 // repeat 8 times
```

Figure 49:
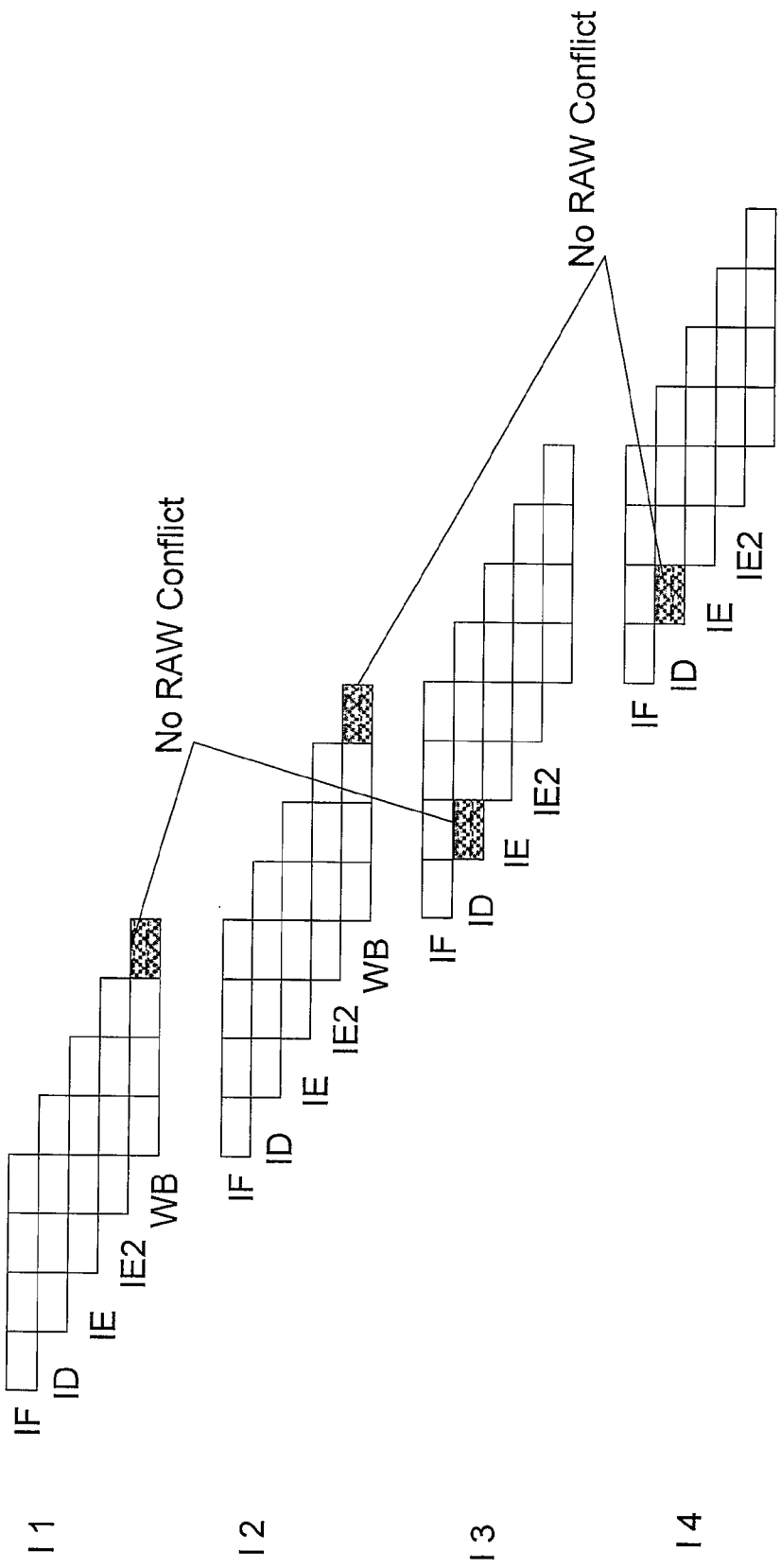
FIG. 49 illustrates one embodiment of a case that there are no RAW conflict in the instruction flow.

When [I2] is processing the TXB1 horizontal copy, [I3] starts to process TXB0 vertical filtering. After [I3], [I4] starts to process TXB1 vertical filtering. There are no RAW conflict in this instruction flow shown in FIG. 49.

The Main Program Sequencer (PSQ)

As shown in FIG. 2, the PSQ 220 contains 2K 24-bit Program Memory Unit (PMU) 211, Program Counter Unit (PCU) 212 and two Instruction Decode units (IDU1 and IDU2). The PMU 211 can issue one or two instruction in one cycle. These two instructions are decoded in IDU1 and IDU2 respectively and then executed in different execution units. The possible pair rule is described as follows:

SALU opcode && VALU opcode
SALU opcode && VMAC opcode

SALU opcode && VDFX opcode
VMAC opcode && VALU opcode
VDFX opcode && VALU opcode The PCU 212 has four-depth subroutine stack and four-depth loop stack.

The Second Program Sequencer (PSQ2)

As shown in FIG. 2, the PSQ2 221 contains 256 24-bit Program Memory Unit (PMU2) 221, Program Counter Unit (PCU2) 222 and one Instruction Decode units (IDU3) 223. The PMU2 222 can output one 24-bit instruction in one cycle.

Example of Mapping H.264 Decoder into VSP

Figure 50:
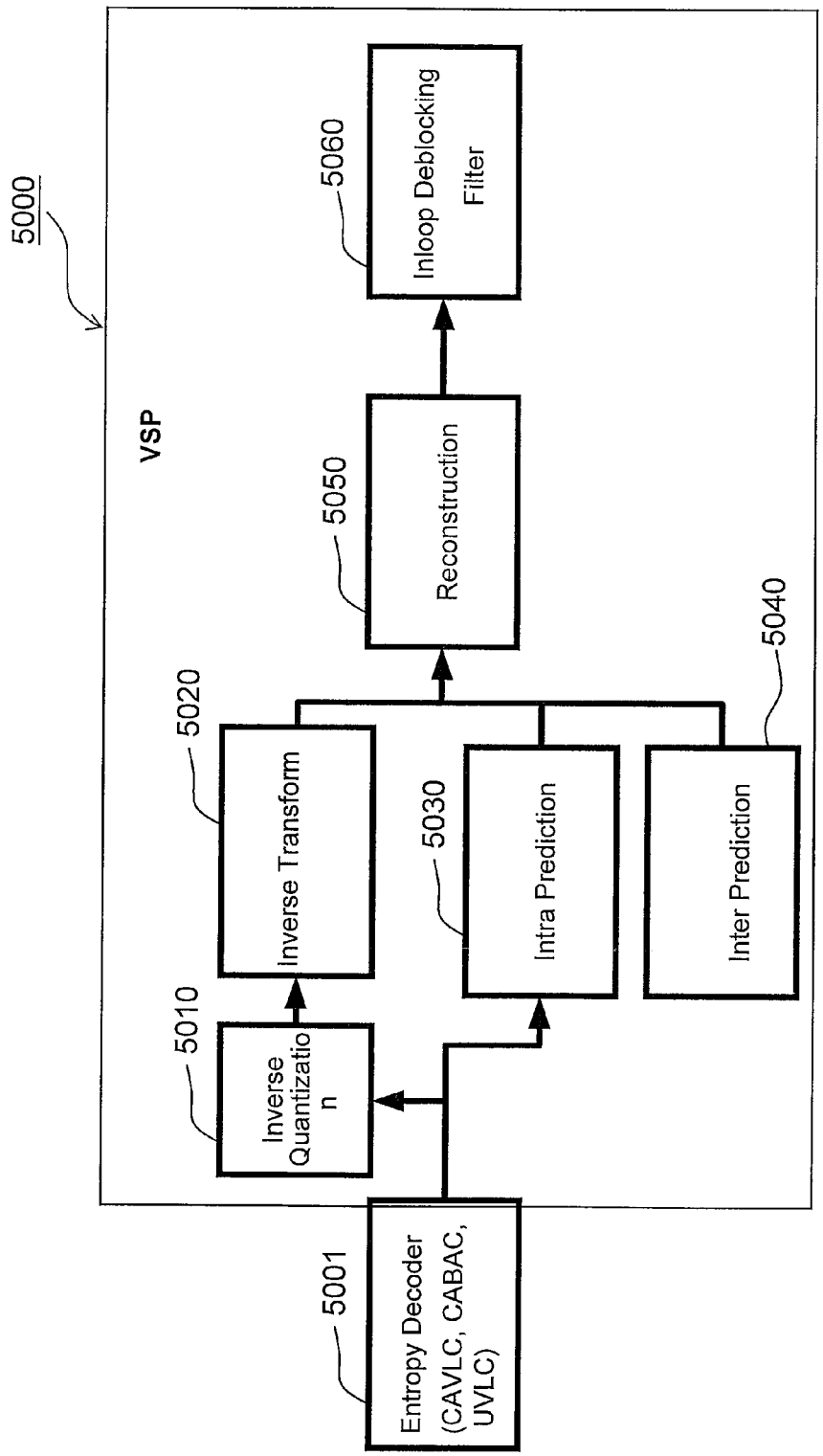
FIG. 50 illustrates one embodiment of an H.264 decoder partitioned into several sub-tasks and each task being done by using a specific VSP command.

As shown in FIG. 50, the H.264 decoder is partitioned into several sub-tasks and each task is done by using a specific VSP command. For example, IT Command is used to do Inverse transform. DX command is used to do the Direct transferring Transform Coefficients from Entropy Processor to VSP. DX Command is also used to do the inverse quantization.

The relation of command type and functional units in VSP is described in Table 15.

TABLE 15

Relation of command type and functional units in VSP

| Command Type | Command Sub-Type | Functional Units |
| --- | --- | --- |
| PSQ | DX Command | IOP |
| PSQ | IT Command | PSQ, VPU, SPU |
| PSQ | IntraPred Command | PSQ, VPU, SPU |
| PSQ2 | MC Command | PSQ2, PPU |
| PSQ | REC Command | PSQ, VPU, SPU |
| PSQ2 | DEB Command | PSQ2, PPU |

Although embodiments have been described with reference to specific exemplary embodiments, it will be evident that the various modification and changes can be made to these embodiments. Accordingly, the specification and drawings are to be regarded in an illustrative sense rather than in a restrictive sense. The foregoing specification provides a description with reference to specific exemplary embodiments. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A data processing method in a video signal processor (VSP), the method comprising:
   receiving commands from an external signal processor;
   dispatching the received commands to a first separate command sequencer (PSQ), a second separate command sequencer (PSQ2) and a third separate command sequencer according to different command types, the first and second separate command sequencers for performing task parallelism and the third command sequencer for performing Input/output (IO) operation;
   the first and second separate command sequencers packing the received commands into a plurality of instruction packets; and
   the first and second separate command sequencers respectively sending the instruction packets to a plurality of arithmetic function units with a first type and a plurality of arithmetic function units with a second type,
   wherein two of the instruction packets from the first separate command sequencer (PSQ) are dispatched and executed in the same cycle according to one of the following combinations: SPU|VALU VMAC|VALU DFXU|VALU SPU|VMAC SPU|DFXU SPU|SAD, wherein "|" means that the combination of two instruction packets, the SPU means the instruction packets for a scalar processing unit, VALU means the instruction packets for a vector arithmetic logic unit, VMAC means the instruction packets for a vector multiplication and accumulation operation unit, DFXU means the instruction packets for a data fetch and exchange unit, and SAD means the instruction packets for a sum of absolute difference Unit.

2. The data processing method of claim 1, wherein the first type arithmetic function units are homogeneous functional units which handle arithmetic operations, and the second type arithmetic function units are heterogeneous functional units which handle video specific tasks.

3. The data processing method of claim 2, wherein the arithmetic operations comprising add, sub, multiply, shift or saturate operations.

4. The data processing method of claim 2, wherein the video specific tasks comprising Motion compensated (MC) interpolation, SAD operations for Motion Estimation, or deblocking filtering.

5. The data processing method of claim 1, wherein the third separate command sequencer is an Input/output (IO) processor, and the commands from the third separate command sequencer are executed in parallel in the following combinations: PSQ2 Command|DMA Command PSQ2 Command|DX Command PSQ Command|DMA Command PSQ Command|DX Command Configure Command|DMA Command Configure Command|DX Command DX command|DMA Command PSQ Command|PSQ2 Command wherein "|" means that the combination of two commands, the PSQ2 Command means the commands for the second separate command sequencer (PSQ2), a DMA Command means commands for controlling data transfer between a data memory unit (DMU) of the VSP and an external DMA engine, a DX Command means commands for data transfer between the VSP and an external circuit, and Configure Command means commands for configuration of the arithmetic function units inside the VSP.

6. A method for data processing in a video signal processor (VSP), the method comprising:
   receiving commands from an external signal processor;
   dispatching the received commands into a plurality of separate command sequencers in VSP according to different command types, wherein the dispatched commands respectively in a first and a second separate command sequencers are supplied for computation and the dispatched commands in a third and a fourth separate command sequencers are supplied for input or output (IO) operations;
   controlling the execution of pixel processing by using the dispatched commands in the first separate command sequencer;
   controlling the execution of vector processing or scalar processing by using the dispatched commands in the second separate command sequencer;
   wherein controlling data transfer between a data memory unit (DMU) of the VSP and an external DMA engine by using the dispatched commands in the third separate command sequencer, controlling data transfer between the data memory unit (DMU) of the VSP and an external entropy engine by using the dispatched commands in the fourth separate command sequencer, wherein the computing operations in the VSP and the data transfer operation by the DMA engine are done in parallel.

7. The method for data processing of claim 6, wherein dispatching the received commands into a plurality of separate command sequencers in VSP comprising routing computing commands of the received commands to the first and second separate command sequencers and routing IO operation commands of the received commands to the third and fourth separate command sequencers.

8. The method for data processing of claim 6, wherein controlling data transfer between a data memory unit (DMU) of the VSP and the external DMA engine further comprising converting data format for the data received from a data FIFO connected to the external DMA engine.

9. The method for data processing of claim 6, wherein a second state machine interposed between the data memory unit (DMU) and the external entropy engine, for controlling inverse scanning and inverse quantization and data transferring between the data memory unit and a coefficient FIFO connected to the external entropy engine.

10. The method for data processing of claim 6, wherein the pixel processing comprising Quarter/Half pixel interpolation (QPEL) or deblocking filtering (DEB).

11. The method for data processing of claim 6, wherein the vector processing comprising vector multiplication and accumulation, and arithmetic operation.

12. The method for data processing of claim 6, wherein the scalar processing comprising multiplication, division and scalar arithmetic operation.

13. A video signal processor (VSP), comprising: an interfacing unit, for receiving commands from an external signal processor;
a plurality of separate command sequencers, for receiving commands from the interfacing unit according to types of the received commands, each of the separate command sequencers packing the received commands into a plurality of instruction packets;
a plurality of instruction dispatch units, for receiving the instruction packets sent from the separate command sequencers, wherein each of the instruction packets includes one or more instructions; and
a plurality of arithmetic function units, for receiving the instruction packets from respective instruction dispatch units and for performing operations in response to the received instruction packets,
wherein one of the arithmetic function units is a Pixel Processing Unit (PPU), for pixel based video processing, including Quarter/Half pixel interpolation (QPEL) and deblocking filtering (DEB), and the PPU includes two types of datapath, wherein one type of the datapath includes four vector summation elements and the other type of the datapath includes a plurality of hardwired deblocking filters for specified video coding standards.

14. The video signal processor (VSP) of claim 13, wherein the interfacing comprising a COProcessor interface (COP) and a IOProcessor interface (IOP), wherein the COP is used for exchanging commands and data between the VSP and the external signal processor, the IOP is used for exchanging bulk data between the VSP and an external memory access device.

15. The video signal processor (VSP) of claim 13, wherein one of the separate command sequencers is a program sequencer unit (PSQ), the PSQ comprising: a program memory unit (PMU) for issuing one or two instruction in one cycle; a program counter unit (PCU) having four-depth subroutine stack and four-depth loop stack; and two instruction decode units (IDU1/IDU2), for decoding the instructions and sending the decoded instructions to respective arithmetic function units for execution.

16. The video signal processor (VSP) of claim 13, wherein the vector summation element uses a configurable multiplication-free computation unit and is configured to support the different types of interpolation filters.

17. The video signal processor (VSP) of claim 13, wherein each of the hardwired deblocking filters does the conditional deblocking filtering based on input pixels by executing one instruction, and the deblocking filter datapath has multiple pipeline stages.

18. The video signal processor (VSP) of claim 13, wherein one of the arithmetic function units is a vector processing unit (VPU), the vector processing unit comprising: a general purpose vector register file (GVRF) stores pixels of a neighboring blocks and a current block, as well as intermediate data a vector arithmetic logic unit (VALU), having an accumulator to store the immediate data which have bigger data width than the general purpose vector registers; a vector multiplication and accumulation operation unit (VMAC), for performing multiplication and accumulation; and a data format and exchange unit (DFXU), for exchanging data with 8-bit or 16-bit chunks.

19. The video signal processor (VSP) of claim 18, wherein the general purpose vector register file (GVRF) at least has four read ports and two write ports, wherein for single-instruction, two of the read port and one of the write ports are used, for a Data Exchange instruction, one of the read ports and one of the write ports are used, for a dual-instruction, two of the read ports and one of the write port are used for a first instruction of the dual-instruction, while the other two of the read ports and the other one of the write port are used for the second instruction, and for a three-source-operand instruction, three of the read ports and one of the write ports are used.

20. The video signal processor (VSP) of claim 18, wherein the general purpose vector register file (GVRF) comprises M general purpose vector registers, and each of the general purpose vector registers for storing 2*N pixels, wherein M and N are integers, wherein the M and N are configured to be big enough to hold one block in transform domain, and the M general purpose vector registers are configured as a shift register array.

21. The video signal processor (VSP) of claim 18, wherein the vector multiplication and accumulation operation unit (VMAC) supports a round toward zero mode and a truncate toward zero mode, and also supports signed and unsigned multiplications.

22. The video signal processor (VSP) of claim 18, wherein the VMAC comprises: two vector registers; a multiplication unit (MUL), wherein one input of the MUL is coupled to one of the vector registers, and the other input of the MUL is coupled to data from one of general purpose vector registers, an immediate data or a scalar register file; a register, for storing the result from the multiplication unit; an adder, couple to the register; and a plurality of accumulators, wherein the output of the accumulators is shifted or saturated, and then stored into one of the general purpose vector registers, wherein the adder performs an addition on the result from the accumulators and the data stored in the register.

23. The video signal processor (VSP) of claim 18, wherein the VMAC includes eight 16.times.16 splitable multiplication units (MULs) are split as sixteen 8-bit by 8-bit or eight 16-bit by 16-bit operation units, wherein eight 16.times.16 splitable MUL and each of the splitable MUL includes four 8.times.8 multiplication units, and 16-bit or 8-bit operations are performed by the VMAC.

24. The video signal processor (VSP) of claim 18, wherein the vector arithmetic logic unit (VALU) comprises a plurality of arithmetic logic unit (ALU) modules and supports saturation and average operations, each of the arithmetic logic unit (ALU) modules can be split if a split mode is specified.

25. The video signal processor (VSP) of claim 24, wherein the arithmetic logic unit (ALU) modules is a 16-bit arithmetic logic unit, and when the split mode is specified, one or more 8-bit add operations are done in one cycle, and if the split mode is not specified, one or more 16-bit add operations are done in one cycle.

26. The video signal processor (VSP) of claim 24, wherein each of the arithmetic logic unit (ALU) modules comprises: two round units; two add and saturate units, each of which couples to one of the round units; a shift and logic unit, comprising Minmax logics inside; and an adder unit.

27. The video signal processor (VSP) of claim 26, wherein the logic of each of the round units is identical to $Z=(X+(1<<(S-1)))>>S$, where S and X are the inputs of the round unit.

28. The video signal processor (VSP) of claim 18, wherein the vector arithmetic logic unit (VALU) further comprising eight arithmetic logic unit (ALU) modules, each of the ALUs is split as two 8-bit arithmetic operations, thereby the VALU has very high bandwidth computation throughput.

29. The video signal processor (VSP) of claim 18, wherein the DFXU is configured for exchanging data in a minor operation mode, a byte permutation mode, a short permutation mode, a DWORD permutation mode, a QWORD permutation mode, or a right rotate operation mode.

30. The video signal processor (VSP) of claim 13, further comprising a Data Memory Unit (DMU), for storing block data or immediate data generated by a vector processing unit (VPU) or a Pixel Processing Unit (PPU), the DMU has two independent memory ports, which are accessed by an external DMA controller as well as the VPU or the PPU.

31. The video signal processor (VSP) of claim 30, wherein if the DMA controller and the VPU or the PPU access the same port of the DMU, the DMA controller has higher priority.

32. The video signal processor (VSP) of claim 30, wherein the DMU further comprises a programmable Data Address Generator (DAG), the DAG is programmed by a scalar processing unit (SPU) and generates the address for the two independent memory ports.

33. The video signal processor (VSP) of claim 13, wherein one of the arithmetic function units is a scalar processing unit (SPU), comprising a general purpose scalar register file (SRF), being organized as three read port and one write port; a scalar arithmetic logic unit (SALU), for reading two source operands from the first two read ports and writes the result to the write port of the general purpose scalar register file, and the third read port provides the source operands for a Vector ALU (VALU) unit when a scalar instruction and vector instruction are paired, or the third read port provides scalar coefficient/operands for vector multiplication and accumulation operation unit (VMAC) of a vector processing unit (VPU); and a multiplication and division operation unit (MUL/DIV), which supports bit-by-bit multiplication and division.

34. The video signal processor (VSP) of claim 13, wherein one of the arithmetic function unit is a sum of absolute difference (SAD) Unit, which is designed for calculating the sum of absolute difference.

* * * * *